United States Patent
Marshall et al.

(10) Patent No.: US 10,764,185 B2
(45) Date of Patent: **\*Sep. 1, 2020**

(54) TOKEN-BASED POLICIES BURST-MODE OPERATIONS

(71) Applicant: Amazon Technologies, Inc., Reno, NV (US)

(72) Inventors: Stuart Henry Seelye Marshall, Seattle, WA (US); Wei Xiao, Kirkland, WA (US); Bjorn Patrick Swift, Seattle, WA (US); Kiran-Kumar Muniswamy-Reddy, Seattle, WA (US); Miguel Mascarenhas Filipe, Seattle, WA (US); Yijun Lu, Kenmore, WA (US); Stefano Stefani, Issaquah, WA (US); James R. Hamilton, Seattle, WA (US)

(73) Assignee: Amazon Technologies, Inc., Seattle, WA (US)

( \* ) Notice: Subject to any disclaimer, the term of this patent is extended or adjusted under 35 U.S.C. 154(b) by 1010 days.

This patent is subject to a terminal disclaimer.

(21) Appl. No.: 13/926,694

(22) Filed: Jun. 25, 2013

(65) Prior Publication Data

US 2014/0379506 A1   Dec. 25, 2014

(51) Int. Cl.
*G06Q 40/00* (2012.01)
*H04L 12/801* (2013.01)
(Continued)

(52) U.S. Cl.
CPC ............ *H04L 47/12* (2013.01); *G06F 9/5005* (2013.01); *G06Q 30/0283* (2013.01); *H04L 47/215* (2013.01)

(58) Field of Classification Search
CPC ....... H04L 47/10; H04L 47/215; G06F 9/505; G06Q 10/06; G06Q 30/08; G06Q 10/02; G06Q 40/00; G06Q 40/04
(Continued)

(56) References Cited

U.S. PATENT DOCUMENTS 5,944,789 A \* 8/1999 Tzelnic ............... G06F 12/0813
707/999.007
6,337,865 B1 \* 1/2002 Seto ...................... H04L 12/417
370/450
(Continued)

FOREIGN PATENT DOCUMENTS

EP   1119943   6/1999
EP   2031807   3/2009
(Continued)

OTHER PUBLICATIONS

A. Aeron, "Fine Tuning of Fuzzy Token Bucket Scheme for Congestion Control in High Speed Networks," 2010 Second International Conference on Computer Engineering and Applications, Bali Island, 2010, pp. 170-174.\*
(Continued)

*Primary Examiner* — Kelly S Campen
(74) *Attorney, Agent, or Firm* — Robert C. Kowert; Kowert, Hood, Munyon, Rankin & Goetzel, P.C.

(57) ABSTRACT

A pricing policy to be applied to token population changes at a token bucket used for admission control during burst-mode operations at a work target is determined. Over a time period, changes to the token population of that bucket are recorded. An amount to be charged to a client is determined, based on the recorded changes in token population and an associated pricing amount indicated in the policy.

20 Claims, 33 Drawing Sheets

(51) Int. Cl.
  *G06Q 30/02* (2012.01)
  *G06F 9/50* (2006.01)
  *H04L 12/819* (2013.01)
(58) Field of Classification Search
  USPC ...... 705/35, 36 R, 40, 26.1; 370/230, 235.1;
  709/224, 226
  See application file for complete search history.

(56) References Cited

U.S. PATENT DOCUMENTS

| | | | |
|---|---|---|---|
| 6,738,813 B1* | 5/2004 | Reichman | G06Q 10/06 709/223 |
| 7,130,917 B2* | 10/2006 | Zhang | H04L 12/14 370/230 |
| 7,228,354 B2* | 6/2007 | Chambliss | G06F 11/1076 370/395.4 |
| 7,328,274 B2* | 2/2008 | Zhang | H04L 12/14 370/230 |
| 8,190,593 B1 | 5/2012 | Dean | |
| 8,250,197 B2* | 8/2012 | Gulati | H04L 67/1097 709/217 |
| 8,914,497 B1* | 12/2014 | Xiao | H04L 67/16 370/235 |
| 8,953,453 B1* | 2/2015 | Xiao | H04L 47/12 370/230 |
| 9,218,221 B2* | 12/2015 | Xiao | G06F 9/5083 |
| 9,385,956 B2* | 7/2016 | Xiao | H04L 47/12 |
| 2003/0123390 A1* | 7/2003 | Takase | H04L 47/22 370/230.1 |
| 2004/0111308 A1* | 6/2004 | Yakov | G06Q 10/087 705/28 |
| 2006/0167703 A1* | 7/2006 | Yakov | B23K 1/0016 705/26.1 |
| 2006/0288184 A1* | 12/2006 | Riska | G06F 3/0613 711/167 |
| 2007/0112723 A1* | 5/2007 | Alvarez | G06F 9/50 |
| 2007/0147404 A1* | 6/2007 | van Haalen | H04L 47/10 370/412 |
| 2007/0294435 A1 | 12/2007 | Huang et al. | |
| 2007/0297328 A1* | 12/2007 | Semret | G06Q 10/02 370/230 |
| 2008/0008094 A1* | 1/2008 | Gilfix | H04L 67/322 370/235 |
| 2008/0008095 A1* | 1/2008 | Gilfix | H04L 47/10 370/235 |
| 2008/0056268 A1* | 3/2008 | Washburn | H04L 47/10 370/394 |
| 2008/0077932 A1* | 3/2008 | Ruppach | G06F 9/5038 718/105 |
| 2008/0084824 A1* | 4/2008 | Chin | H04L 47/10 370/235.1 |
| 2008/0095053 A1* | 4/2008 | Chen | H04L 47/215 370/230.1 |
| 2008/0189700 A1* | 8/2008 | Schmidt | G06F 11/203 718/1 |
| 2009/0003204 A1* | 1/2009 | Okholm | H04L 47/10 370/230 |
| 2009/0254383 A1* | 10/2009 | Semret | G06Q 10/02 705/5 |
| 2010/0076805 A1* | 3/2010 | Batsakis | G06F 9/505 705/35 |
| 2010/0195504 A1* | 8/2010 | Nandagopal | H04L 47/10 370/235.1 |
| 2010/0228819 A1* | 9/2010 | Wei | G06F 9/505 709/203 |
| 2011/0010427 A1* | 1/2011 | Jnagal | G06F 3/0605 709/213 |
| 2011/0078303 A1* | 3/2011 | Li | G06F 9/505 709/224 |
| 2011/0099147 A1* | 4/2011 | McAlister | H04L 67/1095 707/639 |
| 2011/0138051 A1* | 6/2011 | Dawson | G06F 9/5072 709/226 |
| 2011/0320631 A1* | 12/2011 | Finkelstein | H04L 41/0896 709/232 |
| 2012/0054329 A1* | 3/2012 | Gulati | H04L 67/1002 709/224 |
| 2012/0131591 A1* | 5/2012 | Moorthi | G06Q 10/06 718/104 |
| 2012/0311576 A1* | 12/2012 | Shu | G06F 9/45558 718/1 |
| 2012/0330954 A1* | 12/2012 | Sivasubramanian | G06F 9/5061 707/737 |
| 2014/0279905 A1* | 9/2014 | Muniswamy-Reddy | G06F 11/20 707/639 |
| 2014/0376368 A1* | 12/2014 | Xiao | H04L 47/12 370/230 |
| 2014/0379922 A1* | 12/2014 | Xiao | H04L 47/70 709/226 |
| 2014/0380324 A1* | 12/2014 | Xiao | G06F 9/5083 718/102 |
| 2014/0380330 A1* | 12/2014 | Xiao | G06F 9/5083 718/104 |

FOREIGN PATENT DOCUMENTS

| | | |
|---|---|---|
| JP | 2005-501316 | 1/2005 |
| JP | 2007-142544 | 6/2007 |

OTHER PUBLICATIONS

U.S. Appl. No. 13/327,616, filed Dec. 15, 2012, Wei Xiao, et al.
U.S. Appl. No. 13/327,620, filed Dec. 15, 2012, Wei Xiao, et al.
U.S. Appl. No. 13/799,386, filed Mar. 13, 2013, Swaminathan Sivasubramanian et al.
U.S. Appl. No. 13/247,846, filed Sep. 28, 2011, Brian Helfrich et al.
U.S. Appl. No. 13/431,360, filed Mar. 27, 2012, David John Ward Jr.
U.S. Appl. No. 13/475,359, filed May 18, 2012, David John Ward Jr.
U.S. Appl. No. 13/926,686, filed Jun. 25, 2013, Wei Xiao, et al.
U.S. Appl. No. 13/926,708, filed Jun. 25, 2013, Wei Xiao, et al.
U.S. Appl. No. 13/926,684, filed Jun. 25, 2013, Wei Xiao, et al.
U.S. Appl. No. 13/926,697, filed Jun. 25, 2013, Wei Xiao, et al.
U.S. Appl. No. 14/701,464, filed Apr. 30, 2015, Tarang Gupta.
U.S. Appl. No. 14/701,462, filed Apr. 30, 2015 Jacob David Luszcz, et al.
"Flow Enforcement Control for Bursty Traffic in ATM Networks",IEICE technical report, Mar. 6, 1991 vol. 90 No. 453, pp. 37-42.
Extended European Search Report from PCT/US2014/044188, dated Jan. 26, 2017, Amazon Technologies, Inc., pp. 1-9.
Search Report and Written Opinion from Patent Application No. 11201510427Q, dated Feb. 3, 2017, Amazon Technologies, Inc., pp. 1-11.

* cited by examiner

TOKEN-BASED POLICIES BURST-MODE OPERATIONS

BACKGROUND

Several leading technology organizations are investing in building technologies that sell "software-as-a-service". Such services provide access to shared storage (e.g., database systems) and/or computing resources to clients or subscribers. Within multi-tier e-commerce systems, combinations of different types of resources may be allocated to subscribers and/or their applications, such as whole physical or virtual machines, CPUs, memory, network bandwidth, or I/O capacity.

Every system that provides services to clients needs to protect itself from a crushing load of service requests that could potentially overload the system. In general, for a Web service or remote procedure call (RPC) service, a system is considered to be in an "overloaded" state if it is not able to provide the expected quality of service for some portion of client requests it receives. Common solutions applied by overloaded systems include denying service to clients or throttling a certain number of incoming requests until the systems get out of an overloaded state.

Some current systems avoid an overload scenario by comparing the request rate with a fixed or varying global threshold and selectively refusing service to clients once this threshold has been crossed. However, this approach does not take into account differences in the amount of work that could be performed in response to accepting different types and/or instances of services requests for servicing. In addition, it is difficult, if not impossible, to define a single global threshold that is meaningful (much less that provides acceptable performance) in a system that receives different types of requests at varying, unpredictable rates, and for which the amount of work required to satisfy the requests is also varying and unpredictable. While many services may have been designed to work best when client requests are uniformly distributed over time, in practice such temporal uniformity in work distribution is rarely encountered. Furthermore, in at least some environments, workloads may be non-uniform not only with respect to time, but also non-uniform with respect to the data set being operated upon—e.g., some portions of data may be accessed or modified more frequently than others. Service providers that wish to achieve and retain high levels of customer satisfaction may need to implement techniques that deal with workload variations in a more sophisticated manner.

Figure 1A:
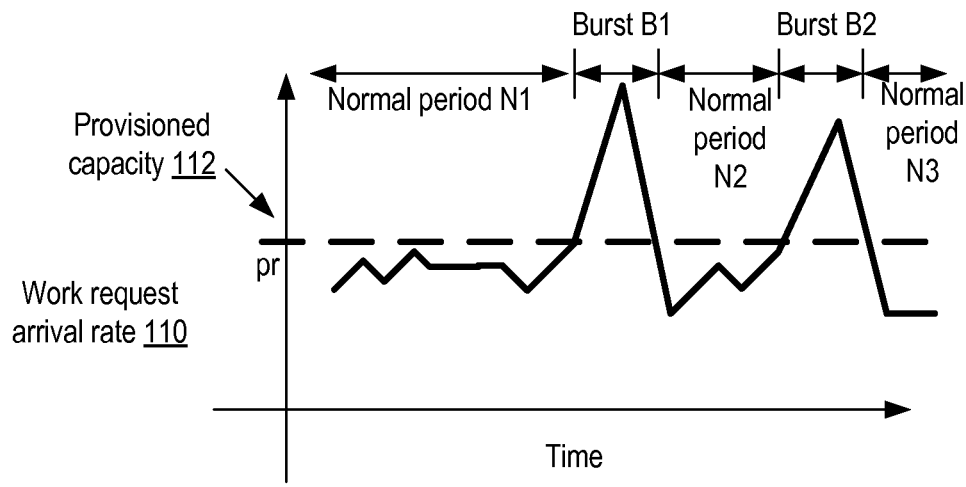
FIG. 1a illustrates an example of work request arrival rate variations.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for implementing burst-mode admission control using token buckets and associated pricing policies are described. The term "admission control" may be used herein to represent operations performed to determine whether received work requests (such as read or write requests directed to a storage service) are to be accepted for implementation, and a set of software and/or hardware entities involved in performing admission control may collectively be referred to as "admission controllers". Admission control using token buckets may be employed, for example, in a variety of environments in which a network-accessible service (such as a multi-tenant storage or database service) supports a provisioned workload model. In a provisioned workload model, a given object to which work requests may be directed may be set up or configured in such a way that it is normally able to support up to a particular rate of work requests (a "provisioned throughput capacity") with acceptable response times for the work requests. The term "throughput capacity" is used herein to represent the ability of a resource (e.g., a storage object, a database table, or a partition of a storage object or database table) to complete work requests at a given rate. Throughput capacity may be expressed, for example, in units such as work operations per second, such as logical or physical reads or writes per second in the case of storage resources. The term "work target" may be used herein for a resource or object implemented and/or managed by a network-accessible service, to which work requests may be directed. In at least some embodiments, a given admission controller may be responsible for making admission decisions for a plurality of work targets.

In one embodiment, for example, a network-accessible multi-tenant database service may set up a database table (a work target) configured for handling up to X read or write operations per second (i.e., the provisioned throughput capacity of the table may be set up as X operations per second). The terms "provisioned throughput capacity" and "provisioned capacity" may be used interchangeably herein. In at least some embodiments, the amount that the corresponding client has to agree to pay for the establishment and use of the table may be based on the provisioned capacity; e.g., as a consequence of a service level agreement for the work object with the client, the client may (at least in the absence of extraordinary circumstances such as catastrophic events) expect that the service should be able to keep up with work request arrival rates up to the provisioned capacity. In order to be able to support the provisioned capacity, the database service may take various steps such as identifying and utilizing storage devices with adequate storage capacity and performance capabilities to store the table's contents and support desired throughput levels and response times, distributing portions of the table's contents among multiple such devices for workload balancing purposes, and so forth. In such an example scenario, after a provisioned throughput capacity has been determined or set for the table (e.g., if a client's request to create the table with the specified throughput capabilities has been accepted, or a corresponding service level agreement has been approved by the relevant parties), as long as read or write requests directed at the table arrive at a rate of X requests per second or less, the database service may generally be responsible for accepting and executing the requests with reasonable response times. If work requests directed at the object arrive at a rate higher than the provisioned capacity, however, the object may be deemed to be operating in a "burst mode" of operation, and while the service may make a best-effort attempt to accept and execute such burst-mode work requests, some burst-mode work requests may be delayed or rejected. In some embodiments, the provisioned capacity of a given work target may be used internally by the network-accessible service for administrative purposes—e.g., the service may not necessarily reveal the provisioned capacity to a client, even though the provisioned capacity may be used internally to decide such parameters as the mapping of the work target and its workload to various lower-level resources (such as storage devices or servers).

In some embodiments in which a provisioned workload model is employed, work tokens arranged in logical containers or "buckets" may be used to represent available throughput capacity of a resource, and such buckets may thus be used to determine whether a given work request should be accepted for execution. The term "available throughput capacity" may be used herein to represent an estimate or measure of how much additional throughput the resource can provide, given its current workload. For example, a given storage device may be configured with a provisioned capacity of 100 work operations (e.g., reads or writes) per second, and may, during a given second, be supporting a workload of 60 operations per second. In this example, its available throughput capacity may be (100–60), or 40 operations per second. A bucket may be populated (or "refilled") with 100 tokens every second to represent the provisioned capacity in one implementation. As work requests arrive, tokens may be consumed from the bucket, which may be termed a provisioned-capacity bucket—e.g., 60 of the tokens may be consumed in a second in which 60 work requests are received, leaving 40 tokens representing the available throughput capacity. As long as the work request rate remains no higher than the provisioned capacity, the storage device may be considered to be operating normally, or in a normal mode, and a set of parameters applicable to normal operations may be used for admission control. As described below in further detail, if the work request arrival rate exceeds the provisioned throughput capacity (e.g., 100 work operations per second in this example), the storage device may be deemed to be operating in burst mode in contrast to normal mode, and a different set of admission control parameters may be used. The token population of the provisioned capacity bucket may be exhausted, and one or more additional buckets (termed burst-mode buckets) may be used to handle admission control during burst mode. A number of different approaches may be taken to populate and consume the tokens in the burst-mode bucket(s) in different embodiments, e.g., to enable the service to provide best-effort support for burst-mode operations within certain constraints. It is noted that available throughput capacity of a given resource (and hence the workload level corresponding to burst mode operations) may be dependent on any combination of a variety of different factors in different embodiments, such as the capabilities of the underlying hardware or software, and/or policies being implemented to control or limit the throughput at the resource (based on load balancing considerations, fairness considerations, business/pricing considerations, or some combination of factors other than just the native capabilities of the hardware/software).

According to one embodiment, a work target may be deemed to be operating in normal mode as long as the rate of work requests directed to it is at or below the a specified level (e.g., the provisioned capacity of the work target), and may be deemed to be operating in burst mode if the rate of work requests exceeds the specified level. When any given work request is received, the token population of a normal-mode token bucket associated with the work target may be determined. If the token population of the normal-mode token bucket meets a threshold criterion (e.g., if it is more than one, or above some threshold value), this may indicate to the admission controller that the work target is in normal mode. Thus, the admission controller may not need to monitor arrival rates directly to determine the mode of operation in such embodiments—instead, token counts in the normal-mode token bucket may be used for mode determination, potentially reducing the workload of the admission controller relative to scenarios in which arrival rates have to be monitored for admission control. The request may be accepted for execution in normal mode, and one or more tokens may be consumed from the normal-mode bucket.

If, however, the normal-mode bucket population does not meet the threshold criterion, the work target may be deemed to be in. burst mode, or at least a determination may be made that the work target would enter burst mode if the work request were accepted for execution. Accordingly, the admission controller may determine the token population of at least one bucket of a set of burst-mode token buckets. If the token population of the burst-mode token bucket or buckets meets a second threshold criterion (e.g., if a burst-mode token bucket contains at least one token), the work request may be accepted for execution. The population of the burst-mode bucket or buckets may be modified to reflect the fact that the work request has been accepted. In at least one embodiment, the admission controller may consume a particular number of tokens from the burst-mode token bucket(s), e.g., based on an estimate of the amount of work to be performed to complete or satisfy the work request, and/or based on a token consumption policy applicable for burst-mode operations. One or more work operations (e.g., reads or writes in the case of work targets comprising storage or database objects) may be initiated in accordance with the work request after it is accepted.

According to at least some embodiments, if the token population of the normal-mode token bucket does not indicate that the work target is in burst-mode, the normal-mode token bucket alone may be used for admission control (e.g., some number of tokens may be consumed from the normal-mode token bucket for each work request accepted as described above). Thus, the population of the burst-mode bucket(s) may not play a role during normal mode admission control operations in at least some embodiments. In some embodiments, even during normal mode operations, when a work request is accepted, tokens may be consumed from one or more burst-mode buckets as well as from one or more normal-mode token buckets as per the respective token consumption policies of the burst-mode and normal-mode buckets. It is noted that at least in some embodiments, tokens may be added to burst-mode buckets in accordance with the applicable refill policies even during normal mode. If the work target is in burst mode, and the population of the burst-mode bucket or buckets does not meet the second threshold criterion (e.g., if sufficient tokens are not found in the burst-mode buckets to accept the work request), the work request may be rejected, delayed or retried in some embodiments. In at least some embodiments, when sufficient tokens are not available to accept a given work request, the work request may be retried one or more times (e.g., up to a configurable retry count limit) without notifying the client that submitted the request. If the work request is ultimately accepted, the client that issued the work request may experience a higher-than-normal total response time for the request, but may remain unaware that the request was rejected at least once.

As described below in further detail, the normal-mode and burst-mode token buckets may be refilled with tokens according to respective refill policies at various points in time. In one embodiment, a normal-mode token bucket may be refilled at a rate equal to the provisioned capacity of the work target, subject to a maximum token population limit. Such a normal-mode token bucket may be referred to as a provisioned-capacity token bucket in at least some embodiments. One or more burst-mode token buckets may be refilled at a rate proportional to (but not necessarily equal to) the provisioned throughput capacity of the work target in at least some embodiments. Keeping the refill rates of burst-mode buckets proportional to the provisioned capacity of the work target may ensure that different work targets handle burst-mode workloads proportional to their respective provisioned capacity. For example, if client C1 of a database service is paying an amount A1 for a table T1 with provisioned capacity P1, and client C2 is paying A2 for a table T2 with provisioned capacity P2, where P1>P2 and A1>A2, then the burst-mode token bucket(s) for T1 would be refilled at a higher rate than the burst-mode token bucket(s) for T2, so that higher burst rates of work requests are supportable for T1 than for T2, as may be expected since A1>A2.

In some embodiments, the service may utilize different admission control parameters for different types of work request arrival rate bursts. For example, consider a work target W implemented by a service S with a provisioned capacity P operations per second. Work request arrivals at a rate greater than P per second may be categorized as bursts. However, not all bursts may impact the service S in the same way. If the client submits work requests at a rate of 100 P per second, for example, service S may only be able to handle the requests for a very short duration without negatively impacting other clients or running out of resources. If the client submits work requests at the rate of 2 P per second, however, the service may be able to handle the requests for a longer period. Accordingly, in one embodiment, a plurality of burst-mode token buckets may be set up, such as a peak-burst bucket to handle sharp short-term peaks in arrival rates, and a sustained-burst bucket to handle longer bursts with lower maximum request rates. The combination of the peak-burst token bucket and the sustained-burst token bucket may be referred to as a "compound" token bucket (or compound bucket) herein. The admission controller may, in such an embodiment, determine a peak burst rate at which work requests directed to the work target are to be accepted for execution, and a peak burst window size indicative of a maximum duration for which work requests at the peak burst rate are to be accepted. In addition, the admission controller may determine a sustained burst rate smaller than the peak burst rate, and a sustained burst window size greater than the peak burst window size, where the sustained burst window size is indicative of a maximum duration for which work requests directed to the work target at the sustained burst rate are to be accepted. While the window sizes may generally be indicative of the durations for which respective burst rates can be sustained under certain conditions (e.g., assuming no refills during the burst) in some embodiments, in practice the achieved durations may not exactly match the window sizes (e.g., because refill operations may in fact be performed during the bursts). The maximum token populations of the two burst-mode buckets may be set based on their respective maximum burst rates—e.g., in one implementation, the maximum token population of the peak-burst bucket may be set to the product of the peak burst rate and the peak burst window size, while the maximum token population of the sustained-burst bucket may be set to the product of the sustained burst rate and the sustained burst window size. Both buckets may be used for admission control during burst mode operations—e.g. in response to receiving a work request directed at the work target, the admission controller may accept the work request for execution based at least in part on the respective token populations of the peak-burst token bucket and the sustained-burst token bucket. In at least some embodiments, different consumption rates and/or different refill rates may apply to the peak-burst bucket and the sustained-burst bucket.

By using the compound bucket technique, the admission controller may be able to support very high burst rates for short durations, and lower burst rates for longer durations in such embodiments. Consider an example scenario in which the provisioned capacity (pr) of a work target is 100 operations/second (100 ops/sec), the peak burst rate (pbr) associated with a peak-burst bucket PBB is 1000 ops/sec, the peak burst window size (pbw) is 6 seconds, the sustained burst rate (sbr) associated with a sustained-burst window SBB is 200 ops/sec, and the sustained burst window size (sbw) is 60 seconds. Assume further that the maximum population of the peak-burst bucket (PBB-max) is set to the product of pbr and pbw (1000*6, or 6000 tokens), and the maximum population of the sustained burst bucket (SBB-max) is set to the product of sbr and sbw (200*60, or 12000 tokens). Consider a burst of work requests B that begins at time T (i.e., in this example scenario, the admission controller has determined that the normal-mode bucket has insufficient tokens at time T for normal mode operations, so burst-mode parameters apply). Assume for ease of explanation that PBB is refilled with 200 tokens every second (subject to the PBB-max limit) and SBB is refilled with 100 tokens every second (subject to the SBB-max limit), and that the work target remains in burst-mode for this example. Each work request is assumed to result in one actual work operation (e.g., a read or a write), and one token is to be consumed from each of burst-mode buckets, PBB (the peak-burst bucket) and SBB (the sustained-burst bucket) to accept a given request. Both PBB and SBB are assumed to be full at time T: PBB has 6000 tokens, and SBB has 12000 tokens.

First, consider a scenario in which the burst B consists of arrivals at 1000 requests/sec. After one second, at time T+1, the population of PBB would be (6000−1000+200)=5200, because PBB started with 6000 tokens, 1000 tokens were consumed due to the arrivals, and 200 were added in accordance with PBB's refill policy. Similarly, at time T+1, SBB's population would be (12000−1000+100)=11100. Every second for the next few seconds while requests arrive at 1000 requests/second, PBB's net population would fall by 800 tokens, while SBB's would fall by 900. Accordingly, the token populations of PBB (termed pop(PBB)) and SBB (termed pop(SBB)) would decline as follows: at time T+2: pop (PBB)=4400, pop(SBB)=10200; Time T+3: pop(PBB)=3600, pop(SBB)=9300; Time T+4: pop(PBB)=2800, pop(SBB)=8400; Time T+5: pop(PBB)=2000, pop(SBB)=7500; Time T+6: pop(PBB)=1200, pop (SBB)=6600; Time T+7: pop(PBB)=400, pop(SBB)=5700.

During the second following T+7, assuming that burst B continues at 1000 requests per second, PBB would run out of tokens in this example, and at least some requests would be rejected (even though SBB still has enough tokens). Thus, the high arrival rate bursts of 1000 requests per second would only be sustainable for approximately 7-8 seconds in this example.

In contrast, consider a scenario in which the burst B comprises 200 requests per second. Every second, PBB would lose no net tokens−200 would be consumed, and 200 would be refilled. Every second, SBB (which starts with 12000 tokens) would lose 100 tokens: 200 would be consumed, 100 would be refilled. Accordingly, it would take approximately 12000/100=120 seconds to exhaust SBB, and so a burst of 200 requests/second would be sustainable for approximately 120 seconds with the assumed parameter settings. Thus, a smaller burst rate of 200 requests/sec would be accommodated for a much longer time than a sharp burst of 1000 requests/sec in this example scenario. In practice, in various embodiments, the arithmetic may get more complicated, e.g., because the normal-mode buckets may come into play as they get refilled, the burst-mode arrival rates may not remain flat as assumed, and other factors (such as consumption policies that require different numbers of tokens for different types of requests) may have to be taken into account.

In some embodiments, respective burst-mode buckets may be used for different categories of work requests—e.g., in a storage or database service environment, one or more burst-mode buckets may be maintained for read operation requests, and one or more burst-mode buckets may be maintained for write operation requests. In one embodiment in which a provisioned-capacity bucket is used, if after a certain time interval some tokens of the provisioned-capacity bucket remain unused, the unused tokens may be "banked" or logically transferred to one or more burst-mode buckets, so that at least in principle the client may be able to utilize the unused provisioned-capacity tokens during bursts. In some embodiments, a set of burst-mode token buckets may be used to take into account the throughput capacity limitations of one or more shared resources. For example, if a database table partition is located on a shared storage device on which other tables' partitions are also located, in addition to using burst-mode buckets as described above, a shared-resource capacity bucket may be used to represent the available throughput capacity of the shared storage device, and in order to accept a work request, tokens may be consumed from the shared-resource capacity bucket as well. In some embodiments, the number of tokens consumed to accept a given work request may be based on an estimate of the work required for the request, and if the initial estimate is found to be inaccurate, tokens may be consumed (or added) to various buckets when the actual amount of work performed becomes known. Details regarding these and various other aspects of token-based admission control policies for burst-mode operations are provided below.

In the case of some types of storage-related network-accessible services, a given client's data set may be distributed between multiple work targets for which admission control is performed independently using respective sets of token buckets in some embodiments. For example, a database service may organize a large table as a set of N partitions, with token-based decisions as to whether work requests directed to a given partition are to be accepted being made independently with respect to other partitions. In such embodiments, the problem of non-uniformity of client workloads may have an added spatial dimension, in addition to the dimension of temporal non-uniformity. That is, when the combined workload for all the client's data is considered, it may be the case that not only are work requests distributed non-uniformly over time (i.e., that during some time periods, work request arrive at much higher rates than during other time periods), but work requests are also distributed non-uniformly over data space (i.e., that some subsets of the client's data are accessed and/or updated more frequently than others). In some example scenarios of spatial non-uniformity, it may be the case that at least for some time periods, the number of tokens available at one data partition P1 owned by a given client C1 is much higher than at another data partition P2 owned by the same client C1, while the workload is much higher at P2 than at P1. This may lead to work requests being rejected at the heavily-accessed partition, even though, when all the client's partitions are considered as a whole, there may have been enough tokens available to avoid the rejections. Accordingly, in at least some embodiments, a mechanism for token sharing among a group of work targets may be implemented.

In one embodiment in which token sharing is implemented, a plurality of work targets may be configured with respective token buckets for admission control. An iteration of a token sharing protocol may begin when a determination is made that a token sharing evaluation criterion has been met at a particular work target WT1. That is, WT1 may be configured to evaluate whether it is worthwhile for it to attempt to obtain additional tokens from one or more other work targets, or to transfer tokens to one or more other work targets. Different criteria to initiate such evaluations may be used in different embodiments—e.g., in some embodiments, each work target may be configured to evaluate token sharing once every X seconds or minutes by default; in other embodiments, a given work target may be configured to evaluate token sharing if the token count in some set of its token buckets falls below a threshold or rises above a different threshold, or if a rejection rate for work requests rises above a threshold.

As part of the evaluation process, in some embodiments the work target WT1 may identify a second work target WT2 with which token population information pertaining to some set of token buckets is to be exchanged. For example, token population counts of a burst-mode token bucket may be exchanged between WT1 and WT2 in one implementation. Based at least in part on a comparison of the token counts, the two work targets may determine whether some number of tokens should be shared or transferred—e.g., the work target with more tokens may agree to provide some tokens from a source bucket to a destination bucket at the work target with fewer tokens. If a decision to transmit tokens is made, the population of the destination bucket may be increased by some number of tokens Nt, and the population of the source bucket may be increased by Nt. After the tokens have been transferred, admission control decisions may be made using the newly modified token populations at both participating work targets. The participants in the token sharing protocol may be termed "token sharing peers", and the group of work targets that participate in the protocol may be termed a "token sharing group" or a "token sharing peer group" herein. The token sharing protocol steps (e.g., the evaluation steps of the protocol and the token sharing steps) may be performed iteratively, e.g., based on triggering conditions being met, at randomly selected times or in accordance with a deterministic schedule in some implementations. Different work target pairs may participate in different iterations in at least some embodiments—that is, not all the work targets of a tokens haring peer group may be involved in a given iteration of the protocol. In some embodiments, the token sharing protocol may be implemented collectively by the admission controllers of the work targets of the token sharing group.

Membership in a token-sharing group may be based on any of several factors in different embodiments. In some embodiments, tokens may be shared only among partitions of a single database table. In other embodiments, tokens may be shared among all the partitions of a set of tables owned by the same client, or by some set of cooperating clients. In one embodiment in which a non-relational database service implements secondary indexes for a given base table using derived tables, as described below in further detail, token sharing may be implemented among the partitions of the base table and the partitions of the derived table(s). In some embodiments, clients may be enabled to explicitly specify the member work targets of a token sharing group, while in other embodiments, the service rather than the clients may determine token sharing membership. Similarly, the specific types of token buckets among which token sharing is used may differ in different embodiments—e.g., in some embodiments, tokens may be shared by work targets among burst-mode token buckets only, while in other embodiments, tokens may also or instead be shared among normal-mode buckets.

In some embodiments in which different work targets are assigned respective provisioned throughput capacities, a number of work targets, such as table partitions belonging to different clients, may share a single resource such as a storage device. The shared resource may itself have a throughput limit TL, which may typically be higher than the combined provisioned capacities (PCs) of the set of work targets sharing the resource. To avoid overloading the shared resource, for example, the network-accessible service being implemented at the work targets may have configured the work targets in such a way that their combined provisioned capacities do not exceed the throughput limit of the shared resource upon which the work targets rely to complete client work operations. The work targets in such a scenario may be referred to as members of a "resource sharing group". Each such work target may have an associated set of token buckets, such as one or more normal-mode token buckets and one or more burst-mode token buckets.

With respect to the maximum throughput sustainable by the shared resource, in at least some implementations, a buffer of excess capacity relative to the combined provisioned capacities of the resource sharing group may thus be maintained. That is, even when all the work targets of the resource sharing group receive work requests at their provisioned capacity, the shared resource may be able to handle additional load. In some cases, e.g., when one or more of the work targets of the resource sharing group experience bursts of high work request arrivals that they cannot handle, it may be useful to distribute some number of additional tokens to the resource sharing work targets (e.g., beyond the number of tokens already generated for the work targets based on their respective bucket refill polices). The additional tokens may be considered to represent at least a portion of the excess capacity buffer of the shared resource. It is noted that such "excess" tokens may not necessarily be associated with any given bucket prior to the time when the decision to distribute them is made: i.e., new tokens may be generated for distribution in at least some embodiments. In other embodiments, the excess tokens may be present in a bucket explicitly representing the shared resource's throughput capacity. When distributing such excess tokens, the provider of the network-accessible service may wish to ensure some level of fairness in the distribution, so that, for example, a given client's work target WT1 is not given special treatment by being allowed to accumulate all the excess tokens, while another client's work target WT2 sharing the same resource is not provided any excess tokens. A number of different fairness-related factors may have to be taken into account when distributing the excess tokens. For example, in one embodiment, the excess tokens may be distributed among the work targets based on the respective provisioned capacities of the work targets, and/or based on the recent work request arrival rates at the work targets.

As indicated above, according to at least some embodiments, a number of work targets of a network-accessible service (such as database table partitions of a database service) may be configured to utilize a shared resource (such as a shared storage device) in response to accepted work requests. Each such work target may have a respective set of token buckets set up for admission control of arriving work requests; that is, a decision as to whether to accept or reject a work request for execution at a given work target may be based on the token population of one or more buckets of that work target. A service management component, such as a token distributor associated with the shared resource, may be configured to perform token distribution iteratively in some embodiments, with each cycle or iteration initiated according to some schedule, or based on the detection of some triggering conditions. In at least some embodiments, the toke distributor may determine, for a given time period corresponding to an iteration of the token distribution protocol, the combined number of excess tokens to be distributed among the buckets of the resource sharing work targets. The combined number may, for example, be a function of the difference between the throughput limit of the shared resource, and the sum of the provisioned capacities of the work targets.

The tokens may be distributed among the work targets based on a combination of several factors in different embodiments. In some embodiments, the specific number of tokens provided to different work targets may be computed as another function, based at least in part on the relative arrival rates and the relative provisioned capacities of the work targets. The arrival rates of work requests at each work target of the resource sharing group may be monitored, and some statistical metric of arrival rates over time may be computed, such as the mean arrival rate over each successive five-minute interval. For a given token distribution iteration, the arrival rates metrics for some number of recent intervals may be used for the computation—e.g., for a given five-minute token distribution iteration, the arrival rate ratios for the previous five-minute period may be taken into account, or the arrival rate ratios of the last K five-minute intervals may be taken into account. The combined number of tokens may then be distributed to one or more of the work targets (e.g., by increasing token population of one or more buckets of the work targets, such as their respective burst-mode buckets) based on the arrival rate ratios and on the provisioned capacity ratios. The adjusted token bucket population(s) resulting from the distribution may be used for admission control at the work targets.

It is noted that at least in some cases, for a given iteration, the distributor may decide not to distribute any excess tokens at all—e.g., if the sum of the provisioned capacities of the work targets was found to be close to the peak throughput supported by the shared resource, or if the arrival rates were very low. Over time, the relative weights assigned to the arrival rate metrics and/or the provisioned capacity metrics in the token distribution mechanism may be adjusted, or the functions that govern token distribution may be adjusted, e.g., based on how successful the distribution mechanism is found to be in reducing or avoiding work request rejections at the different work targets. In some embodiments, excess tokens may be added to only burst-mode buckets, while in other embodiments, tokens may be added to normal mode buckets as well or instead. Combinations of factors other than work request arrival rates and provisioned capacities may be used for fair distribution of excess shared resource capacity in some embodiments. In at least some implementations, the throughput limits of more than one shared resource may be taken into account when determining whether and how many tokens are to be distributed.

In at least some embodiments, clients utilizing the network-accessible services at which token-based admission control is used may be billed different amounts for normal-mode operations than they are for operations performed during burst mode, or for operations (such as token sharing and excess token distributions) that may be performed in anticipation of future bursty workloads. Respective pricing policies may be associated with token consumption and/or transfers at normal-mode buckets and at burst-mode buckets in some such embodiments. In some embodiments, a pricing manager component of the service may be responsible for defining and, in collaboration with (or as part of) the admission controller, implementing pricing polices associated with token population changes in various buckets under various conditions. In one embodiment, a token pricing policy to be applied to a particular token bucket may be determined (e.g., based on a selection of the pricing policy by a client, or based on internal configuration settings of the service), where the pricing policy defines the types of token population changes to which it applies, one or more applicability criteria (e.g., whether the policy applies only during certain time windows, or whether the policy only applies when some bucket populations fall below a specified threshold during burst-mode operations), and a formula or function that may be used to compute the pricing amount to be charged to a client for a particular change to the token population. Clients may be charged different amounts for different categories of token population changes in some embodiments—e.g., in one case, a client may be charged one rate for the consumption of any token from a particular burst-mode bucket B1, and a different rate if a token is transferred from bucket B2 to bucket B1. In at least one embodiment, clients may be charged different amounts based on how many (and what types of) token buckets are used for admission control—for example, a client that wishes to support multiple types of burst-mode behavior using compound token buckets may be charged more than a client that is willing to use a simpler technique that uses fewer burst-mode buckets. The pricing manager may record the changes to various token bucket populations over time, e.g., during various periods of burst mode operations. Client billing amounts may be generated based on the recorded population changes.

In at least one embodiment, a network-accessible service may implement a token marketplace, e.g., by implementing programmatic interfaces (such as one or more web pages, web sites, graphical user interfaces, command-line tools and/or APIs) that clients may use to buy, sell or exchange tokens usable for admission control during burst modes and/or normal modes of operation. In some such marketplaces, for example, clients that are aware that some of their tokens may not be used during a given future time period may advertise the availability of the tokens for bidding using an auction mechanism. Other clients that may need to support higher workloads than they initially anticipated (and hence higher workloads than their work targets' provisioned capacity) may bid for, and (if the bid is successful) purchase the tokens from the seller. The pricing manager and/or other components of the network-accessible service may facilitate such auctions and other marketplace transactions, keep track of the token transfers and prices, and incorporate the marketplace transactions as appropriate in the billing amounts generated for the clients in at least some embodiments. Additional details regarding various aspects of the functionality of the pricing manager and associated components are also provided below.

Example System Environment

Figure 1B:
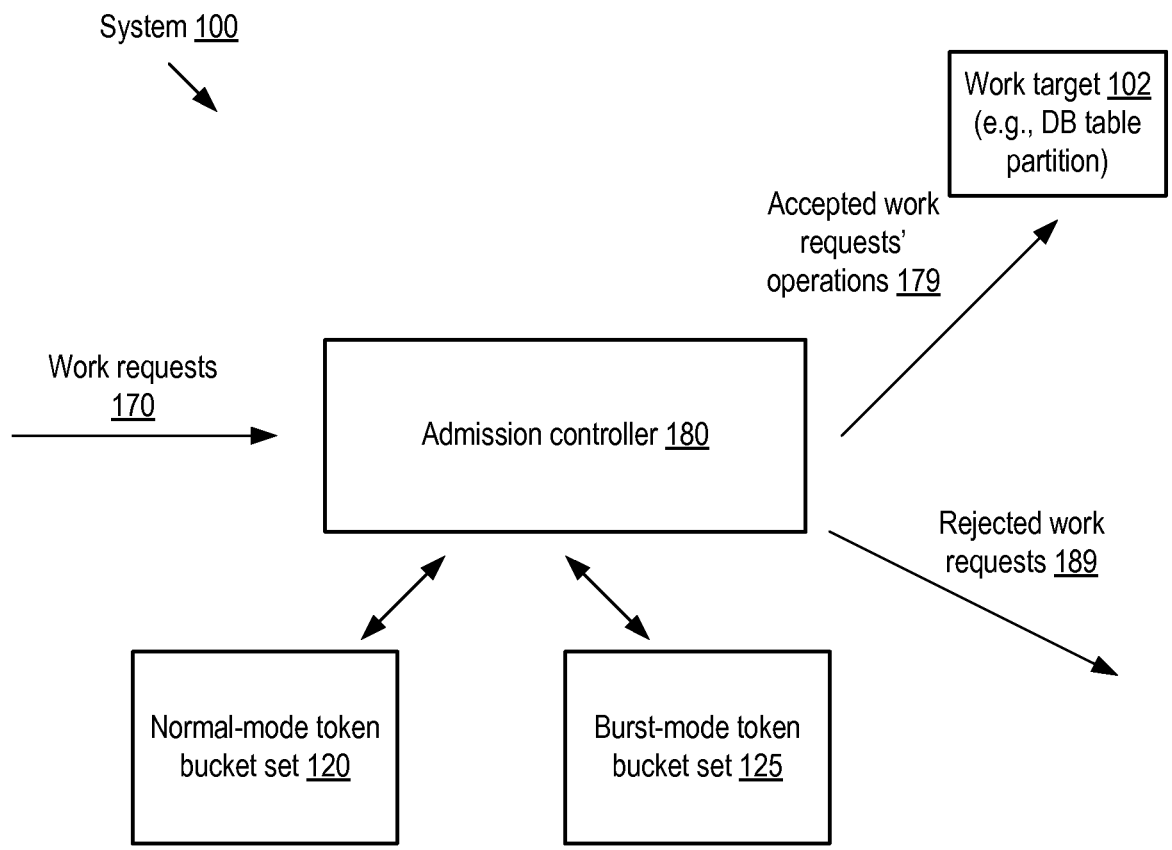
FIG. 1b illustrates a system in which token buckets may be used to make admission control decisions in the presence of such variations, according to at least some embodiments.

FIG. 1a illustrates an example of work request arrival rate variations, and FIG. 1b illustrates a system in which token buckets may be used to make admission control decisions in the presence of such variations, according to at least some embodiments. In FIG. 1a, the X-axis represents time, while the Y-axis represents the arrival rate 110 of work requests directed to a work target such as a storage object or a database table of a network-accessible service. A given work request may indicate that the requesting client wishes to perform a set of specified logical or physical operations associated with the work target—e.g., a single work request may translate to one or more read operations on a portion of the work target, one or more modification operations, a set of computations, insertions or removals from a work queue, or some combination of such operations. In at least some embodiments, the client may indicate a relatively high-level logical operation in a work request, and the service implementing the work target may be responsible for determining some corresponding set of lower-level physical or logical operations that would need to be performed if the work request were accepted. FIGS. 1a and 1b illustrate arrival rates and admission control for an average or typical category of work requests at a work target; arrival rates may in general be plotted separately for different categories of work requests, and respective admission control parameters may be used for different work request categories, as described below in further detail. The provisioned capacity 112 of the work target (assuming uniform or average work requests) is represented in FIG. 1a by a horizontal line that intersects the Y-axis at "pr". The arrival rate may be monitored for a series of time intervals (e.g., for each second, the number of work requests arriving may be measured and the requests/second may be plotted on a graph) such as FIG. 1a. As shown, the arrival rate of work requests varies over time. During some time periods, the arrival rate is less than the provisioned capacity pr, and the work target is deemed to be in normal mode during those time periods, such as normal periods N1, N2 and N3. During periods when the arrival rate exceeds pr, the work target may be deemed to be in a burst mode of operation, such as during burst periods B1 and B2.

The network-accessible service may be obligated (e.g., contractually obligated by a service level agreement) to support work request rates of up to pr in some embodiments. As shown in FIG. 1b, admission controller 180 of the service may be configured to use a normal-mode token bucket set 120 comprising one or more buckets to make admission control decisions during normal mode. During burst modes, the admission controller 180 may utilize a burst-mode token bucket set 125, comprising one or more other token buckets, for admission control, with a different set of parameters than apply to the normal-mode buckets. In at least one embodiment, when a work request 170 is received, the admission controller may first determine the token population of a normal-mode bucket. If the normal-mode bucket token population is below a threshold (e.g., less than N, where N tokens are to be consumed in order to accept the work request 170), the admission controller may conclude that the work target 102 is in burst mode or that the work target 102 would enter burst mode if the work request 170 is accepted for execution.

Upon determining, e.g., using the normal-mode bucket set, that burst-mode parameters are to apply, the admission controller 180 may determine the token populations of at least one bucket of the burst-mode token bucket set 125 in the depicted embodiment. If the population meets a particular criterion, e.g., if N tokens are available within at least one burst-mode token bucket, the work request 170 may be accepted for execution, and one or more operations 179 corresponding to the accepted work request may be initiated. If the token population of the burst-mode bucket set 125 does not meet the particular criterion, the work request 170 may be rejected, as indicated by the arrow labeled 189. In various embodiments, a respective set of parameters and policies may apply to each token bucket of the normal-mode bucket set 120 and the burst-mode bucket set 125—for example, different buckets may have different token consumption policies (indicating how many tokens are to be consumed under various circumstances) and different token refill policies (indicating the circumstances in which tokens are to be added, and the number to be added at a time). In general, in the depicted embodiment, the service and the admission controller 180 may be obligated to support normal mode operations, and make a best effort to accept and complete the client's requests during burst mode operations.

It is noted that techniques such as those described above, employing token buckets for admission control, may be used in some embodiment in which work targets do not necessarily have respective provisioned throughput capacities defined, e.g., in which service level agreements do not oblige the service provider to support some explicitly-specified throughput level for some or all work targets. For example, in one embodiment, a service provider may simply define burst mode as occurring whenever a work request arrival rate exceeds R operations per second, and may use burst-mode token buckets for admission control under such conditions. Thus, in different embodiments, the approach taken to determining whether a work target is in burst mode or not may differ; in some cases, a provisioned throughput capacity may define the boundary between normal mode and burst mode, while in other embodiments, other definitions of burst mode may be used.

Overview of Token-Based Admission Control

Figure 2:
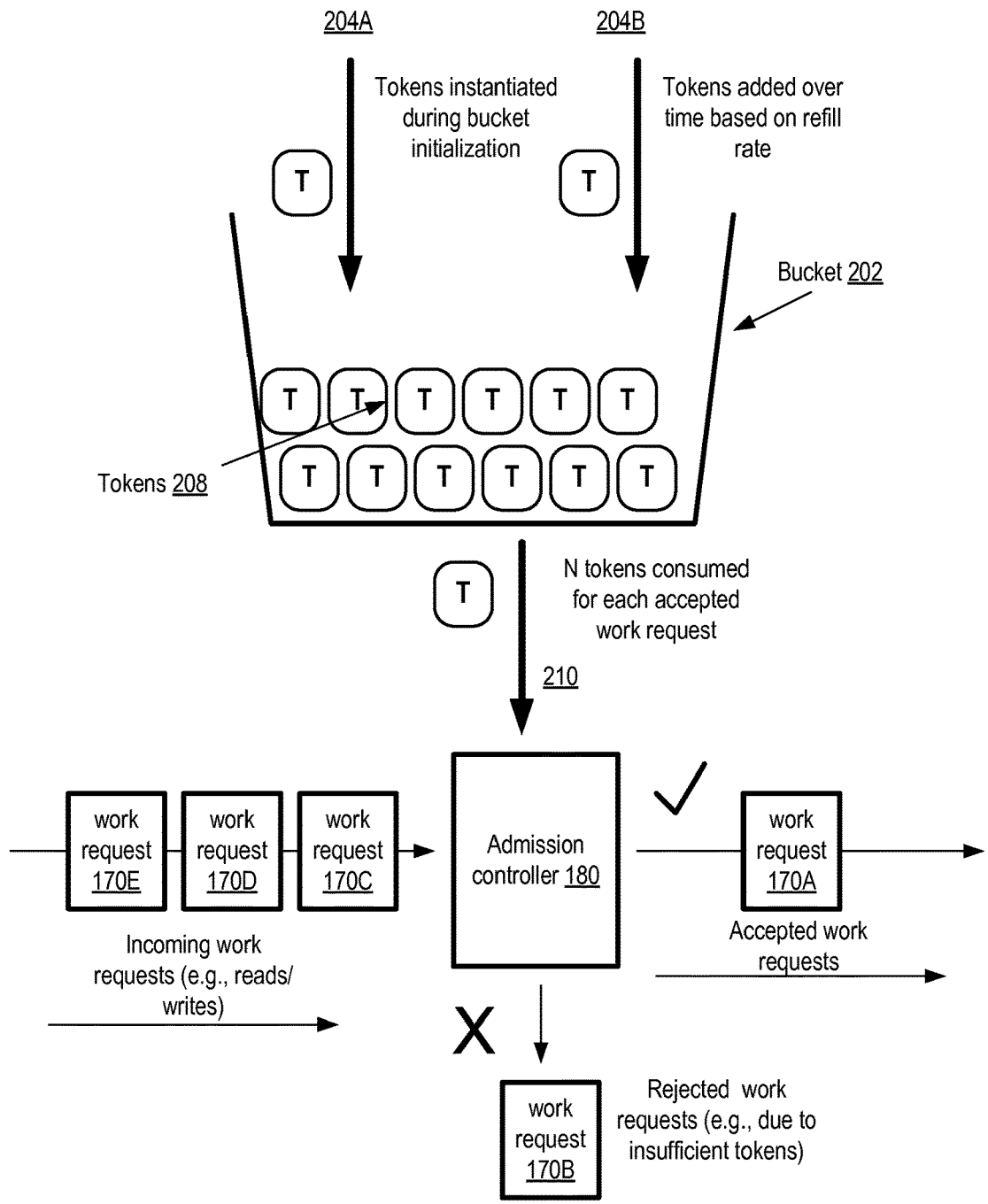
FIG. 2 provides a high-level overview of a token based admission control mechanism, according to at least some embodiments.

FIG. 2 provides a high-level overview of a token based admission control mechanism, according to at least some embodiments. A mechanism that uses a single bucket 202 of tokens is illustrated for simplicity of presentation; as noted above, combinations of multiple buckets may be used in some embodiments, such as one or more buckets meets for normal-mode admission control, and one or more buckets for burst-mode admission control. According to the mechanism, a bucket 202 (e.g., a logical container which may be implemented as a data structure within a software program in at least some embodiments) set up for admission control purposes associated with a particular work target 102 such as a data object, object partition, or partition replica, may be populated with an initial set of tokens 208 during bucket initialization, as indicated via arrow 204A. The initial population may be determined, e.g., based on expectations of the workload, service level agreements, a provisioning budget specified by the client that owns or manages the corresponding data object, or some combination of such factors in various embodiments. For some types of buckets the initial population may be set to zero in some embodiments. In some implementations the initial population of at least one bucket may be set to a maximum population for which the bucket is configured.

When an indication of a new work request 170 (such as a read request or a write request in the case of a storage object or database object) is received at the admission controller 180, the admission controller may attempt to determine whether some number N of tokens (where N may be greater than or equal to 1, depending on implementation or on configuration parameters) are present in the bucket 202 in the depicted embodiment. If that number of tokens is available in the bucket, the work request 170 may be accepted or admitted for execution, and the tokens may be consumed or removed from the bucket (arrow 210). Otherwise, if N tokens are not present, the work request 170 may be rejected. In the illustrated example, work request 170A has been accepted, work request 170B has been rejected, and work requests 170C, 170D and 170E are yet to be considered by the admission controller 180.

As shown by the arrow labeled 204B, the bucket 202 may also be refilled or repopulated over time, e.g., based on configuration parameters such as a refill rate associated with the bucket, as described below with reference to FIG. 3. In some implementations, token refill operations may accompany, or be performed in close time proximity to, consumption operations—e.g., within a single software routine, N tokens may be consumed for admitting a request, and M tokens may be added based on the refill rate and the time since the bucket was last refilled. Some buckets may also be populated based on the number of unused tokens in other buckets in some scenarios, as also described below. Limits may be placed on the maximum number of tokens a bucket may hold in some embodiments, and/or on the minimum number of tokens, e.g., using configuration parameters. Using various combinations of configuration parameter settings, fairly sophisticated admission control schemes may be implemented in different embodiments, especially when multiple buckets are used together to control admissions to a given object or resource.

In one simple example scenario, to support a steady load of 100 work requests per second, bucket 202 of FIG. 2 may be configured with an initial population of 100 tokens, a maximum allowable population of 100 tokens and a minimum of zero tokens; N may be set to 1, and the refill rate may be set to 100 tokens per second, and one token may be added for refill purposes (assuming the maximum population limit is not exceeded) once every 10 milliseconds. As work requests 170 arrive, one token may be consumed for each work request. If a steady state workload at 100 work requests per second, uniformly distributed during each second, is applied, the refill rate and the workload arrival rate may balance each other. Such a steady-state workload may be sustained indefinitely in some embodiments, given the bucket parameters listed above.

If, extending the above example, the arrival rate and/or the refill rate is not uniform, scenarios may arise in which the bucket 202 remains empty for some (typically small) time intervals (e.g., if some set of work requests in rapid succession consume more tokens than the refill mechanism is able to replace). In such a case, if only a single bucket 202 were being used for admission control, an arriving work request may be rejected (or retried after a delay). In order to deal with temporal non-uniformity of workloads, various techniques may be employed in different embodiments, such as the use of additional burst-mode token buckets as described with reference to FIG. 1b.

Figure 3:
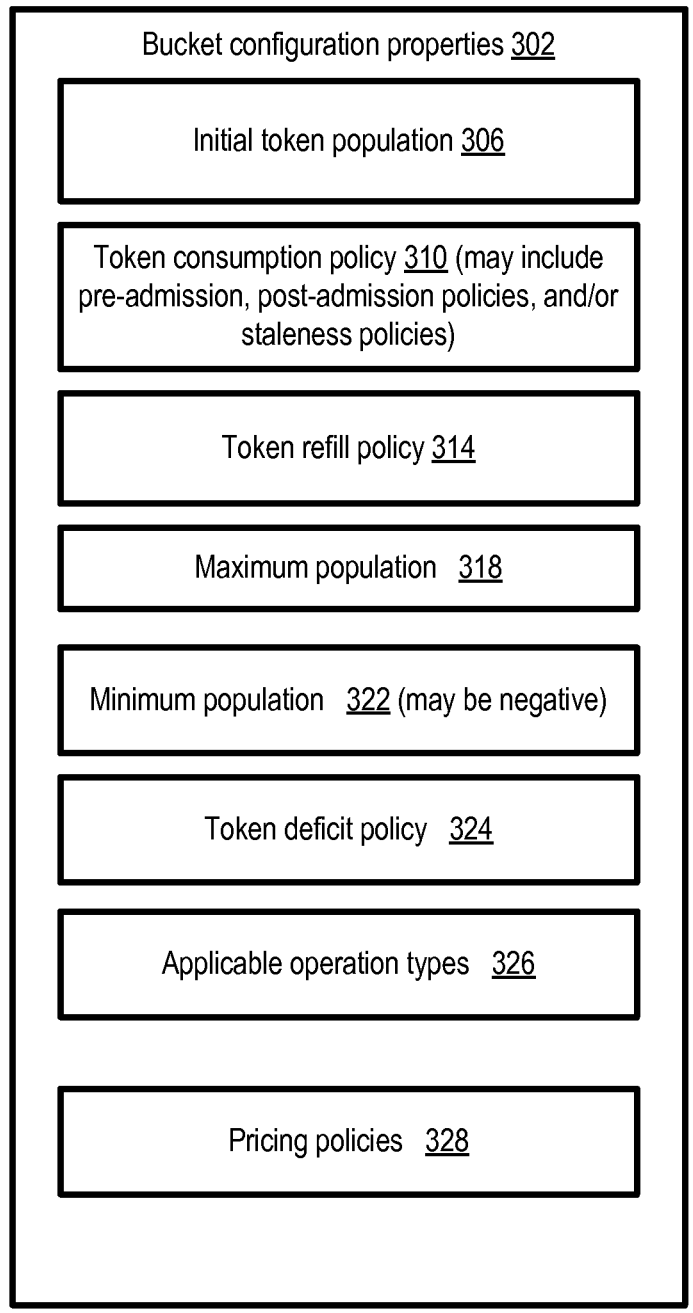
FIG. 3 illustrates example configuration properties of a token bucket used for admission control, according to at least some embodiments.

FIG. 3 illustrates example configuration properties 302 of a token bucket, such as bucket 202, which may be used for implementing various types of admission control policies, according to at least some embodiments. In some implementations, the token bucket may be implemented as an in-memory data structure of the admission controller 180, and may be written to persistent storage as needed. Such a data structure may comprise fields representing the current token population, when the population was last modified, and/or values for various parameters and policies indicated in FIG. 3.

A token consumption policy 310 may indicate how tokens are to be consumed for admission control. In some embodiments, the consumption policy 310 may include different pre-admission policies and post-admission policies, and/or may be dependent on the state of other buckets or the mode of operation of the work target. For example, in one embodiment, two buckets may be used for admission control to a given work target: a provisioned-capacity bucket PB (e.g., in a normal-mode bucket set 120) and a burst-mode bucket BB (e.g., in a burst-mode bucket set 125). According to the pre-admission policy in effect in this example, to admit a new request, PB's population may be checked to determine whether at least one token is present, and according to the post-admission policy, if the request is admitted, PB's population may be reduced by one. If PB has a token, BB's population may not need to be checked prior to admitting the request. However, in accordance with the post-admission policy in effect in some embodiments, one token from BB may nevertheless be consumed if the request is accepted. In contrast, continuing the example, if PB does not have any tokens, the work target may be deemed to be in burst mode, and BB's population may be checked to determine whether BB has at least one token. In burst mode, the request may be admitted only if BB has a token available, and if the request is admitted, a token may be consumed from BB. (In some implementations, in burst mode, the token population of PB may also be decremented upon a request admission, potentially making PB's population negative.) In some embodiments different numbers of tokens may be consumed for different types of operations from a given bucket based on its consumption policy. In some embodiments, a token consumption policy may also specify a decay-during-idle parameter indicating whether (and at what rate) tokens are to be deleted from the bucket if the corresponding data object is not targeted for work requests for some time, or a transfer-upon-idle parameter indicating whether tokens should be transferred from one bucket to another if they are not used during some time interval. In one embodiment, a staleness policy may be used to consume tokens that have not been consumed for a specified time interval—e.g., each token may be associated with a validity lifetime after which the token may no longer be useful for admission control purposes. The token policies (and various other policies such as those described below) applicable to a given category of bucket may be identified by a name based on the category herein—e.g., a consumption policy applicable to a normal-mode bucket may be referred to as a normal-mode consumption policy, while a consumption policy applicable to a burst-mode bucket may be referred to as a burst-mode consumption policy.

Figure 17:
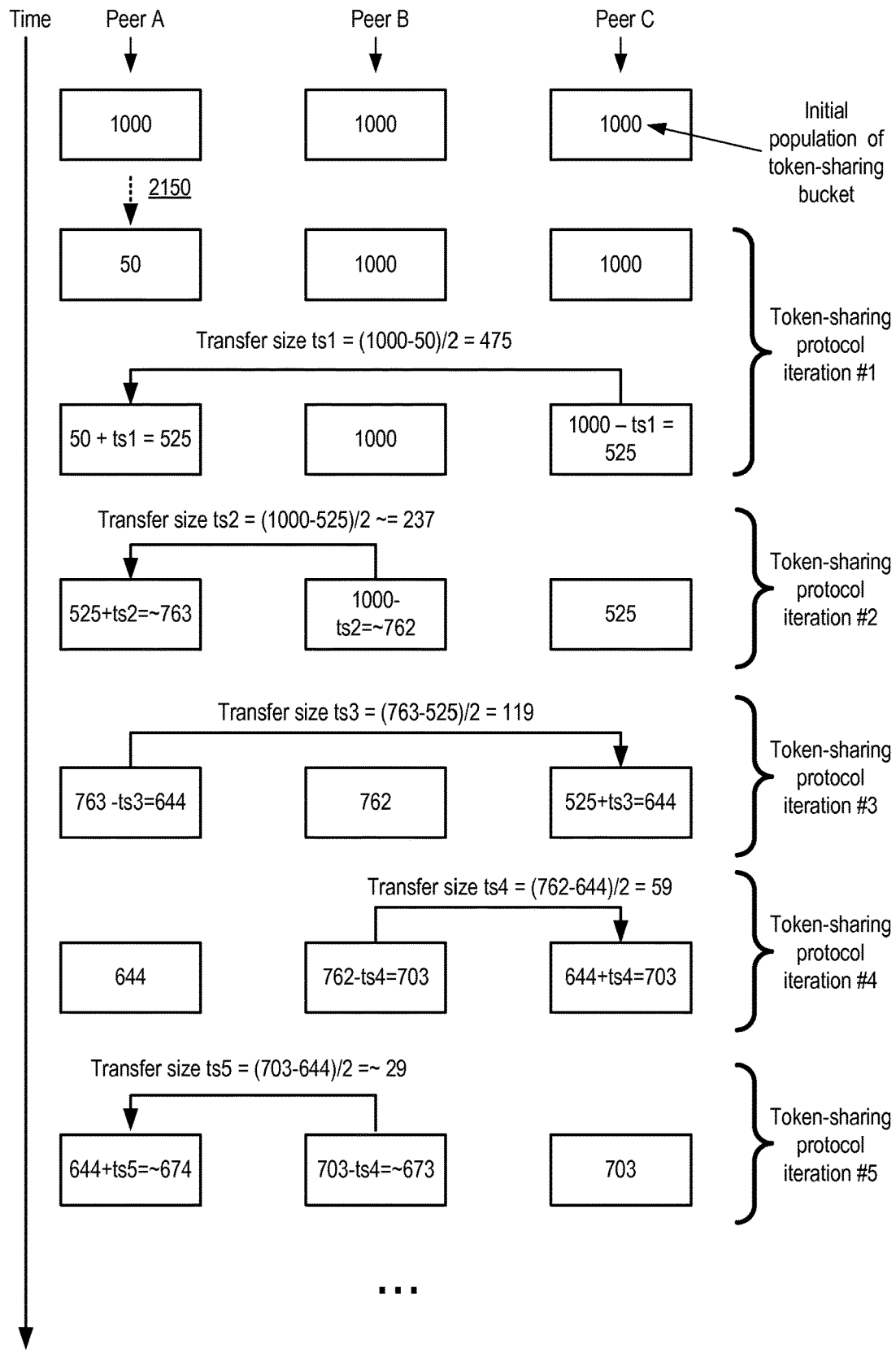
FIG. 17 illustrates example iterations of a token-sharing protocol that may be implemented to alleviate effects of spatial non-uniformity of data access, according to at least some embodiments.

Properties 302 may include an initial token population parameter 306 in the depicted embodiment, which indicates how many tokens are to be placed in the bucket at startup or initialization. Token refill policy parameter 314 may indicate at what rate, and/or under what circumstances, tokens are to be added to the bucket, e.g., to help sustain a rate of work for which the work target associated with the bucket has been configured. In some embodiments, one or more of the parameters of the bucket may be changed over time—e.g., a default refill rate may apply to the bucket, but under certain conditions a non-default rate may be used. Maximum population parameter 318 may indicate the maximum capacity of the bucket, while minimum population parameter 322 may indicate the lower bound for a bucket's population. In some implementations, a bucket's population may be deemed to become negative (e.g., the minimum population may be less than zero) under some circumstances. For example, in one embodiment in which the work target supports I/O operations such as reads and writes, the admission controller 180 may assume or estimate, for simplicity, that incoming client requests will each result in approximately one actual I/O operation. However, after an operation request R has been accepted, in some cases the actual amount of work needed as a result of admitting R may be substantially greater than the assumed one I/O: for example, a read request expected to be fulfilled by one read may end up in a scan of a table that requires 1000 reads. In such scenarios, in order to ensure that the impact of the unanticipated extra work is reflected in subsequent admission control decisions, a number of tokens corresponding to the extra work (e.g., 1000−1=999 tokens) may be deducted from the bucket, which may at least temporarily cause the token count to become negative. The token count may re-enter positive territory eventually, e.g., based on the bucket's refill rates and incoming request rates. A token deficit policy parameter 324 may specify rules about the conditions under which token deficits (or negative populations) are allowed, how long deficits are allowed to remain, what actions have to be taken to recover from a deficit, and so forth. In some embodiments, different types of operations may have different admission control rules, and the types of operations for which the bucket is to be used may be specified in applicable operation types parameter 326. In at least some embodiments, one or more pricing policies 328 that may be used to determine the amounts that clients are to be charged for the use of the bucket's tokens may be indicated in the bucket properties. Examples of the kinds of elements that pricing policies 328 may include are illustrated in FIG. 17 and described in further detail below. In different embodiments, only a subset of the example parameters shown in FIG. 3 may be employed, while in other embodiments, additional bucket configuration parameters beyond those shown in FIG. 3 may be used. Values and/or settings for various properties shown in FIG. 3, as well as other admission control settings such as whether burst mode operation is to be supported, may be programmatically set or modified (e.g., using web service calls) in at least some embodiments.

Banking Unused Tokens

Figure 4:
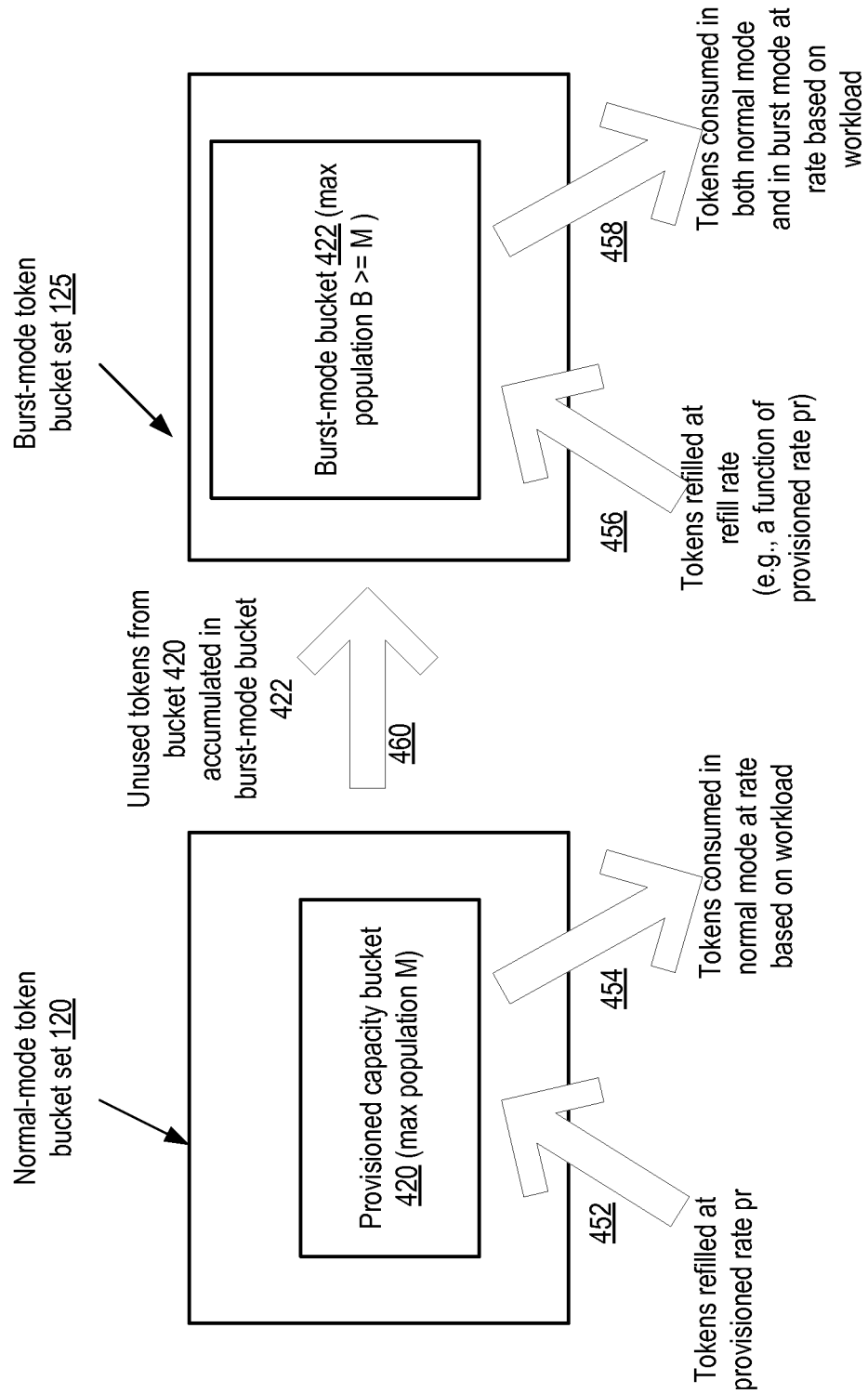
FIG. 4 illustrates an example of the accumulation of unused tokens from a provisioned-capacity bucket into a burst-mode bucket, according to at least some embodiments.

In some embodiments, in accordance with the applicable refill rate, a given token bucket may be refilled with tokens (i.e., tokens may be added to the bucket) periodically or in response to triggering events such as a completion or initiation of an admission control decision in response to a work request. In such an embodiment, it may be the case that a normal-mode token bucket contains some unused tokens at the time that it is to be refilled, e.g., because, on average during a previous time interval, work requests arrived at a rate less than the provisioned capacity. In one embodiment, the unused tokens from one or more buckets may be banked or accumulated in one or more other token buckets, e.g., for potential use later during bursts. FIG. 4 illustrates an example of the accumulation of unused tokens from a provisioned capacity bucket into a burst bucket, according to at least some embodiments.

In the embodiment depicted in FIG. 4, normal-mode bucket set 120 comprises a provisioned-capacity bucket 420, configured with a maximum token population M, while burst-mode token bucket set 125 comprises a burst-mode bucket 422, with a maximum token population B that is equal to or larger than M. As shown by arrow 452, provisioned-capacity bucket 420 is refilled at a rate equal to the provisioned capacity pr, subject to the maximum M. Thus, for example, if pr is 100 ops/sec, M=100, and refill operations are performed once every second, at most 100 tokens may be added to bucket 420 each second. As indicated by arrow 454, tokens may be consumed from bucket 420 at a rate based on the received workload requests. Consider two points in time, T1 and T2, where T2 is one second after T1. Assume that at T1, bucket 420 contained 100 tokens, and during the next second, 75 of those tokens were consumed for admission control operations associated with incoming work requests 170. At T2, bucket 420 still contains 25 unused tokens in this example scenario.

As indicated by arrow 460, such unused tokens may be accumulated in burst-mode bucket 422 in the depicted embodiment. Thus, continuing the example, 25 tokens may be added to bucket 422 at T2. In addition, in the depicted embodiment, tokens may be added to bucket 422 at its refill rate (subject to maximum population limit B), which may also be a function of the provisioned rate pr, as indicated by arrow 456. During burst mode operations, tokens may be consumed from bucket 422 at a rate dependent on the arrival rate of work requests. As indicated by arrow 458 of FIG. 4, in at least some embodiments, tokens may be consumed from the bucket 422 based on arrival rates of work requests regardless of the mode of operation—e.g., whenever a work request is accepted for execution, some number of tokens may be consumed from a normal-mode bucket 420, and some number of tokens may be consumed from a burst-mode bucket 422. It is noted that in some embodiments, regardless of the arrival rate, and regardless of other admission control settings, work requests may not be accepted at a rate higher than a predetermined maximum-sustainable rate that may be based on the hardware and/or software limits of the computing devices used for the work target. Such a maximum limit may be set to protect the data on the computing devices from being corrupted if the devices are stressed beyond their capabilities, for example.

In the embodiment depicted in FIG. 4, the population of burst-mode bucket 422 increases (subject to the maximum population limit B, and the consumption of burst-mode tokens for admitted work requests) over time as more and more tokens go unused in bucket 420. This may enable the admission controller 180 to handle larger bursts than may have been possible if only bucket 422's own refill rate were contributing to bucket 422's population. Such a technique of banking unused tokens for later use may be especially helpful in embodiments in which clients are charged for burst-mode operations as well as for provisioned capacity, as clients may be able to reduce overall costs by logically transferring unused tokens between the buckets. In some embodiments, similar kinds of transfers of unused tokens may also be supported among other source and destination bucket pairs—e.g., separate token buckets may be maintained for respective categories of work requests, and unused tokens from a bucket for a particular category C1 may be transferred to the bucket for a different category C2.

Token Buckets for Specific Types of Operations

Figure 5:
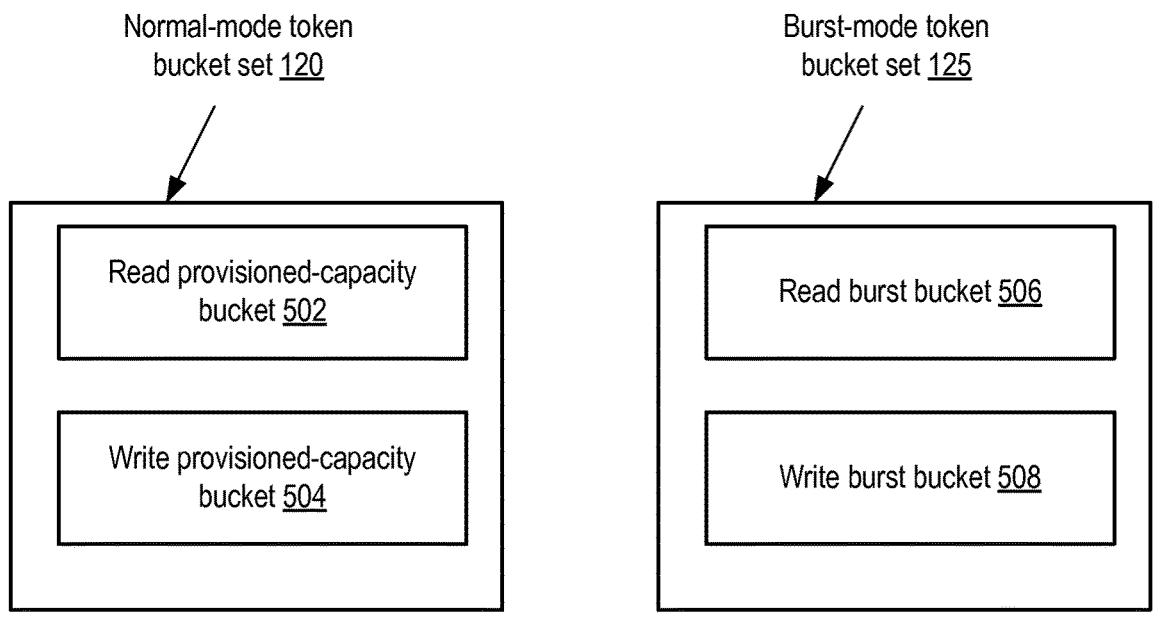
FIG. 5 illustrates the use of respective token buckets for admission control for reads and writes, according to at least some embodiments.

In some embodiments, a given work target may support work requests for different categories of operations. For example, a database table may support read and write operations in one embodiment. The terms "write operation" or "write" may refer to operations in which the data and/or metadata of an object such as a database table, a file, or a volume is modified, e.g., including creations (writing new or additional data), updates (changes to pre-existing data, which may involve in-place overwriting or, e.g., in some write-once environments, creation of a new version of the data), deletions, renames, and/or moves. The terms "read operations" or "reads" may refer to operations that do not involve modifications. The total amount of work required to respond to a write request may differ from the amount of work required to respond to a read request: for example, in some embodiments, multiple replicas of a given database table or table partition may be maintained, and a write may have to be completed at more than one replica for the write work request to be considered complete, whereas a read request may require accessing only a single replica. In some implementations, write operations may have to be logged, or may have other side effects such as index modification, which may not be required for read operations. As a result, the throughput capacity for reads at a given work target may differ from the throughput capacity for writes. Consequently, reads and writes may be treated differently with respect to admission control decisions. FIG. 5 illustrates the use of respective token buckets for admission control for reads and writes, according to at least some embodiments.

As shown, the normal-mode bucket set 120 comprises read provisioned-capacity bucket 502 and a separate write provisioned-capacity bucket 504 in the depicted embodiment. Burst-mode bucket set 125 comprises a read burst bucket 506 and a write burst bucket 508. When a work request arrives, the admission controller may determine whether the work request is for a read or a write, and may use the token populations of the corresponding type of bucket to (a) decide whether accepting the work request would result in normal mode operation or burst mode operation and (b) whether sufficient tokens are available for consumption in the appropriate buckets to accept the work request. The consumption and/or refilling of tokens in the read buckets may be independent of the consumption and/or refilling of tokens in the write buckets in the depicted embodiment, and some or all of the properties and policies depicted in FIG. 3 may be set independently for each type of bucket. Thus, it may be the case that at a given point in time, the work target is in normal mode with respect to reads, but in burst mode with respect to writes, or vice versa (i.e., in normal mode with respect to writes, and in burst mode with respect to reads). The work target may also be in normal mode with respect to both reads and writes, or in burst mode with respect to both reads and writes. In some embodiments, unused tokens may be transferred from a read bucket to a write bucket, or vice versa, in the embodiment depicted in FIG. 5—for example, if some tokens remain unused in write burst bucket 508 at the end of a time interval, a corresponding number of tokens may be added to the read burst bucket 506 if the read burst bucket's population falls below a threshold.

Shared Resources and Replication Management

Figure 6:
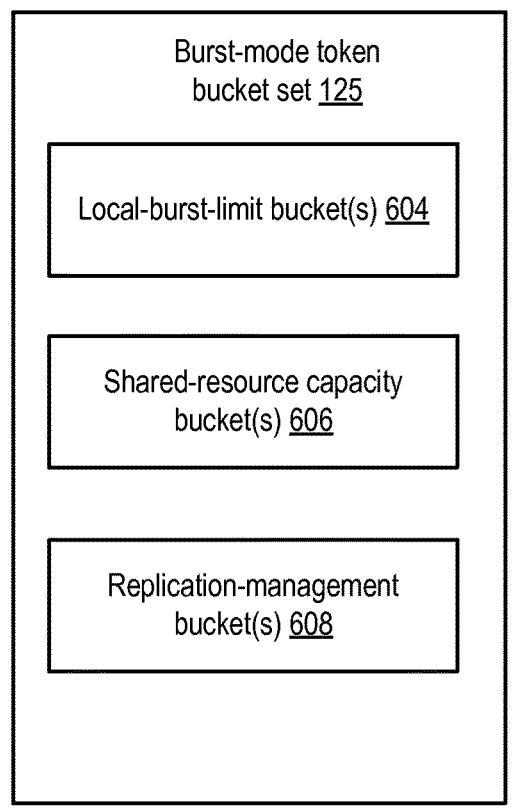
FIG. 6 illustrates a burst-mode token bucket set comprising one or more local-burst-limit buckets, one or more shared-resource capacity buckets, and one or more replication-management buckets, according to at least some embodiments.

Respective sets of burst-mode token buckets of the kinds illustrated in FIGS. 4 and 5 may be established for each work target in some embodiments. In at least some embodiments, a given work target such as a database table or table partition may utilize at least some resources that are shared by other work targets—for example, a portion of table Table1 may be located on the same storage device as a portion of table Table2. When making admission control decisions, the network-accessible service implementing the work target may have to take the capabilities of the shared resource into account as well. For example, in one implementation, a given storage device may be able to support no more than N read operations per second, and if that storage device is used for two different work targets WT1 and WT2, the available read throughput capacity of one target may (WT1) may be influenced by the read workload at the other target (WT2). In some embodiments, a shared-resource bucket whose token population represents the available throughput capacity of a resource shared among multiple work targets may be used for burst-mode admission control decisions at each of the work targets. As described below, for certain types of work requests (such as requests that lead to write operations) in embodiments in which multiple replicas of work targets are maintained, one or more buckets associated with replication management may also be used. Replication management buckets may be used only for some types of work requests' admission control in some embodiments—e.g., they may be used for writes, but not for reads, in such embodiments. FIG. 6 illustrates a burst-mode token bucket set comprising one or more local-burst-limit buckets 604, one or more shared-resource capacity buckets 606, and one or more replication-management buckets 608, according to at least some embodiments.

The three types of burst-mode token buckets shown in FIG. 6 may be used collectively for admission control, e.g., with each type of bucket being checked in sequence for available tokens, and work requests 170 being accepted only if all the relevant buckets contain sufficient tokens in accordance with their respective token consumption policies. The order in which the different token buckets are checked for admission control may vary in different embodiments. The local-burst-limit buckets 604 may comprise tokens representing the available throughout capacity of the work target considered in isolation, e.g., ignoring throughput limits of shared resources, and ignoring replication. In one embodiment, the population of the local-burst-limit bucket(s) 604 may be checked first when a work request is received. If the local-burst-limit buckets contain sufficient tokens, the shared-resource capacity buckets 606 may be checked next. If sufficient tokens are found in the shared-resource capacity buckets and if responding to the work request requires data replication, the replication-management buckets 608 may be checked next. In the depicted embodiment, if all the buckets checked contain enough tokens, the work request may be accepted. If any one of the buckets checked does not contain enough tokens, the work request may be rejected, delayed, or retried.

In a scenario in which the local-burst-limit buckets 604 contain insufficient tokens and are checked prior to the other types of buckets illustrated, a work request may be rejected even though the shared-resource capacity buckets 606 and/or the replication-management buckets 608 contain enough tokens to accept the request based on their respective consumption policies. In some embodiments, a respective local-burst-limit bucket 604 may be maintained for read requests and write requests, and/or a respective shared-resource bucket 606 may be maintained for read requests and write requests.

In some embodiments, several different types of shared resources may be considered during admission control, e.g., using respective instances of shared-resource buckets. For example, in one embodiment, a limited number of memory buffers required for performing read operations may be available at a server at which the work target is implemented, and a shared-resource capacity bucket 606 may be established to represent available memory buffers. Similarly, in another embodiment, a type of data structure (such as a file descriptor, of which a limited number may be available in a given operating system instance in use for the work target) may be used for each work operation, and a different shared-resource capacity bucket 606 may be established to represent available file descriptors. In some embodiments, tokens representing the surplus throughput capacity of one or more shared resources (relative to the sum of the provisioned capacities of the work targets sharing the resources) may be distributed among the work targets in an equitable manner using an iterative approach, as described below in further detail.

According to one embodiment, contents of a work target (such as a database table, a file or a storage volume) may be distributed among one or more logical partitions by the service. For example, a client of a database service may specify that a table is to hold approximately X terabytes (TB) of data and is expected to support a workload of Y read or write operations per second, and the database service may decide to set up a table with P logical partitions, with sufficient resources initially being designated for each of the logical partitions to store X/P TB and support a provisioned capacity limit of Y/P operations each. (Non-uniform distributions of provisioned throughput capacity across partitions may be used in some embodiments—e.g., if some partitions are known or expected to be "hotter", or have higher average request rates, than others.) Admission control decisions may be made at the logical partition level in at least some such embodiments. Corresponding to each logical partition, a master replica and one or more slave replicas of the partition's data may be set up in accordance with a data durability policy or data replication policy for the data object. The durability/replication policy may be designed to ensure that data writes are replicated to a sufficient number of distinct physical locations, such that the probability of data loss due to factors such as equipment failures, power loss, and/or natural disasters is kept below a threshold. In some embodiments, admission control decisions for write requests may be made at the master replica, while admission control decisions for reads may be made at either the master replica or (especially if the client is willing to accept reads from a potentially slightly out-of-date version of the data) at a slave replica. In accordance with the replication policy, when a write request from a client is accepted, the modified data may have to be successfully replicated at N replicas (the master replica and N–1 slave replicas) in some embodiments, e.g., before an acknowledgment that the write has succeeded is provided to the client. Thus, because the successful completion of a write requires the use of slave resources, the available throughput capacity at the slave(s) (as well as the master) may have to be considered during admission control for writes. In one embodiment, the number of slave replicas that are set up may exceed the minimum number required for the replication policy. The replication policy may require that a quorum of Q copies of a write are to be made persistent before the write is deemed successful, so that a minimum of (Q–1) slave replicas may be needed. However, for various reasons such as read load balancing, high availability and the like, the number of slave replicas maintained may exceed Q–1 in such embodiments. It is noted that the designation of a particular replica as a slave or a master may change over time in various embodiments; for example, if a device at which a master for a given logical partition is instantiated fails or becomes unreachable, a different replica that was earlier designated a slave may be selected as the master. In some embodiments, the number of slave replicas may be changed over the lifetime of a data object, e.g., in response to a request from the client that owns the data object. Token-based techniques for admission control may be applied in peer-to-peer environments as well in some embodiments, where replicas are not necessarily designated as masters or slaves; in such en embodiment, the replica at which an admission control decision for an incoming write request is made may correspond (in terms of the types of operations performed) to the master replica as described herein. Thus, in some embodiments employing peer-to-peer replication in which replicas are for the most part equivalent to each other in responsibilities, if a write request is received at a given peer P1, information about the available throughput capacity of at least one other peer P2 may be used to decide whether the write request is to be accepted for execution.

As indicated above, in at least some embodiments in which writes are to be replicated, the available throughput capacity at more than one replica (e.g., a master and at least one slave) may have to be considered during admission control for writes, and one or more replication-management buckets 308 may accordingly be used. For example, while the local-burst-limit buckets 604 may represent available throughput at the master replica considered in isolation, the replication-management buckets 308 may represent the master's view of the available throughput capacity at one or more slaves.

A slave capacity update protocol may be used to refresh the information about slave state(s) in the replication-management bucket(s) 608 (e.g., the token population of the replication-management bucket(s) 608 at the master may be updated based on information received from a slave) in at least some embodiments. In some embodiments, token buckets may also be used at slaves for throughput management, in a manner similar (but not identical) to the manner in which buckets are used at the master. In accordance with a slave capacity update protocol, in one such embodiment, a slave may provide population snapshots (i.e., point-in-time representations) of one or more of the slave's local token buckets (which may include provisioned-capacity buckets and/or burst-mode buckets) to the master. For example, one particular slave-side token bucket may represent available capacity at a shared storage device at which at least a portion of the slave's data is stored, similar to the shared-resource capacity bucket 606 at the master, and snapshots of the population of such a bucket may be provided to the master. Any of several different approaches may be used for providing the snapshots from the slave in different embodiments; for example, the snapshots may be attached to or piggybacked with write acknowledgements sent from the slave to the master when a write replication is requested by the master, or the slave may attach the snapshot to a heartbeat message it is required to send to the master to inform the master that the slave is up and running.

Compound Token Buckets

Figure 7:
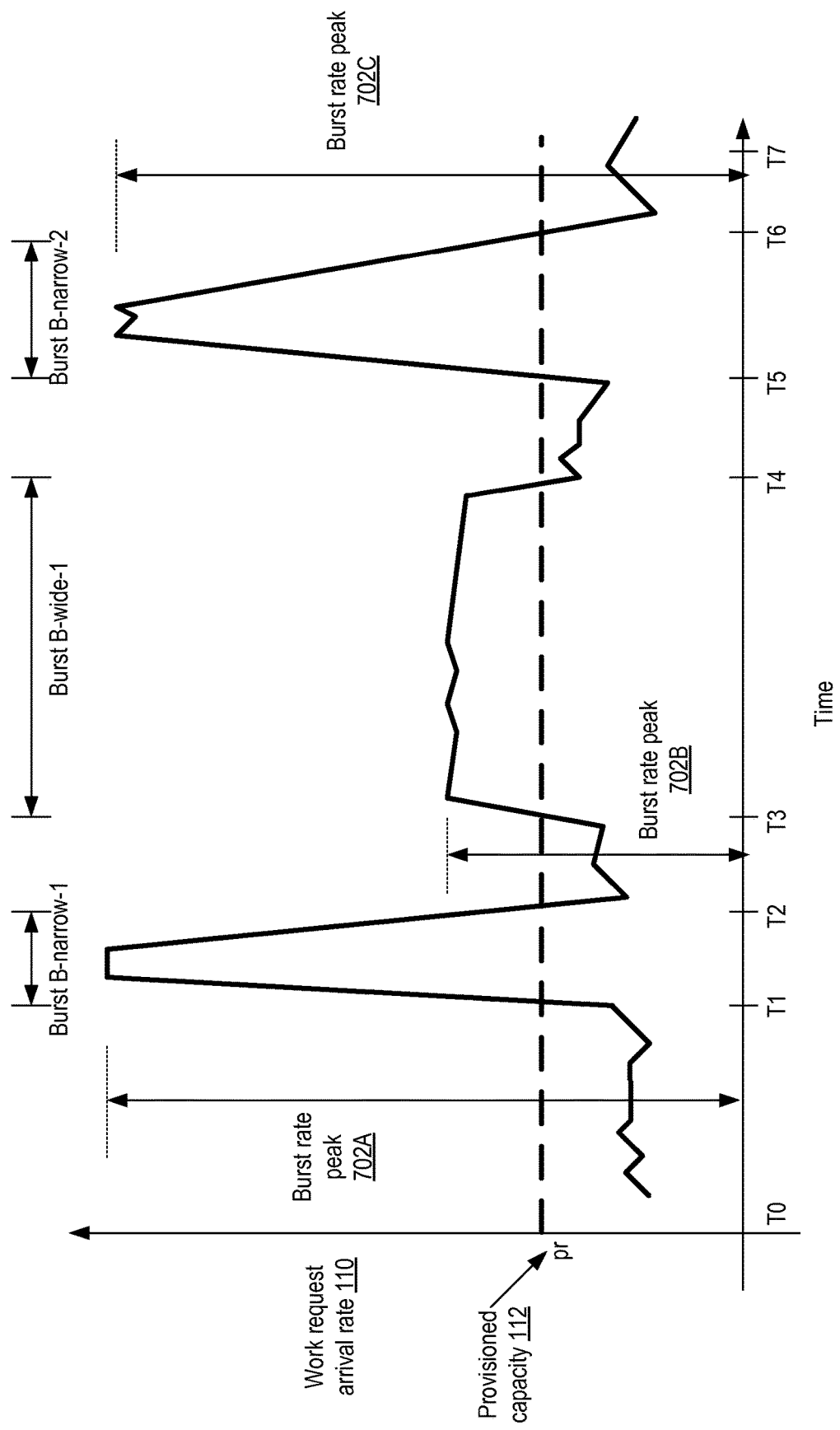
FIG. 7 illustrates an example of a classification of work request bursts into categories for admission control purposes, according to at least some embodiments.

As described earlier, different types of work request arrival bursts may vary in their impact on a network-accessible service. A service may be able to handle a very high burst rate for a short period of time, but may be able to withstand lower burst rates for longer. In some embodiments, and admission controller 180 may be configured to limit the durations of different types of bursts based on their impact on the service, and bursty work request arrival behavior may be classified into a plurality of categories to assist with admission control. FIG. 7 illustrates an example of a classification of work request bursts into categories for admission control purposes, according to at least some embodiments.

In FIG. 7 (as in FIG. 1a), the X-axis represents time, and the Y-axis represents work request arrival rates 110 at a given work target 102. A graph such as FIG. 7 may be plotted, for example, by monitoring the number of work requests received every second (or every N seconds), computing the count of requests per second, and connecting the points representing the request per second values for each time interval. Provisioned capacity 112 for the work target is represented by the horizontal line crossing the Y-axis at pr. The work target is assumed to be in a normal mode of operation whenever the arrival rate is at or below pr, and in burst mode whenever the arrival rate is above pr. During the time from T0 through T7, the work target is in normal mode for several periods, such as the period between T0 and T1, the period between T2 and T3, the period between T4 and T5, and the period between T6 and T7. However, during three periods (T1 to T2, T3 and T4, and T5 to T6), the work target is in burst mode. The shapes of bursts B-narrow-1 (during the interval T1-T2) and B-narrow-2 (during the interval T5-T6) as represented in the graph are similar, and both shapes differ from the shape of burst B-wide-1. Burst peak rates 702A (the maximum work request arrival rate during B-narrow-1) and 702C (the maximum work request arrival rate during B-narrow-2) are substantially higher than burst peak rate 702B (the maximum work request arrival rate during B-wide-1).

The admission controller 180 may be configured to maintain a compound burst-mode token bucket, comprising two underlying token buckets in the depicted embodiment. As described below, one of the underlying token buckets may be used to allow short bursts with very high arrival rates relative to the provisioned capacity pr (such as B-narrow-1 or B-narrow-2), but to prevent bursts with such high arrival rates from lasting very long, The other underlying token bucket of the compound token bucket may be used to allow longer bursts with lower peak rates, such as B-wide-1. The applicable parameters and/or policies (e.g., refill rates) may differ for the underlying buckets. In at least some embodiments, tokens may be consumed from both underlying buckets in order to admit a work request for execution during burst mode.

Figure 8:
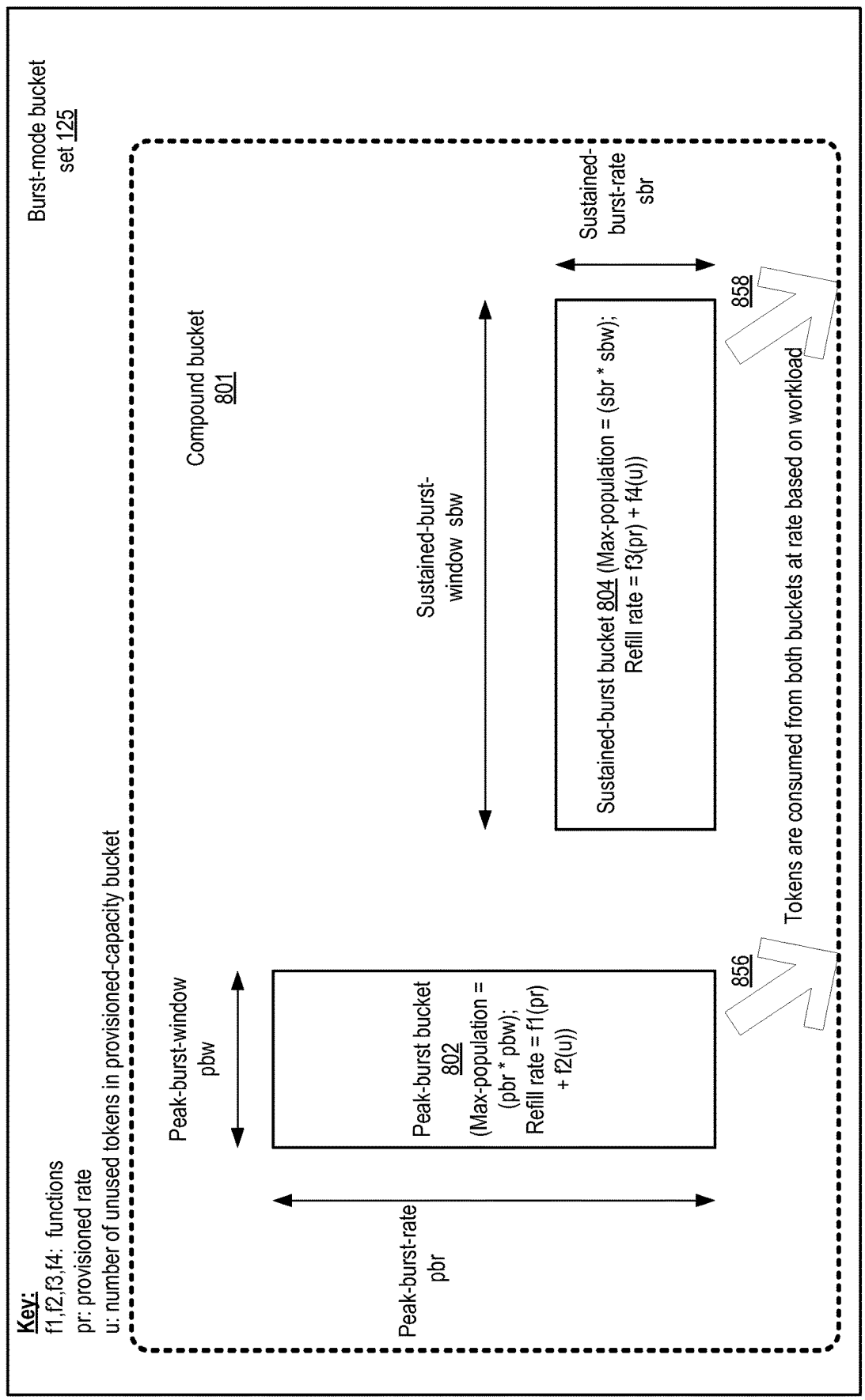
FIG. 8 illustrates an example of the use of a compound token bucket comprising a combination of a peak-burst token bucket and a sustained-burst token bucket for burst-mode admission control, according to at least some embodiments.

FIG. 8 illustrates an example of the use of a compound token bucket 801 comprising a peak-burst bucket (PBB) 802 and a sustained-burst bucket (SBB) 804 for burst-mode admission control, according to at least some embodiments. As shown, the compound token bucket 801 forms part of the burst-mode token bucket set 125 for a work target 102 in the depicted embodiment. Each of buckets 802 and 804 is characterized by a respective burst rate (representing the maximum arrival rate the bucket is intended to model) and a respective burst time window (indicative of a duration of the modeled burst). The peak burst rate (pbr) parameter represents the maximum arrival rate to be supported using the PBB and the peak burst window size (pbw) parameter is indicative of the duration for which such an arrival rate should be sustainable by the work target (assuming certain conditions, such as no refill operations). The sustained burst rate (sbr) parameter represents the burst arrival rate (lower than pbr) that should ideally be supported for a longer, sustained burst time window (sbw). It is noted that while the respective time windows may generally indicate the relative lengths of the durations for which bursts are to be supported by the respective buckets in various embodiments, the actual durations for which bursts at the respective rates are supported in practice may not exactly match the time windows. Thus, in at least some embodiments, the time windows may be said to be indicative of targeted burst durations, but may not necessarily equal actual burst durations. The maximum token populations of PBB 802 and SBB 804 are obtained in each case by computing the product of the burst rate and the time window: e.g., the maximum population of PBB is (pbr*pbw), and the maximum population of SBB is (sbr*sbw). As shown by the arrows labeled 856 and 858, the rate at which tokens are actually consumed from each of the buckets of the compound bucket 801 may be dependent on the arrival rate of work requests (at least during burst mode, and in some embodiments regardless of whether the work target is in burst mode or normal mode). In at least some embodiments, tokens may be consumed from both PBB 802 and SBB 804 when a work request is accepted—that is, the rates at which tokens are consumed from the PBB and the SBB may be identical.

In order to ensure that bursts of very high arrival rates are not allowed to continue for too long, tokens may be consumed from each of the buckets in the depicted embodiment to accept a given work request for execution. To repeat an example provided earlier: consider a scenario in which the provisioned capacity (pr) is 100 operations/second (100 ops/sec), the peak burst rate (pbr) is 1000 ops/sec, the peak burst window size (pbw) is 6 seconds, the sustained burst rate (sbr) is 200 ops/sec, and the sustained burst window size (sbw) is 60 seconds. The maximum population of PBB is thus 1000*6, or 6000 tokens, and the maximum population of SBB is set to the product of 200*60, or 12000 tokens also. For a given request to be accepted, one token each is required from PBB and SBB in the example scenario. Consider a burst of work requests B that begins at a time T at which both PBB and SBB are full (PBB has 6000 tokens, SBB has 12000), and assume PBB is refilled with 200 tokens every second, while SBB is refilled with 100 tokens every second. If the burst B consists of arrivals at 1000 requests/sec, B's requests would be accepted for between 7 and 8 seconds, as PBB's population would decrease at the rate of approximately 800 tokens (1000 consumed, 200 refilled) per second, while SBB's population would decrease at approximately 900 tokens per second (1000 consumed, 100 refilled). After that time, the compound bucket would not be able to sustain 1000 requests/second. If, however, burst B consists of arrivals at 200 requests per second, PBB would lose no net tokens (200 consumed, 200 refilled) each second, while SBB would lose 100 tokens every second (200 consumed, 100 refilled). Thus, a smaller burst rate (200 requests/sec) would be accommodated for a longer time (120 seconds) than a sharp burst (7 to 8 seconds for a burst of 1000 requests/sec) in this example scenario.

In practice, as noted earlier, in various embodiments the arithmetic of this example use of a compound token bucket 801 may be more complicated due to various factors, such as fluctuations in arrival rates, the work target re-entering normal-mode, and/or consumption policies that require different numbers of tokens for different types of requests.

In the depicted embodiment, for example, the refill rate for PBB is a function of the provisioned capacity pr (f1(pr)), and a function of the number "u" of unused tokens in the provisioned-capacity bucket for the work target (f2(u)). Similarly, the refill rate for SBB is a function of the provisioned capacity (f3(pr)) and a function of u (f4(u)). In one implementation, instead of being based on the absolute number of unused tokens in the provisioned-capacity bucket, the refill rate of either the PBB, the SBB or both may be based on the rate at which unused tokens accumulate in the provisioned-capacity bucket. In some embodiments, as in the example above, the refill rate of the PBB may be set higher than the refill rate of the SBB, while the maximum population of the PBB may be set smaller than the maximum population of the SBB. Different embodiments may employ any desired combination of various kinds of functions f1, f2, f3 and f4.

In various embodiments, parameters (such as pbr, pbw, sbr and sbw) and definitions of functions (f1, f2, f3 and f4) may be tunable or configurable; e.g., the admission controller 180 may be configured to determine the values of the parameters and the definitions of the functions from a configuration file or via input from an administrator of the network-accessible service. The admission controller may determine the parameter values and functions, compute or configure the maximum populations, populate the buckets 802 and 804 as per the parameters, and await incoming work requests. When a work request is received during burst mode, it may be accepted for execution (or rejected) based at least in part on the token populations of one or both of PBB and SBB. If it is accepted, one or more tokens may be consumed from either the PBB, the SBB, or both, based on the respective consumption policies for the two buckets. PBB and SBB may be refilled based on their respective refill rates at various points in time, as described in further detail below with respect to FIG. 12. In at least some embodiments, some of the functions f1, f2, f3 and f4 may be identity functions—e.g., it may be the case that f1 (pr)=pr. Some of the functions f1, f2, f3 and f4 may be identical to some of the other functions in one embodiment, e.g., there may be no requirement that the four functions differ. In some embodiments, the number of unused tokens in the provisioned capacity bucket "u" may not contribute to the refill rate, e.g., it may be the case that the refill rates are independent of the accumulation of unused tokens. In at least some embodiments, PBB and/or SBB may be refilled in accordance with their refill policies (and subject to their maximum token population limits) during normal modes of operations, so that tokens accumulate in PBB and/or SBB even while the rate of work request arrivals is below the threshold for burst-mode. Such refilling of burst-mode buckets during normal mode may help to prepare the system to handle future bursts, for example.

Figure 9:
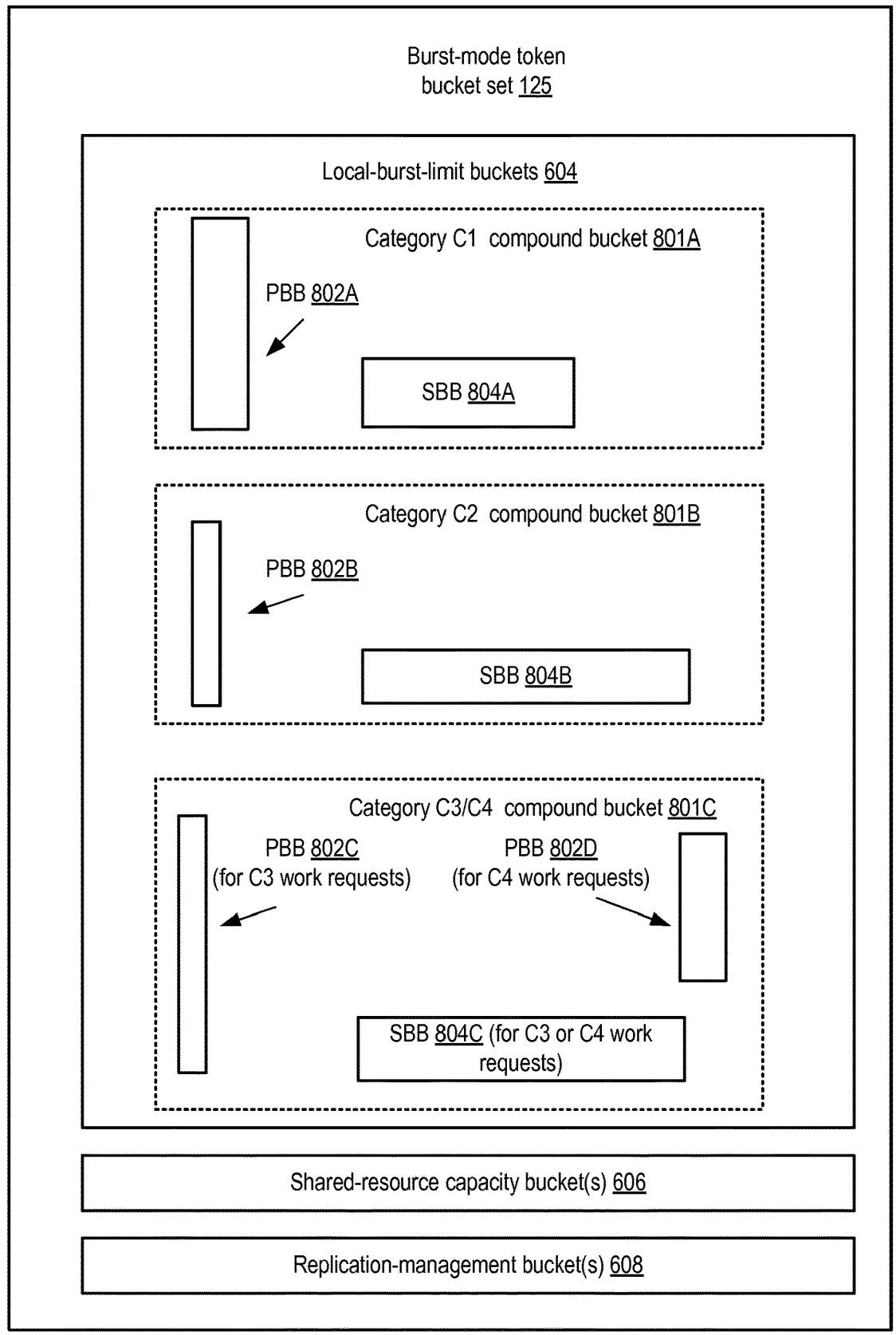
FIG. 9 illustrates the use of peak-burst and sustained-burst buckets dedicated to respective categories of work operations, according to at least some embodiments.

In some embodiments, the service implementing the work target may wish to control peak and sustained burst-mode admissions using respective sets of parameters for different categories of work requests. For example, a different peak burst rate (or sustained burst duration) may be appropriate for reads than for writes, or a different peak burst rate (or sustained burst duration) may be appropriate for each of several priority-based categories of work requests. For some extremely time-sensitive category of work requests, for example, the service may wish to support higher peak bursts than for other, less time-sensitive categories of work requests. The admission controller 180 may implement a plurality of compound buckets to handle such use cases in some embodiments. FIG. 9 illustrates the use of peak-burst and sustained-burst buckets dedicated to respective categories of work operations, according to at least some embodiments.

As shown, in the depicted embodiment, the burst-mode bucket set 125 may include, within its collection of local-burst-limit buckets 604, a plurality of compound buckets 801, including 801A, 801B and 801C, each dedicated to one or more categories of work requests. For example, compound bucket 801A may be used for admission control for requests of category C1, compound bucket 801B may be used for admission control for requests of category C2, and compound bucket 801C may be used for admission control for requests of category C3 and category C4. The definitions of the categories may be service-dependent in different embodiments—e.g., one service may define categories based on the types of operations performed (e.g., reads and writes could be separate categories), another service may define categories based on the amounts of resources consumed on average (e.g., short versus long operations), another service may define categories based on client-specified priorities or service-assigned priorities, and so on.

Each of the compound buckets 801 may include at least one PBB 802 and at least one SBB 804, with respective (and potentially distinct) sets of parameter settings for pbr, pbw, sbr and sbw. For example, compound bucket 801A includes PBB 802A and SBB 804A, compound bucket 801B comprises PBB 802B and SBB 804B, while compound bucket 804C includes PBBs 802C and 802D and a single SBB 804C. In the case of compound bucket 801C, burst-mode admission control of category C3 requests are managed using PBB 802C and SBB 804C, while burst-mode admission control for category C4 requests are handled using PBB 802D and the shared SBB 804C. Thus, in this example scenario, when a burst-mode work request of category C3 is received, the populations of PBB 802C and SBB 804C are checked, and when a burst-mode work request of category C4 is received, the populations of PBB 802D and SBB 804C are checked. By implementing separate compound buckets for different categories of work requests (or combinations of categories of work requests), the service may be able to control burst-mode behavior at a finer granularity that may be feasible if a single compound bucket were used. The burst-mode bucket set 125 of FIG. 9 may also include one or more shared-resource capacity buckets 606 (e.g., to ensure that capacity limits of shared resources are considered during burst-mode admission control) and replication-management buckets 608 (e.g., to ensure that admission control decisions for operations such as writes that have to be replicated are made based at least on part on available throughput capacity at more than one replica).

Methods for Burst-Mode Admission Control

Figure 10:
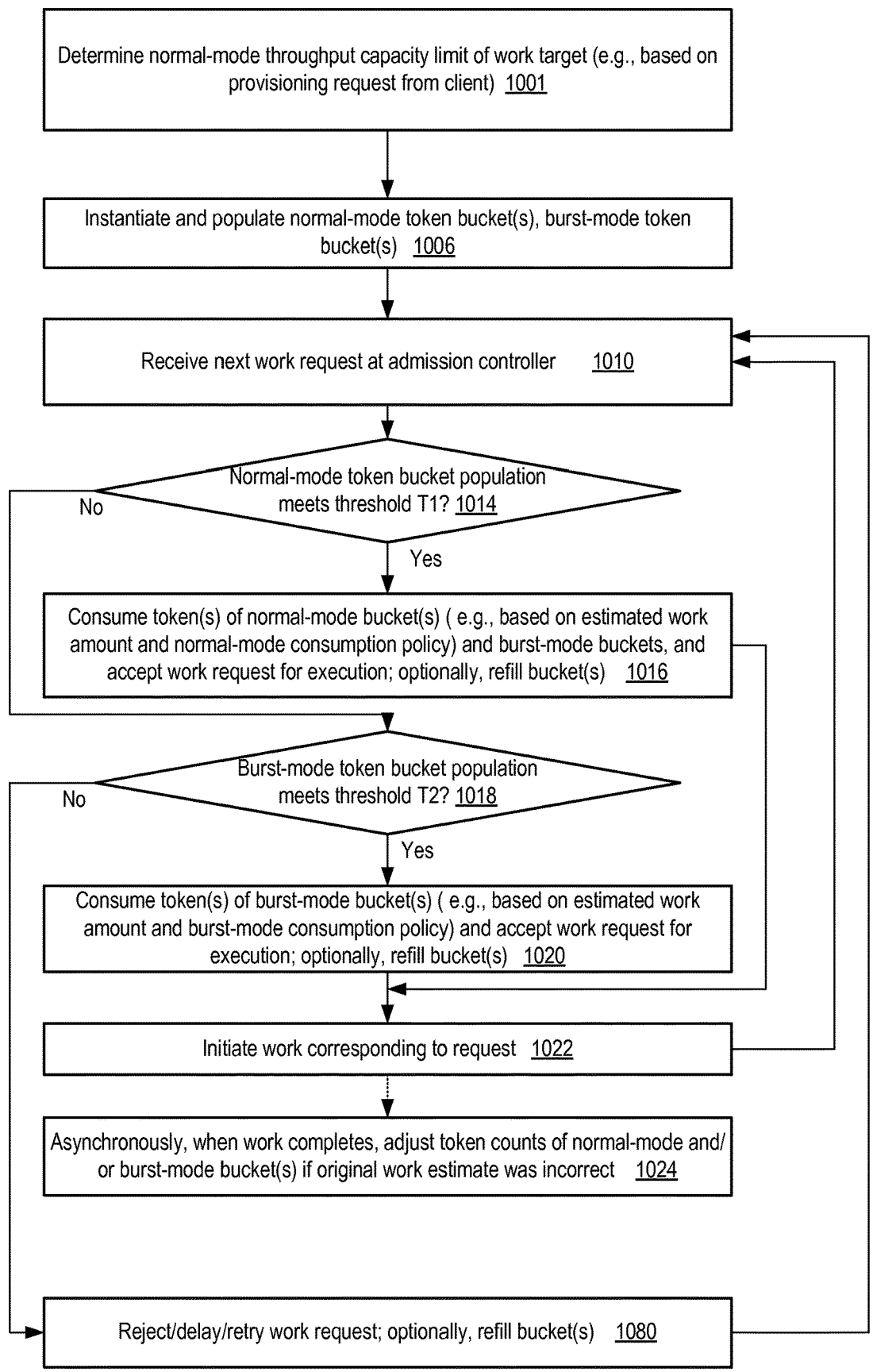
FIG. 10 is a flow diagram illustrating aspects of operations that may be performed to implement a token-based admission control mechanism for work requests at a network-accessible service, according to at least some embodiments.

FIG. 10 is a flow diagram illustrating aspects of operations that may be performed to implement a token-based admission control mechanism for work requests at a network-accessible service, according to at least some embodiments. As shown in element 1001, a normal-mode throughput capacity limit applicable to a work target may be determined, e.g., in response to a provisioning request from a client. For example, a client of a database service may request that a table capable of supporting N read or write operations per second be created, and the normal-mode throughput capacity limit for the table may be set to N accordingly. The admission controller 180 of the service may determine various other parameters to be used for a normal-mode bucket set and a burst-mode bucket set (such as the number of buckets, initial token populations, refill rates and the like), for example based on default settings or based on specifications requested by or negotiated with the client. The buckets of the normal-mode bucket set 120 and the burst-mode bucket set 125 may then be initialized, e.g., instantiated and populated (element 1006).

The next work request may be received at the admission controller (element 1010). The token population of at least one normal-mode bucket may be checked. If the normal-mode token population meets a threshold criterion T1 (as detected in element 1014), one or more tokens may be consumed from the normal-mode token bucket(s) (i.e., the token population may be changed) and the work request may be accepted for execution (element 1016). In one simple implementation, for example, a normal-mode token bucket may be required to have at least one token in order to meet threshold criterion T, and one token may be consumed per admitted work request. In some embodiments, tokens may be consumed from one or more burst-mode buckets (as well as from one or more normal-mode buckets) when a work request is accepted during normal mode of operation. In general, the number of tokens consumed may depend on a combination of factors in various embodiments, including a token consumption policy in effect for the bucket(s), and/or on an estimate of the amount of work that may be required to respond to the work request. The admission controller 180 may be configured to generate such an estimate in at least some embodiments, based for example on details specified in the work request by the client, accumulated history or statistics of the amount of work similar requests actually required in the past, and so on. In some embodiments, depending on the refill policies in effect, various token buckets (e.g., either the normal-mode buckets, the burst-mode buckets, or both) may optionally be refilled (i.e., tokens may be added to them in accordance with their refill policies and maximum population limits) at the time that an admission control decision is made. As described below with respect to FIG. 12, the specific times or events that lead to token bucket refills may differ in different embodiments. If the normal-mode token population does not meet the threshold criterion T1 (as also detected in element 1014), the admission controller 180 may conclude that the acceptance of the work request would result in burst-mode operation of the work target, and that the token populations of one or more burst-mode token buckets should accordingly be determined.

The admission controller 180 may determine the token population of at least one burst-mode token bucket in the depicted embodiment. If the burst-mode token population meets a threshold criterion T2 (as determined in element 1018), one or more tokens may be consumed from the burst-mode bucket(s) and the work request may be accepted for execution in burst mode (element 1020). In one simple implementation, for example, a burst-mode token bucket may be required to have at least one token in order to meet threshold criterion T2; thus, it may be the case in at least some implementations that the threshold token populations for both normal-mode and burst-mode buckets are the same. In general, the number of tokens consumed from the burst-mode token buckets may also depend on a combination of factors in various embodiments, including a token consumption policy in effect for the burst-mode bucket(s), and/or on an estimate of the amount of work that may be required to respond to the work request. As in the case of the operations corresponding to a normal-mode acceptance of the work request, one or more buckets may optionally be refilled, based on their refill policies and subject to their maximum token population limits, when a burst-mode acceptance decision is made.

If the work request is accepted, either in normal mode (element 1016) or in burst mode (element 1020), one or more operations corresponding to the work request may be initiated (element 1022). In some embodiments, when the operations are completed, the admission controller 180 may asynchronously compare the actual amount of work performed to an estimate of work that was used to determine how many tokens to consume (element 1024). If the original work estimate was incorrect, the number of tokens in one or more buckets used for admission control for the corresponding work request may be adjusted accordingly. If the estimate was lower than the actual work performed, a number of additional tokens may be removed from the buckets that were used for admission control; the number of such additional tokens consumed may be computed based on the difference between the estimate of work and the actual work in some embodiments. If the estimate was too high, some number of tokens may be removed from the buckets used for admission control.

In the depicted embodiment, if the normal-mode token bucket set population does not meet criterion T1, and the burst-mode bucket set token population does not meet criterion T2, the work request may be rejected, delayed or retried (element 1080). In some embodiments, depending on the refill policies in effect, one or more tokens may optionally be added to either the normal-mode bucket(s), the burst-mode bucket(s), or both, when the decision not to accept the work request is made. After the admission control decision is made (e.g., either the work request is accepted or rejected), the admission controller may wait for the next work request, and the operations corresponding to elements 1010 onward may be repeated.

Figure 11:
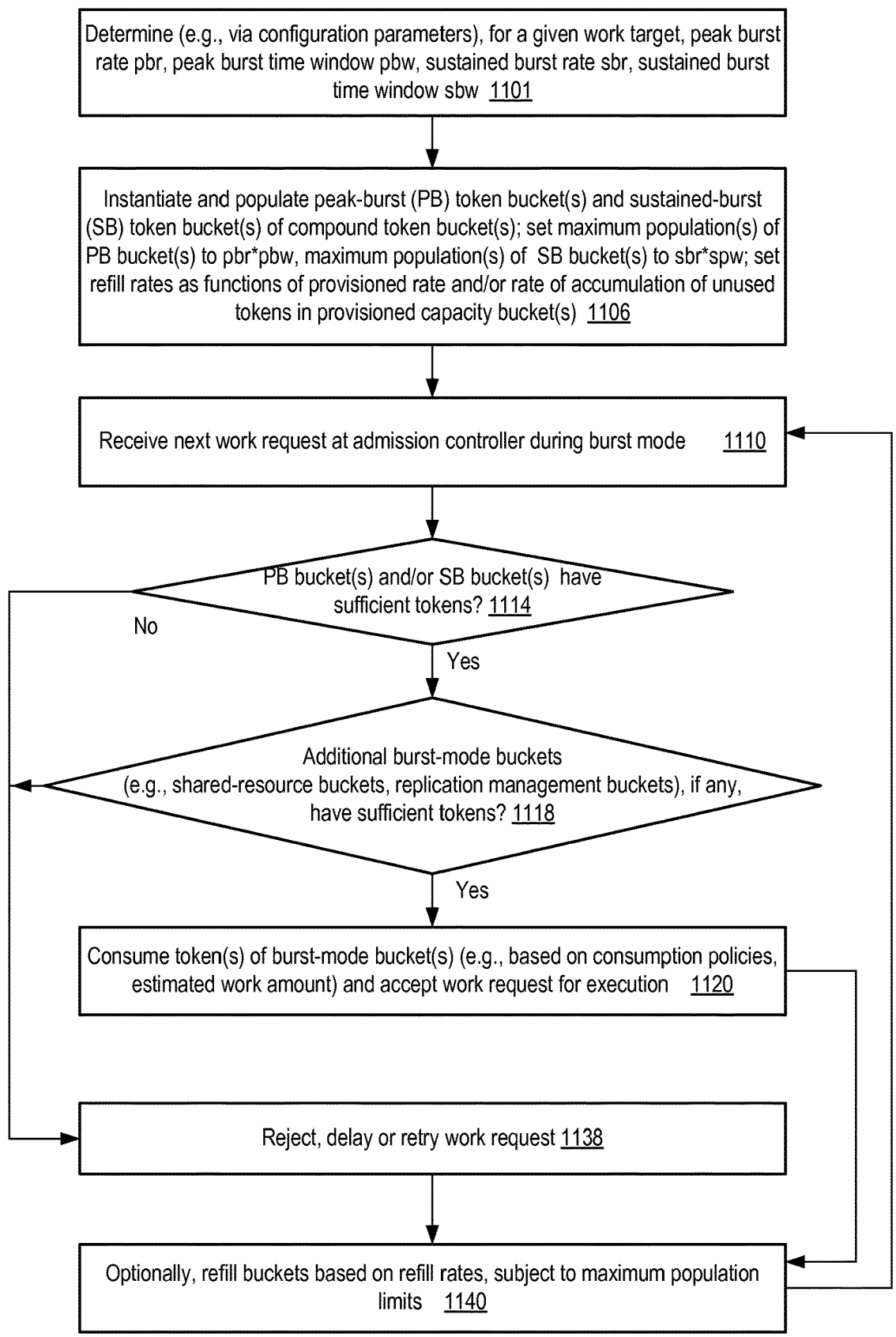
FIG. 11 is a flow diagram illustrating aspects of operations that may be performed to implement a token-based admission control mechanism for handling burst-mode operations using a plurality of burst-mode token buckets at a network-accessible service, according to at least some embodiments.

FIG. 11 is a flow diagram illustrating aspects of operations that may be performed to implement a token-based admission control mechanism for handling burst-mode operations using a plurality of burst-mode token buckets, including a compound bucket, at a network-accessible service, according to at least some embodiments. As shown in element 1101, an admission controller 180 may determine a number of parameters to be used for burst-mode admission control for short-duration bursts at high arrival rates and longer-duration bursts at lower arrival rates at a given work target. The parameter determined may include, for example a peak burst rate (pbr) to be supported, a peak burst window size (pbw) indicative of a duration for which the peak burst rate is to be supported, a sustained burst rate (sbr) (typically but not necessarily lower than pbr), and a sustained burst window size (sbw) (typically but not necessarily larger than pbw). Other parameters may also be determined in at least some embodiments, such as whether other buckets including for example shared-resource capacity buckets and/or replication-management buckets are to be set up, the initial population settings for various buckets, and so on. At least some of the parameters may be configurable, e.g., in response to administrator input or auto-tuning by the service, and one or more parameters may be read in via configuration files in some implementations.

As shown in element 1106, a compound bucket comprising at least one peak-burst bucket (PBB) and one sustained-burst bucket (SBB) may be initialized, e.g., by instantiating and populating the buckets based on parameter settings such as the respective initial populations 306 of the buckets. In the depicted embodiment, the maximum token population of a PBB may be set to the product of pbr and pbw, and the maximum token population of an SBB may be set to the product of sbr and sbw. The refill rates for a PBB and/or an SBB may be set based at least in part on the provisioned throughput capacity of the work target. In some embodiments, the refill rate for a PBB and/or an SBB may also be based on the rate at which unused tokens accumulate in a provisioned-capacity bucket or another normal-mode bucket and/or the number of unused tokens in such buckets.

The next burst-mode work request may be received (element 1110) at the admission controller during burst mode (that is, a work request may be received and the admission controller may determine that the work target is in burst mode, using the token population of a normal-mode bucket such as a provisioned-capacity bucket, or using some other indicator of the mode of operation of the work target). The admission controller may determine the token populations of the PBB and/or the SBB, and check whether enough tokens are available to accept the work request, based on the consumption policies and/or on an estimate of the amount of work associated with the work request. If sufficient tokens are present in the PBB and/or the SBB (as detected in element 1114), in the depicted embodiment, the admission controller may determine whether the burst-mode token bucket set includes other buckets whose populations also have to be checked for the work request being considered. For example, in some embodiments the burst-mode token bucket set may include one or more shared-resource capacity buckets 606 and/or one or more replication-management buckets 608. If additional burst-mode token buckets are being implemented, and sufficient tokens are found in each of the remaining burst-mode token buckets that are relevant to the work request (as detected in element 1118), the appropriate number of tokens may be consumed from each relevant bucket (e.g., in accordance with the applicable consumption policies) and the work request may be accepted for execution (element 1120). It is noted that at least in some embodiments, some of the additional burst-mode token buckets may be relevant only to certain categories of requests—for example, the population of a replication-management token bucket 608 may be checked only for write request admission control in one embodiment, and may not be checked when deciding whether to accept a read request in such an embodiment. Thus, the mere existence of a burst-mode token bucket may not imply that that bucket has to be used for admission control for all work requests received in some embodiments.

If sufficient tokens are not available for consumption in either the compound token bucket pair (i.e., the PBB and/or the SBB) (as detected in element 1114) or the relevant additional burst-mode token buckets (as detected in element 1118), the work request may be rejected, delayed or retried in the depicted embodiment (element 1138). In some embodiments, regardless of whether the work request was accepted or rejected, one or more of the buckets used for admission control (including, for example, buckets of a normal-mode token bucket set 120 and/or buckets of a burst-mode bucket set 125) may be refilled in accordance with the corresponding refill policies after the admission control decision is made (element 1140). After completing its operations corresponding to a given work request, the admission controller 180 may wait for the next work request to arrive, and operations corresponding to elements 1110 onwards may be repeated for the next work request received in burst mode.

Figure 12:
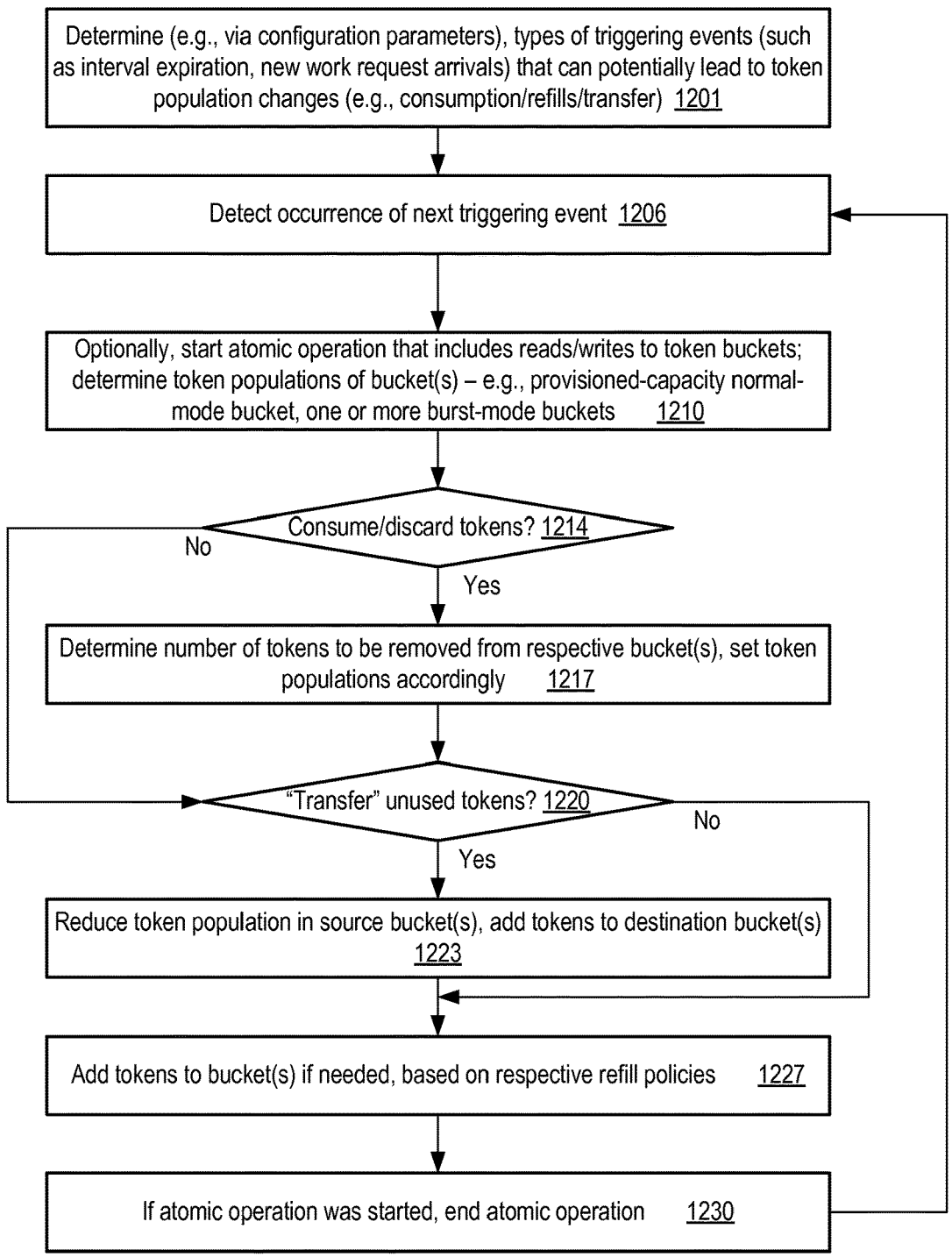
FIG. 12 is a flow diagram illustrating aspects of token consumption, refill and transfer operations that may be performed for admission control, according to at least some embodiments.

In different embodiments, token refill operations (i.e., operations in which tokens are added to a given bucket) may be performed in response to different events, or based on different schedules. FIG. 12 is a flow diagram illustrating aspects of token consumption, refill and transfer operations that may be performed for admission control, according to at least some embodiments. As shown in element 1201, an admission controller may determine (e.g., by examining configuration parameters) the types of triggering events that may lead to bucket population changes. In some embodiments, the arrival of a new work request and/or the completion of the corresponding admission control decision may trigger token population changes. In one embodiment, the expiration of a time interval (e.g., N1 milliseconds or N2 seconds) since the last population change at a bucket may trigger token populations. In yet other embodiments, combinations of time interval expirations, work request arrivals and/or work request admission control completions may trigger token population changes. The occurrence of the next triggering event may be detected (element 1206). The current populations of various token buckets may be determined (element 1210), e.g., including the normal-mode buckets and burst-mode buckets. In some embodiments, the reads and writes directed to the various token buckets may all be performed within a single atomic operation (similar to a database transaction), and in such embodiments the atomic operation may begin with the reading of the current token populations.

If the triggering event involves consumption or discarding of tokens (as detected in element 1214), the number of tokens to be consumed or discarded may be determine for each bucket (element 1217), and the bucket population(s) may be adjusted accordingly in the depicted embodiment. Some number of tokens may be consumed, as described above, for each work request accepted in various embodiments. In some embodiments, tokens may have a maximum lifetime, and tokens that have remained unused for their maximum lifetime may be discarded in accordance with a token staleness policy.

In at least some embodiments, tokens that remain unused in one bucket may be "transferred" to another bucket—e.g., unused tokens in a provisioned-capacity bucket may be accumulated or banked in a burst-mode bucket or buckets. It is noted that in various embodiments, the "transfer" of tokens comprises a logical operation in which, for example, if N tokens are found unused in the provisioned capacity at a particular point in time, N tokens are added to a burst-mode bucket and the token population of the provisioned capacity bucket is reduced by N. That is, in such embodiments, token populations of the source and destination buckets may be adjusted, and tokens may not actually be transmitted or transferred as such. In some embodiments, if N unused tokens are found in a source bucket, N tokens may be added to each of a plurality of destination buckets (e.g., a detection of a single unused provisioned-capacity bucket token may result in an increment to the populations of both a PBB and an SBB of a compound token bucket 801). If such a transfer is to be performed (as detected in element 1220), the population of the source bucket(s) of the transfer may be reduced and the population of the destination bucket(s) may be increased (element 1223).

Tokens may be added to various buckets as needed, in accordance with their respective refill policies (element 1227), and if an atomic operation or transaction was started in operations corresponding to element 1210, the atomic operation may be terminated (element 1230). Such refill operations may be performed in some embodiments, regardless of whether tokens were consumed, discarded or transferred (i.e., both the positive and negative outcomes of the decisions made in elements 1214 and 1220 may be followed by refill operations in such embodiments). By performing the various token population adjustments described within a single atomic operation, the admission controller may ensure a desired level of consistency across multiple bucket combinations in such embodiments. The admission controller may then await the next triggering event, and operations corresponding to elements 1206 onwards may be repeated when the next triggering event is detected.

Figure 13:
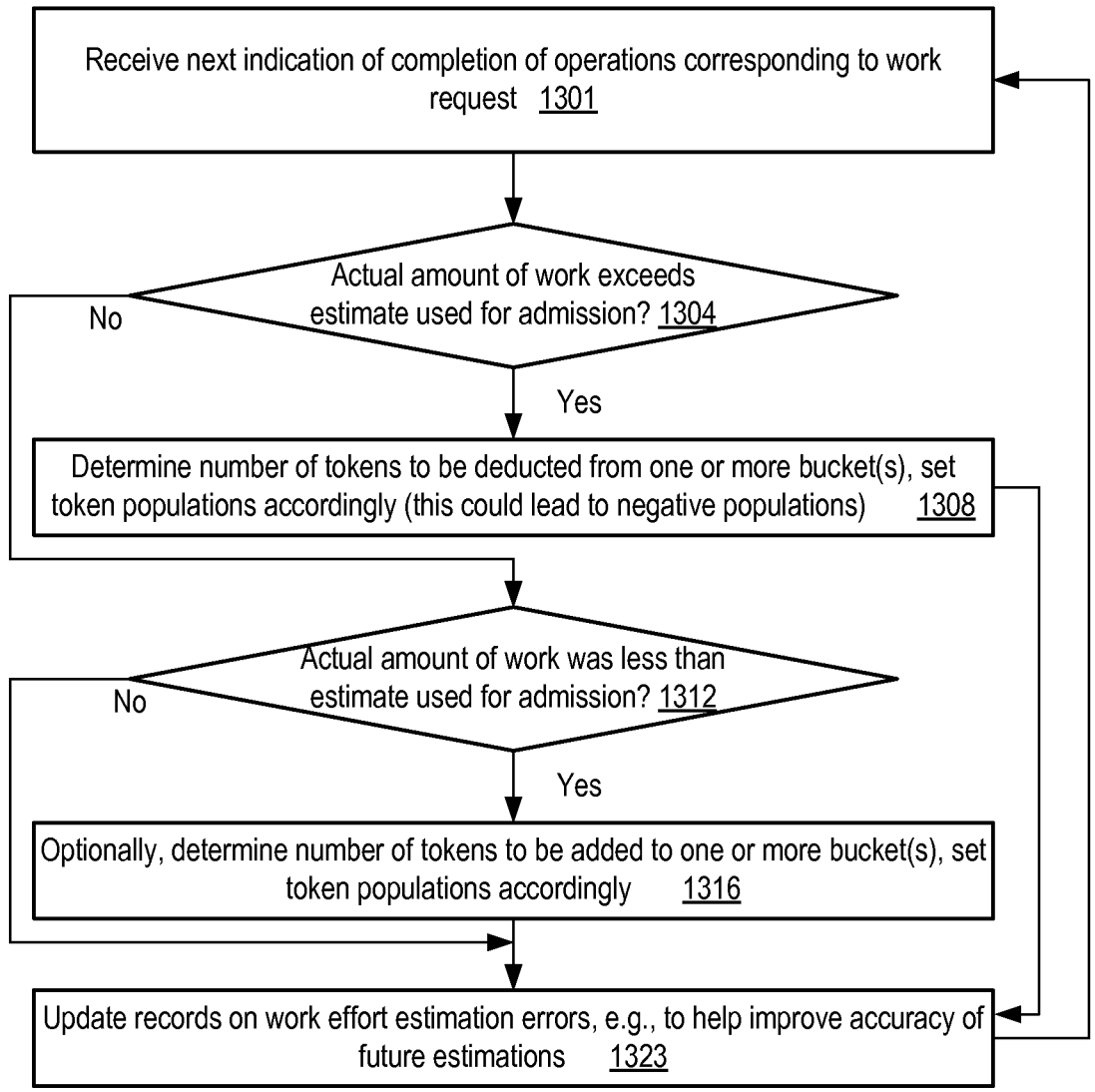
FIG. 13 is a flow diagram illustrating aspects of operations that may be performed to adjust token counts in one or more token buckets after work operations corresponding to an admitted work request complete, according to at least some embodiments.

As noted earlier, in at least some embodiments, the outcome of an admission control decision, and/or the number of tokens consumed in conjunction with the acceptance of a work request, may be based at least in part on an estimate of the amount of work to be performed if the work request is accepted. The estimate may in some cases turn out to be inaccurate, and the admission controller 180 may be configured to compensate for such estimation errors in some embodiments, e.g., when the work for an accepted request is completed and the discrepancy (if any) becomes known. FIG. 13 is a flow diagram illustrating aspects of operations that may be performed to adjust token counts in one or more token buckets after work operations corresponding to an admitted work request complete, according to at least some embodiments. As shown in element 1301, the admission controller may receive the next indication of completion of work corresponding to a work request. Such an indication may be provided, for example, asynchronously to the admission controller by an administrative component of the service at which the work target is implemented, and may include a metric of the actual amount of work done for the request.

In the depicted embodiment, the admission controller 180 may determine whether the original estimate was too high or too low with respect to the actual amount of work done. If more work was done than estimated (as determined in element 1304), the admission controller may determine a number of tokens to be deducted from one or more token buckets in compensation for the underestimation (element 1308), and adjust the bucket populations downwards accordingly. In some cases, the adjustment may result in negative token populations. Eventually, refill operations may restore token populations to positive values, but while the token population in a given bucket remains negative, new work requests for which admission decisions are made based on the given bucket's population may be rejected in at least some embodiments.

According to at least one embodiment, if the original work estimate was too high (as determined in element 1312), the admission controller 180 may optionally determine a number of tokens to be added to one or more buckets, and set the bucket populations accordingly (element 1316). In the depicted embodiment, the admission controller may be configured to maintain records of the accuracy of work estimates, e.g., records of the estimate and the actual amount of work for some or all accepted work requests over a period of time may be maintained in a database or log. Accordingly, regardless of whether the estimate was accurate or not, and regardless of the direction of the error in those cases in which there was an error (e.g., regardless of whether the estimate was too high or too low), the admission controller may update records of work estimation errors (element 1323). Such record keeping may, for example, help improve the accuracy of the estimates over time, as the admission controller may adapt its estimation procedures based on the errors. In some embodiments, such records may be kept for only a subset (e.g., a random sample) of work requests, or may only be kept for those work requests for which the magnitude of the error was above a threshold. After updating the records, the admission controller may wait to be informed about the next completion in the depicted embodiment, and the operations corresponding to elements 1301 onwards may be repeated. In some embodiments, operations similar to those shown in FIG. 13 may be performed for burst-mode buckets as well as for normal-mode buckets. In at least one embodiment, retroactive adjustments to bucket populations of the kinds illustrated in FIG. 13 may be performed at a low priority with respect to the admission control decisions for incoming client work requests, or as background tasks.

Figure 14:
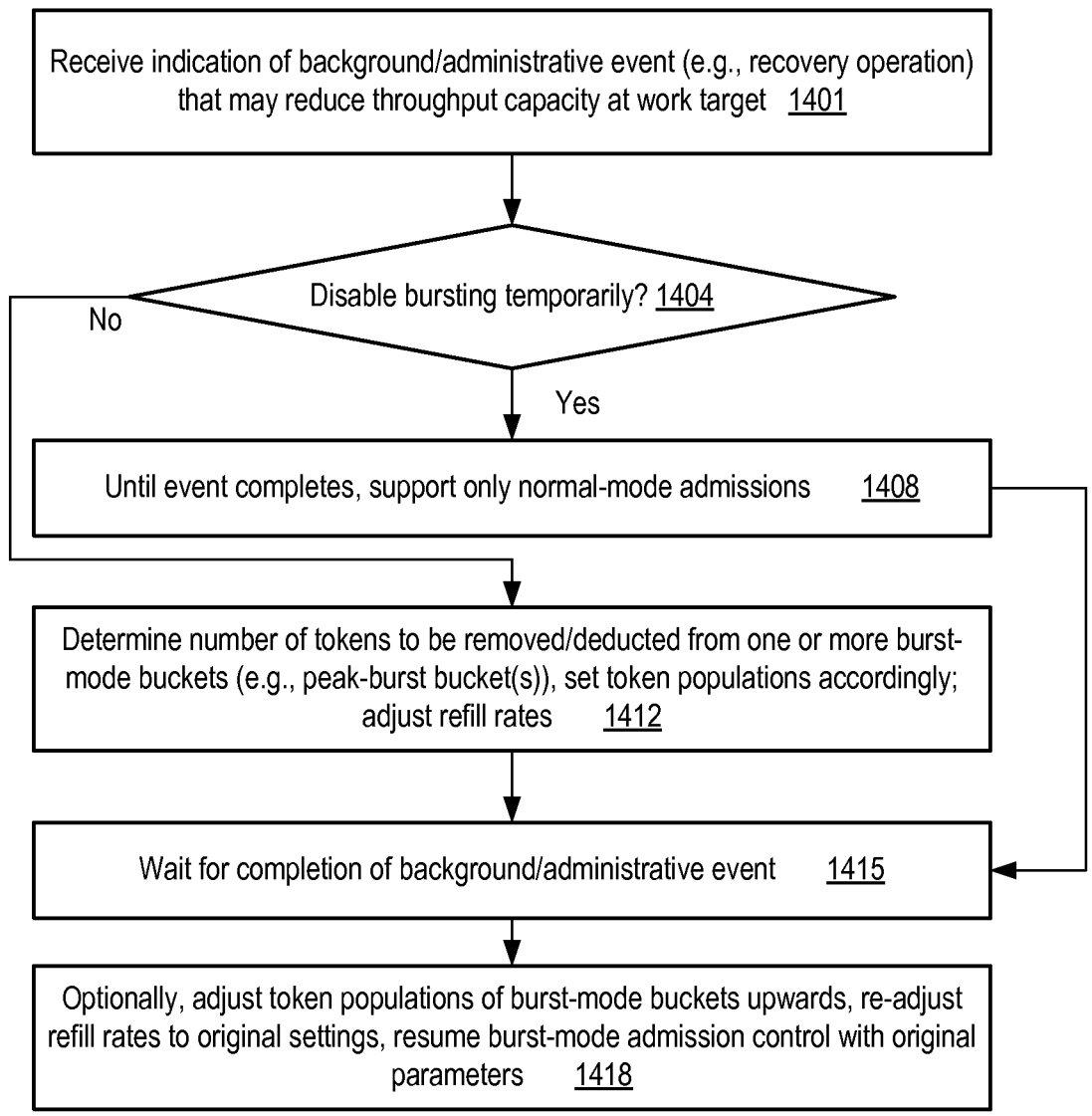
FIG. 14 is a flow diagram illustrating aspects of operations that may be performed to modify burst-mode admission control parameters in response to administrative events, according to at least some embodiments.

In some embodiments, the available throughput capacity of a given work target may be affected by factors other than incoming work requests. For example, certain kinds of administrative operations, such as recovery from failure during which the state of the work target is restored, or various types of maintenance operations, may reduce the throughput capacity available for client requests. FIG. 14 is a flow diagram illustrating aspects of operations that may be performed to modify burst-mode admission control parameters in response to administrative events, according to at least some embodiments. As shown in element 1401, the admission controller 180 may receive an indication of a background or administrative event (i.e., an event not resulting directly from a client work request), such as a start of a recovery operation, that may lead to a reduction in available throughput capacity of one or more work targets. The admission controller may then determine whether, in view of the event, bursting (e.g., at a rate higher than the provisioned throughput capacity) is to be disabled temporarily. If bursting is to be disabled (as determined in element 1404), only normal-mode admissions may be supported until the event completes (element 1408).

If bursting is not to be disabled entirely (as also determined in element 1404), the admission controller may be configured in some embodiments to throttle the amount of bursting permitted, e.g., by removing some tokens from one or more buckets, or by adjusting refill rates downwards temporarily. In such embodiments, the admission controller may determine the number of tokens to be deducted and/or the extent to which the refill rates are to be lowered (element 1412). Populations of one or more buckets may be adjusted accordingly, and/or the refill rates may be modified as determined. In some cases, the population of a given bucket may fall below zero as a result of the adjustments in at least one embodiment. The admission controller may then await a notification that the administrative or background event has completed (element 1415). After the event completes, the admission controller may, in at least some embodiments, optionally undo some or all of the changes that were made due to the event (element 1418)—e.g., populations of some buckets may be increased and/or refill rates may be restored to their original values. Burst-mode admission control with the original parameters that were in use before the event notification was received may be resumed in some embodiments. It is noted that in at least some embodiments, normal-mode (as opposed to burst-mode) admission control may continue unaffected while the background or administrative events occur. In at least some embodiments, during the administrative event, tokens may continue to be added to the burst-mode buckets in accordance with the (possibly modified) refill rates.

Figure 15:
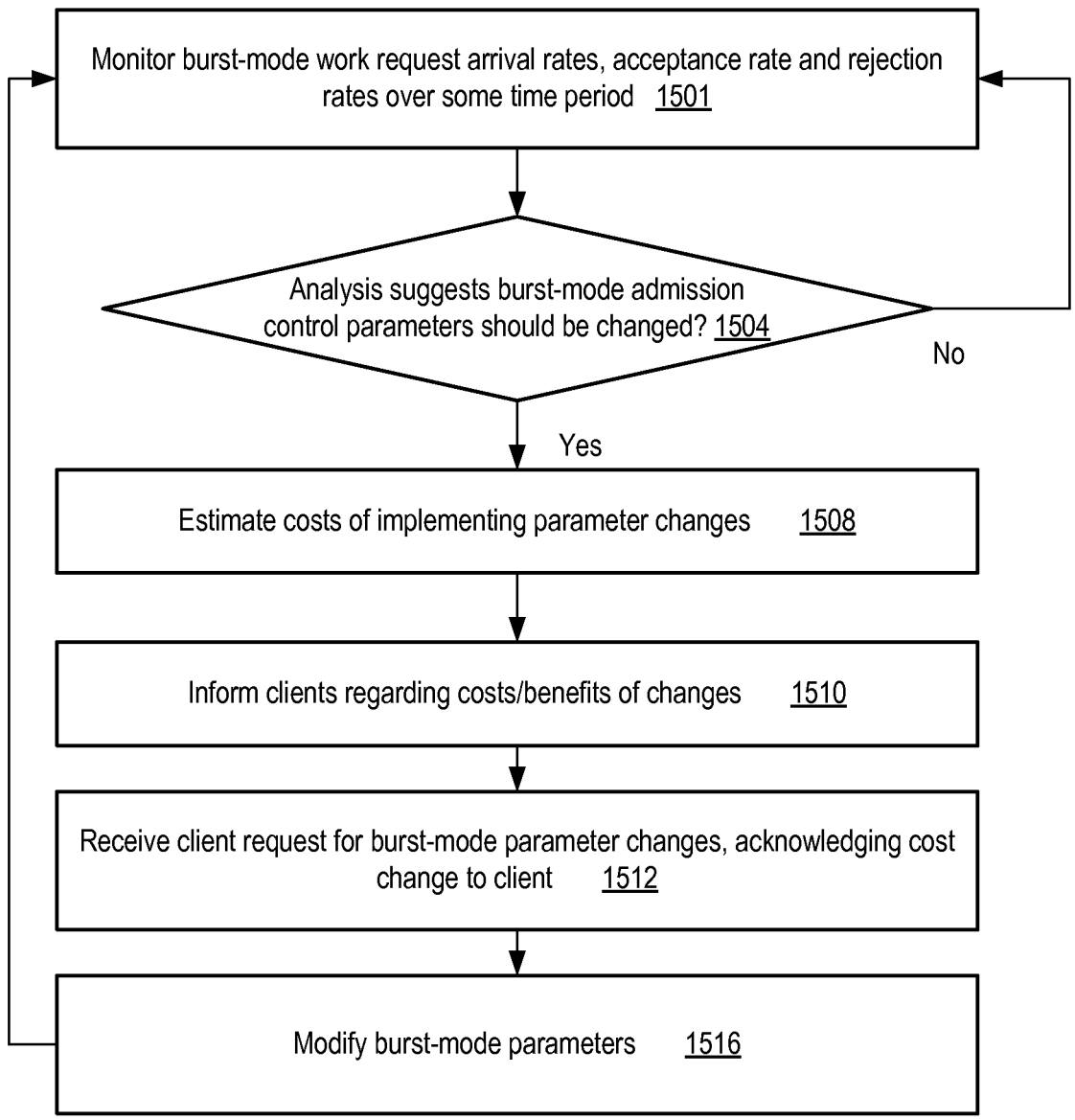
FIG. 15 is a flow diagram illustrating aspects of operations that may be performed to adjust parameters used for token-based burst-mode admission control, according to at least some embodiments.

Over time, at least some of the parameters (such as refill rates, maximum bucket populations and the like) governing burst-mode admission control for a given work target may need to be modified. FIG. 15 is a flow diagrams illustrating aspects of operations that may be performed to adjust parameters used for token-based burst-mode admission control, according to at least some embodiments. As shown in element 1501, the work request arrival rate, the acceptance rate and/or the rejection rate for one or more work targets may be monitored (e.g., by the admission controller, or by an optimization engine affiliated with the service implementing the work target(s)) in the depicted embodiment. The collected data regarding admissions, rejections and arrival rates may be analyzed, e.g., together with resource usage metrics collected from or associated with the work targets. If the analysis suggests (as determined in element 1504) that parameters governing burst-mode admission control should be changed, the admission controller or another component of the service may determine an estimate of the costs of implementing parameter changes (element 1508). If the analysis suggests that no parameter changes are required, the monitoring operations of element 1501 may be resumed.

In some cases the costs (or at least the portion of the costs that may be billed to the clients) may be negligible or zero. In such a scenario, the parameter changes may be made without further interactions with the client on whose behalf a work target was set up. In other cases, the client or clients may be notified regarding the potential costs and the potential benefits of the proposed parameter changes (element 1510). If a client responds with a parameter change request for one or more burst-mode parameters (element 1512), the parameter changes may be implemented (element 1516). The admission controller may resume monitoring arrival rates, acceptance rates and rejection rates (element 1501). It is noted that in some embodiments, admission control parameter changes similar to those indicated in FIG. 15 may be introduced for reasons not directly related to the analysis of monitored metrics indicated in elements 1501 and 1504. For example, in some embodiments a client may request a change in the provisioned throughput for a given work target, and admission control parameters (at least some of which may be functions of the provisioned throughput) may be changed automatically when the work target's provisioned throughput change request is accepted. In other embodiments, administrators of the service implementing the work target may change at least some of the admission control parameters, at least temporarily, for various other reasons such as maintenance windows, upgrades, equipment changes, and the like. Only a subset of the parameters may be accessible to clients in at least some embodiments, thus allowing substantial administrative control over parameter changes.

Token Sharing Across Work Targets

Figure 16:
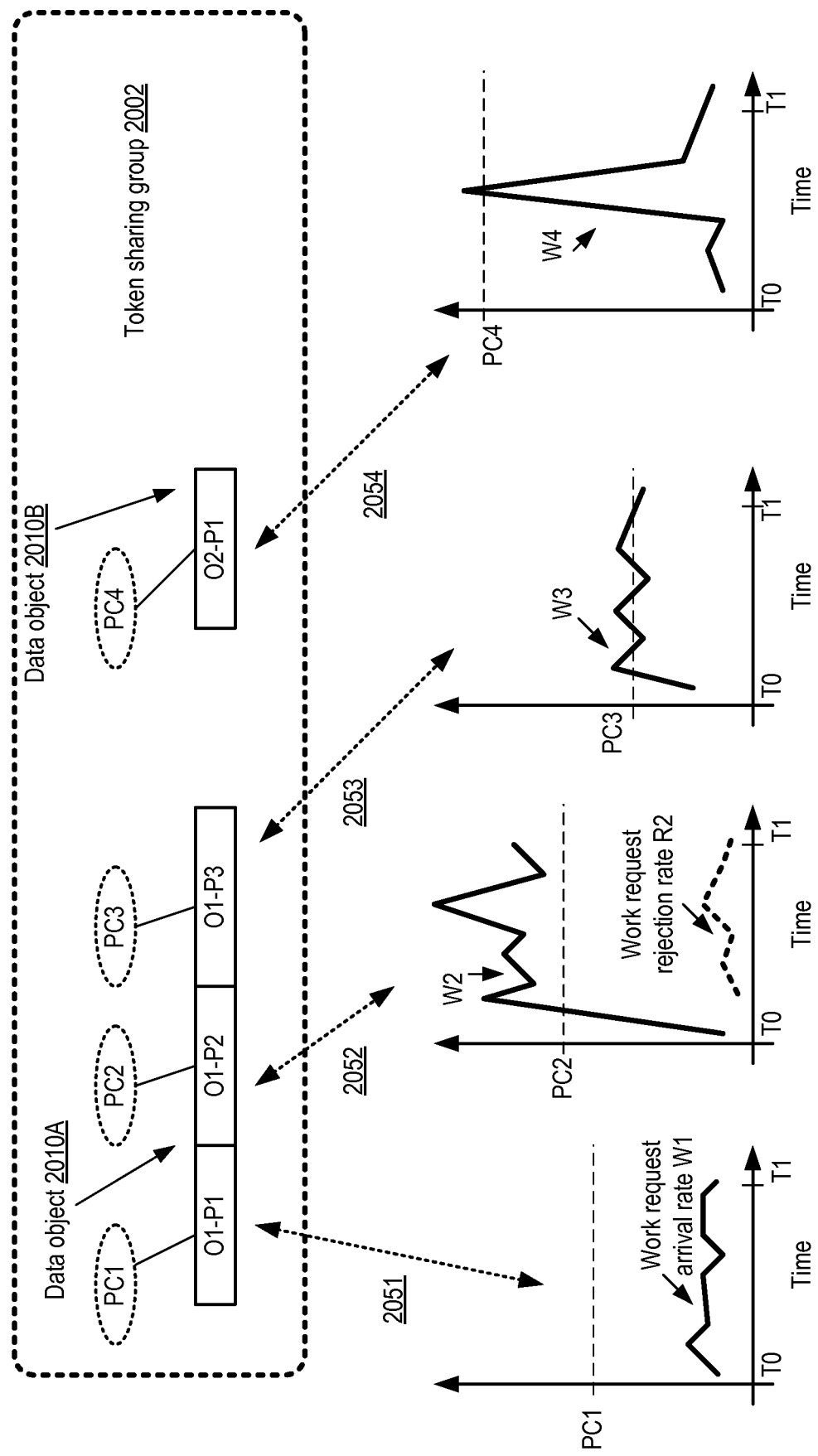
FIG. 16 illustrates an example of non-uniform distribution of work requests with respect to different subsets of data managed by a service, in combination with non-uniformity of work request arrival rates, according to at least some embodiments.

As mentioned earlier, at least in some environments, work requests may be distributed non-uniformly not only with respect to time, but also with respect to the specific data subsets targeted. FIG. 16 illustrates an example of non-uniform distribution of work requests with respect to different subsets of data managed by a service, in combination with non-uniformity of work request arrival rates, according to at least some embodiments. A data object 2010A (which may comprise, for example, a database table) comprises three partitions labeled O1-P1, O1-P2 and O1-P3 in the depicted embodiment, while another data object 2010B comprises partition O2-P1. Each partition may be considered a distinct work target with a respective provisioned capacity (e.g., expressed in work requests per second such as reads/second, writes/second etc.), indicated by the objects labeled PC1 (the provisioned capacity of partitions O1-P1, O1-P2, O1-P3 and O1-P4 is PC1, PC2, PC3 and PC4 respectively). Admission control decisions regarding whether to accept or reject incoming work requests are made separately at each of the partitions in the depicted embodiment, using a respective set of token buckets for each of the partitions. In some embodiments each partition may have a respective set of normal-mode and burst-mode token buckets, for example. The data objects 2010A and 2010B may be owned by or allocated to a single client entity, and may be used for a common purpose such as some set of client applications; thus, from the perspective of the owner of the data object, the four partitions may all be considered part of the same data set. Generally speaking, the four partitions may differ from one another in size (i.e., in the amount of data contained in each partition) and/or in provisioned capacity.

The rate W at which work requests arrive at each of the partitions or work targets during a time window T0-T1 is shown in the graphs included in FIG. 16. As indicated by arrows 2051, 2052, 2053 and 2054, the work request arrival rate at partitions O1-P1, O1-P2, O1-P3 and O2-P1 is represented respectively by the curves W1, W2, W3 and W4. The provisioned capacity for each of the partitions is also shown. In the case of O1-P1, the work request arrival rate W1 is consistently below the provisioned capacity PC1 during the depicted time window. For O1-P2, arrival rate W2 exceeds the provisioned capacity PC2 for much of the time period T0-T1; thus, O1-P2 may have remained in burst-mode for most of the illustrated time period. For O1-P3, the arrival rate is generally close to the provisioned capacity PC3, and the arrival rate W4 for O2-P1 only briefly exceeds the provisioned capacity PC4. As indicated by the work request rejection rate R2 at O1-P2, some number of work requests may have been rejected at O1-P2, e.g., despite the use of burst-mode buckets for admission control.

As shown, the rates at which work requests targeted to the different partitions arrive may differ substantially, even during the same time interval. Some partitions (e.g., O1-P1) may not even be using up all their normal-mode tokens, while other partitions of the same object (or of a different object with the same owner) may have such a high workload that work requests have to be rejected despite the implementation of one or more burst mode buckets. Accordingly, in the depicted embodiment, the four partitions may be deemed members of a token-sharing group 2002, and an iterative token-sharing protocol may be implemented within the group 2002 to try to reduce the impact of the spatial non-uniformity illustrated.

The token sharing protocol may result in some number or all of the partitions or work targets (e.g., the admission controller of each of the partitions) being triggered (e.g., at regular intervals, or after random amounts of time) to determine whether an evaluation of a token-sharing iteration should be attempted. That is, a given work target such as O1-P2 may decide, based on any of various criteria, whether it is worthwhile, given its current bucket populations and recent workload, to try to find one or more partner work targets with which tokens could be exchanged. If a decision is made to evaluate token sharing, the work target may take on the role of a token-sharing initiator for the current iteration of the protocol, and may identify one or more partner work targets (members of the same token-sharing group) with which to exchange token population information for one or more bucket types. After an analysis of the token populations of the initiator and a partner peer, a second decision may be made, as to whether some number of tokens should be transferred in one direction or the other between the initiator and the second peer involved. Thus, for example, in FIG. 16, O1-P2 may be the initiator, and may exchange token population information regarding a burst-mode token bucket with O1-P1. If O1-P2's burst-mode bucket has a much lower token count than O1-P1's corresponding burst-mode bucket, O1-P1 and O1-P2 may mutually conclude that O1-P1 should transfer some number N of tokens to O1-P2. Accordingly, N tokens may be added to O1-P2's bucket, while N tokens may be deleted from O1-P1's bucket. The addition of tokens may help O1-P2 to sustain the higher workloads illustrated in FIG. 16, while the reduction of tokens at O1-P1 may not have any negative effects given the lower rate of requests at O1-P1. Later, in subsequent iterations of the token sharing protocol, if needed, some other peer work target may transfer tokens to whichever work target happens to be heavily loaded; for example, O1-P2 itself may later be in a position to transfer tokens to any of the other partitions, while O1-P1 may end up requesting tokens instead of providing them to other partitions. The exact number of tokens to be logically transferred may be determined by mutual consent among the work targets involved in a given transfer in some embodiments, e.g., based on the difference in token populations, and/or based on an amount of tokens requested by one of the work targets, and so on.

In at least some embodiments, a "gossip protocol" may be used for such token transfers. In such an embodiment, each work target may be configured to act as an initiator after a random amount of time, and use random selection to identify a different work target for population exchange. Decisions as to whether to participate in a token transfer (or even in a token population exchange) may be made autonomously by each work target in some embodiments. Membership in a token-sharing group may be determined based on various factors in different embodiments. For example, in some embodiments, a given client C1 may indicate that its data objects O1, O2, and O3 are to be considered members of one token-sharing group G1, data objects O4 and O5 are to be considered members of another token-sharing group G2, while tokens of data object O6 are not to be shared. In some embodiments the network-accessible service may make at least some token-sharing group membership decisions, while in other embodiments token-sharing may be implemented for a given set of work targets only in response to explicit requests from clients. In some embodiments several different clients may decide to share tokens as needed among their data objects—i.e., not all the members of a token sharing group may have to be owned by the same client entity (such as a business organization or an individual user of the network-accessible service).

Example Token-Sharing Protocol Iterations

FIG. 17 illustrates example iterations of a token-sharing protocol that may be implemented to alleviate effects of spatial non-uniformity of data access, according to at least some embodiments. Three peer work targets (e.g., table partitions) Peer A, Peer B, and Peer C, are members of the same token-sharing group in the illustrated example, and each has a single token bucket (e.g., a burst-mode bucket, or a normal-mode bucket) involved in token sharing. The token population of the buckets of the three peers are shown over time as successive iterations of the protocol occur, with time increasing from the top of the figure to the bottom. To simplify the example, starting from iteration 1 of the protocol onwards, token population changes resulting from refill rates, admissions of work requests, or other factors are ignored, and only those token population changes that result from implementing the token-sharing protocol are included.

At the beginning of the time period illustrated in FIG. 17, each peer has 1000 tokens in its bucket. Due to incoming work requests indicated by arrow 2150, at the time that the first iteration of the protocol starts, Peer A has only 50 tokens, while Peer B and Peer C still have 1000 tokens. In each iteration, one of the peers initiates an exchange of token population information with one other peer in the illustrated example (multiple peer pairs may be involved in a given iteration in some embodiments; only a simplified example of the working of the protocol is provided in FIG. 17). The two peers involved compare their token populations P1 and P2, and (assuming for the moment that P1>P2), decide to transfer (P1-P2)/2 tokens (rounded to an integer) from the peer with more tokens to the peer with fewer tokens. In various implementations, the number of tokens transferred may be determined based on various different factors, e.g., a formula or function other than (P1-P2)/2 may be used.

Thus, during iteration 1 in the illustrated example, Peer C (with 1000 tokens) initiates a population exchange with Peer A (50 tokens), and the token transfer size is determined as (1000−50)/2=475. 475 tokens are thus added to Peer A's bucket, while 475 tokens are removed from Peer C's bucket, as indicated by the arrow from Peer C to Peer A. After the transfer, both Peer A and Peer C have 525 tokens.

In iteration 2, token population information is exchanged between Peer B (1000 tokens) acting as initiator, and Peer A (525 tokens), resulting in a transfer of (1000-525)/2 or approximately 237 tokens from Peer B to Peer A. As a result, Peer A now has a total of 763 tokens, and Peer B has 762. (The number of tokens at Peer A and B differs by one at the end of iteration 2 because fractional tokens are not supported in the depicted embodiment. In other embodiments, fractional token counts may be supported, in which case both Peer A and Peer B may end up with 762.5 tokens.)

In iteration 3, Peer A (763 tokens) and Peer C (525 tokens) again exchange token populations, and Peer A transfers (763-525)/2 or 119 tokens to Peer C. In iteration 4, Peer B (762 tokens) transfers 59 tokens to Peer C (644 tokens), and in iteration 5, Peer B (703 tokens) transfers 29 tokens to Peer A (644 tokens). Additional iterations (not shown) may result in further transfers of tokens from peers that have more tokens to peers that have fewer tokens. It is noted that the example iterations illustrated in FIG. 17 are intended to illustrate high-level characteristics of the particular token sharing protocol in use in the depicted embodiment, not to cover protocol rules necessarily applicable more generally or to other embodiments.

Decisions regarding exactly when and under what circumstances a given work target should initiate token population exchange, with which other work targets the population exchange should be conducted, and what criteria should be used to decide how many tokens (if any) should be transferred, may all be made based on different sets of criteria in different embodiments. In some embodiments, for example, if an admission controller or other service management component at a given work target discovers that the rejection rate at that work target is above a threshold, a new iteration of token-sharing protocol may be initiated. In other embodiments, if the token count in some set of buckets (e.g., in a burst-mode bucket) falls below a threshold, a new iteration of the token-sharing protocol may be initiated. In some implementations, as mentioned above, iterations of the protocol may be initiated at random times from randomly-selected work targets, and the work target with which the population information is exchanged may also be selected at random. In at least one embodiment, in order to reduce potential overhead caused by implementing successive token-sharing protocol iterations too frequently, a throttling policy for token sharing may be enforced, so that for example the maximum number of tokens that a given work target can transfer to, and/or receive from, any other work target within X seconds or minutes is restricted to some number Tmax. Other throttling policies may be applied in other implementations, such as restricting back-and-forth token transfers between the same pair of work targets to some maximum rate—e.g., work targets WT1 and WT2 may be permitted to participate in a maximum of K token transfers per every fifteen minutes. In some cases, a new token transfer at time Tk may not be permitted between a pair of work targets WT1 and WT2 if a different token transfer occurred within a specified time window prior to Tk.

In the example shown in FIG. 17, the number of tokens transferred is simply computed as half the difference between the peer with the higher token population and the peer with the lower token population. In other embodiments, transfer sizes may be determined based on other factors—e.g., each work target may have a minimum token population with respect to token transfers (so that if the minimum level is reached, no tokens may be transferred even if another work target has a lower token count), or the number of tokens transferred may be based at least in part on the recent workload level at the work target, or on the provisioned capacity at the work target. The donation of tokens to other work targets may be voluntary in at least some embodiments—e.g., even if a given work target WT1 has far more tokens than one of its peers WT2, WT1 may not be obliged to transfer any tokens to WT2 (for example, a heavy burst of work requests may be anticipated in the near future at WT1, so transferring tokens to other work targets may not be appropriate).

Token-Sharing in Environments Supporting Data Replication Roles

Figure 18:
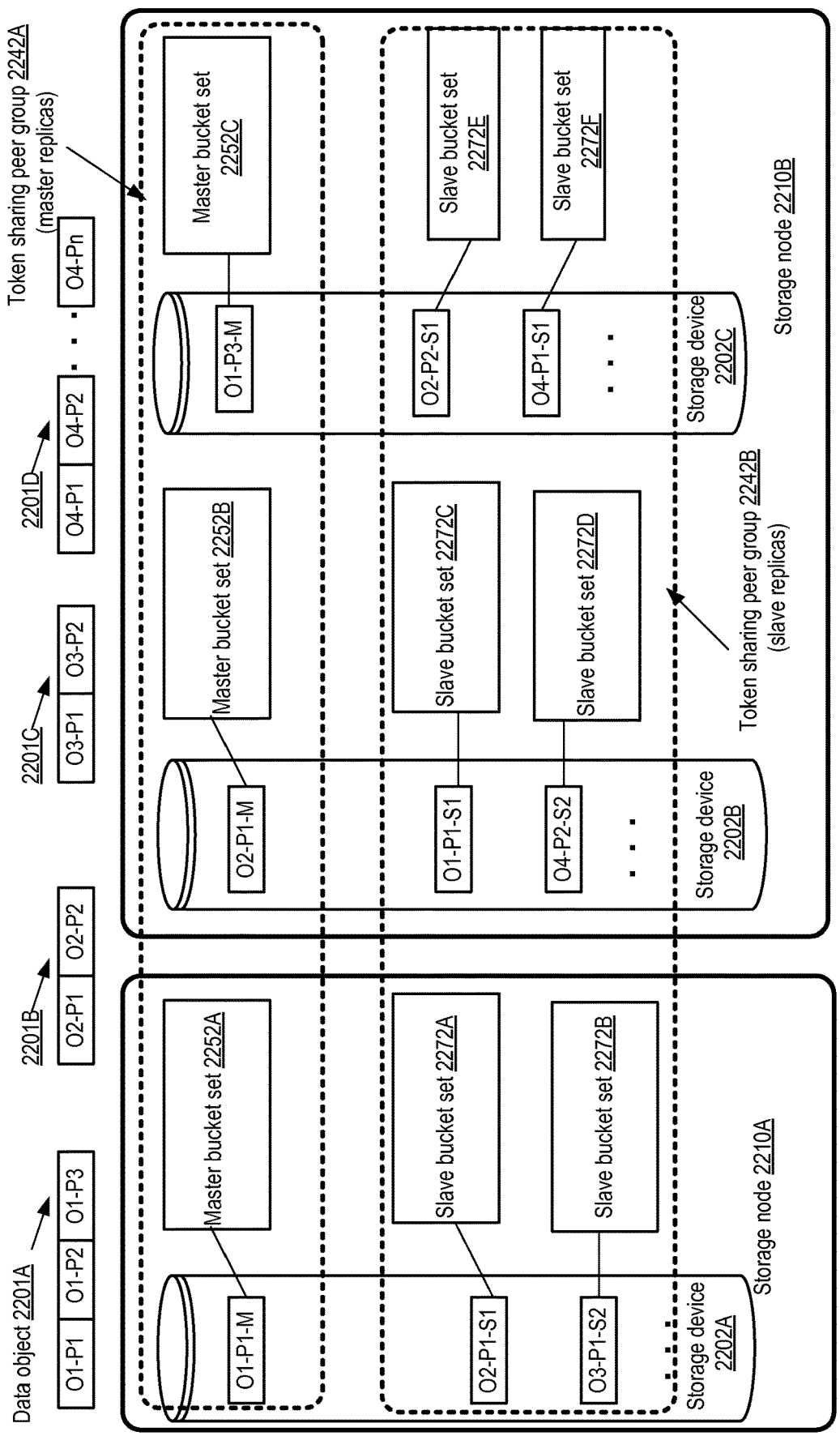
FIG. 18 illustrates examples of token sharing peer groups that may be established in an environment in which data partitions are replicated, according to at least some embodiments.

In some embodiments, as mentioned earlier, a database service or a storage service may store multiple replicas of a client's data, and different replicas may have different roles with respect to admission control of work requests—e.g., in environments where work requests may include reads and writes, some replicas may be responsible for admission control for writes as well as reads, while other replicas may only handle reads. In such embodiments, the group of peer work targets among which token-sharing protocols are implemented may be determined at least in part by the replica roles. FIG. 18 illustrates examples of token sharing peer groups that may be established in an environment in which data partitions are replicated, according to at least some embodiments.

Data objects 2201 (e.g., database tables or storage volumes), such as objects 2201A, 2201B, 2201C and 2201D, may each comprise one or more logical partitions, and corresponding to each of the logical partitions, two or more physical replicas may be stored in accordance with a data durability requirement of the service. One of the physical replicas may be termed a "master" replica (or, simply, the master) in the depicted embodiment, and the remaining replicas may be termed "slave" replicas (or, simply, slaves). The master replica may be responsible for admission control for work requests that include writes, while read requests may be accepted for execution at any of the replicas (the master as well as the slave replica(s)) in the depicted embodiment. Thus, a write request directed to a given logical partition may be directed to the master replica, where a decision as to whether to accept or reject the write may be made. If the write is accepted, the corresponding data modifications may first be performed at the master, and then propagated to the slaves. Read requests may be directed to any of the replicas in the embodiment shown in FIG. 18 (and as a result, some of the data read at a slave may be slightly out-of-date with respect to the most recent write requests, whose changes may not have been replicated at the slave). Each physical replica may have an associated set of token buckets for admission control—e.g., a master bucket set for master replicas and a slave bucket set for each slave replica. The "master" and "slave" roles assigned to a given physical replica may change over time—e.g., due to a failure or loss of connectivity to a master, a slave may be promoted to a master role. In other embodiments, the responsibilities associated with master and slave roles may differ—e.g., in some embodiments, admission control for reads may also be performed at the master.

In the embodiment shown in FIG. 18, data object 2201A has logical partitions O1-P1, O1-P2, and O1-P3. Master replicas for a given logical partition Ox-Py are labeled Ox-Py-M, while the kth slave replica is labeled Ox-Py-Sk. The master replica for O1-P1, labeled O1-P1-M, is located on a storage device 2202A attached to a storage node 2210A of the service. A slave replica for O1-P1, labeled O1-P1-S1, is located at storage device 2202B at storage node 2210B. Data object 2201B has logical partitions O2-P1 and O2-P2, data object 2201C has logical partitions O3-P1 and O3-P2, while data object 2201D has n logical partitions O4-P1 . . . O4-Pn. In general, for data durability, multiple replicas of the same logical partitions may not be stored on the same storage device or the same storage node in the depicted embodiment. Except for such durability-derived constraints, replicas may generally be stored on any (e.g., randomly selected) storage device or storage node that has sufficient space available in the depicted embodiment. For example, storage device 2202A also includes slave replica O2-P1-S1 of logical partition O2-P1 of data object 2201B and slave replica O3-P1-S2 of logical partition O3-P1 of data object 2201C, while storage device 2202B includes slave replica O4-P2-S2 and master replica O2-P1-M, and storage device 2202C, also at storage node 2210B, includes master replica O1-P3-M and slave replicas O2-P1-S1 and O4-P1-S1. (Due to space limitations, only some of the replicas of some of the partitions of data objects 2201A-2201D are shown in FIG. 18).

Each physical replica, whether a slave or a master, has a respective set of token buckets for admission control of work requests directed to the replica. For example, master replicas O1-P1-M, O2-P1-M and O1-P3-M have respective master bucket sets 2252A, 2252B and 2252C. Slaves O2-P1-S1 and O3-P1-S2 at storage device 2202A have slave bucket sets 2272A and 2272B, while slaves O1-P1-S1 and O4-P2-S2 have slave bucket sets 2272C and 2272D, and slaves O2-P2-S1 and O4-P1-S1 have slave bucket sets 2272E and 2272F. Each bucket set may comprise one or more token buckets similar to those described earlier, including for example one or more normal-mode token buckets and/or burst-mode token buckets (including, in some cases, compound burst-mode token buckets). In some embodiments in which separate token buckets are configured for reads and writes (e.g., as illustrated in FIG. 5), and slaves do not participate in admission control for writes, slave bucket sets 2272 may comprise only read token buckets, while master bucket sets 2252 may include both read and write buckets.

Since the master and slave roles may correspond to different admission control responsibilities, in the depicted embodiment, a given master replica may be permitted to participate in a token-sharing protocol only with other masters, and similarly, a slave replica may only share tokens with other slaves. Accordingly, the replicas illustrated in FIG. 18 may be divided into two token-sharing peer groups 2242A and 2242B. Token-sharing peer group 2242A may comprise the master replicas of some set of data objects, such as masters O1-P1-M, O2-P1-M and O1-P3-M. Other master replicas of the objects 2201A-2201D, not shown in FIG. 18, may also be included in group 2242A. Token-sharing peer group 2242B may comprise slaves O2-P1-S1, O3-P1-S2, O1-P1-S1, O4-P2-S2, O2-P2-S1 and O4-P1-S1 (as well as other slave replicas not shown in FIG. 18). Thus, in the depicted embodiment, master replicas may exchange token population information with, and transfer tokens to/from, other masters, and slave replicas may exchange token populations and/or tokens with other slaves. Such restrictions may reflect an assumption about the value of a token at a master relative to the value of a token at a slave, for example—e.g., an assumption that since masters have more admission control responsibilities than slaves, losing or gaining a token at a master may have a different impact than losing or gaining a token at a slave. In some embodiments, such role-based restrictions may not be enforced, so that masters may also or instead transfer tokens to slaves and vice versa.

Token-Sharing for Secondary Indexes

In some embodiments, token-based admission control may be implemented for non-relational database services, such as any of the various types of "NoSQL" services that have recently gained in popularity. In many such database services, different rows of a given table may in general have different sets of columns. Thus, at least in some cases, each row may be considered a (primary-key, value) pair, where the primary-key component is used for a primary index, while the value component may include some arbitrary collection of values corresponding to respective columns. In many cases, clients may wish to utilize secondary indexes on their non-relational data, i.e., indexes on columns other than the primary key. Such secondary indexes may be implemented using derived tables in some embodiments—e.g., at least some subset of the data corresponding to a given table (which may be referred to as a base table) may also be organized as a derived table to support fast access via a secondary index. In some cases, not all the columns of the base table may be replicated in the derived table. The base table and the derived tables used for one or more secondary indexes may each comprise one or more logical and/or physical partitions with respective token buckets for admission control in some embodiments. In some embodiments, the partitions of the base table and the partitions of the derived tables may participate as peers in a token-sharing protocol similar to the protocols described above. In some implementations, separate secondary indexes (and separate derived tables) may be set up for respective subsets (e.g., respective partitions) of the base table. In other implementations, a single derived table may be set up for a given secondary index, containing data corresponding to all the partitions of the base table; in the latter scenario, the secondary index may be termed a "global secondary index" or GSI, since data corresponding to the whole base table (rather than a subset of the base table) may be accessed.

Figure 19:
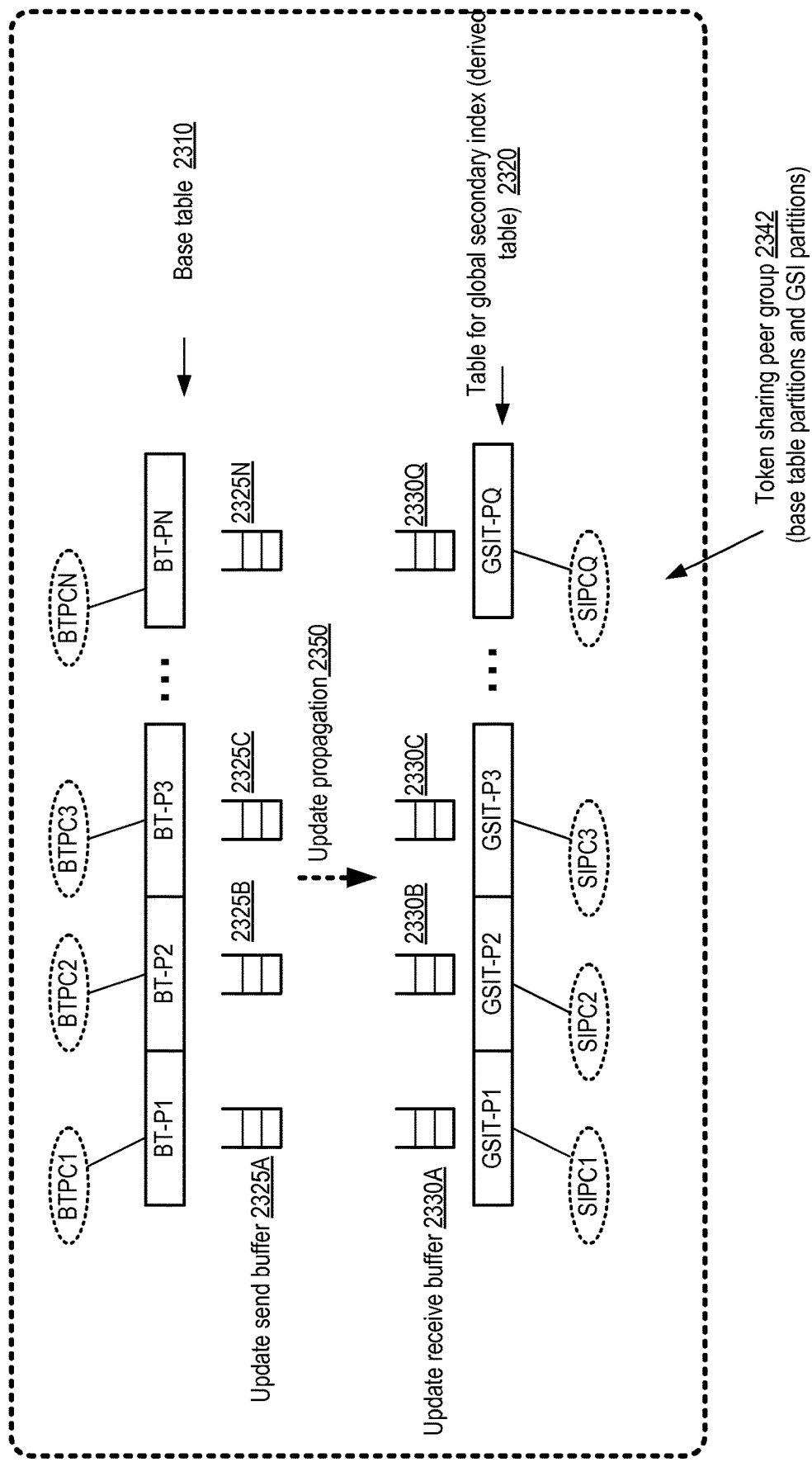
FIG. 19 illustrates an example of the use of token sharing at a database service to support workload management for secondary indexes, according to at least some embodiments.

FIG. 19 illustrates an example of the use of token sharing at a database service to support workload management for secondary indexes, according to at least some embodiments. In the depicted embodiment, base table 2310 comprises N partitions BT-P1, BT-P2, BT-PN. A derived table 2320 has been set up to support a GSI on the base table, and the derived table includes partitions GSIT-P1, GSIT-P2, . . . , GSIT-PQ. In some implementations, the partitions of the base table 2310 and/or the derived table 2320 may be replicated for data durability, although replicas are not shown in FIG. 19. In general, a different derived table may be created for each GSI set up for a given base table. Each partition of the base table, and each partition of the derived table, has a respective provisioned capacity, as indicated by the elements labeled BTPC1, BTPC2, . . . for the base table partitions and the elements labeled SIPC1, SIPC2, . . . for the derived table. Admission control decisions may be made independently for each of the partitions of either table in the depicted embodiment, and each partition may have a set of token buckets (such as one or more normal-mode and/or burst-mode token buckets). In some cases different types of buckets may be implemented for the base table than for the derived table—e.g., the base table may use a compound burst-mode bucket, while the derived table may use a straightforward (non-compound) burst-mode bucket.

In at least some embodiments, updates corresponding to client write requests may be made at the base table first, and then propagated to the derived table. For example, update send buffers may be established for each of the base table partitions, such as update send buffer 2325A for partition BT-P1, update send buffer 2325B for partition BT-P2, update send buffer 2325C for partition BT-P3, and update send buffer 2325N for partition BT-PN. Updates made at the base table partitions may be queued for propagation (as indicated by arrow 2350) in the corresponding send buffers, and eventually received at corresponding update receive buffers 2330 (e.g., receive buffers 2330A, 2330B, 2330C and 2330Q) at the derived table partitions before being applied to the data of the derived table. In general, there may not be a one-to-one mapping between the partitions of the base table and the derived table—e.g., a given update at partition BT-P1 may require data to be modified at a derived table partition GSIT-P3, while a different update at partition BT-P1 may result in a modification to GSIT-P1. In contrast to writes, which are first applied to the base table and then to the derived table, reads may be satisfied from the derived table without referring to the base table, depending on the nature of the read request—e.g., a read query that is framed in terms of the keys of the GSI may be responded to using the derived table, while a read query based on other keys may be responded to using either the base table or the derived table.

Provisioned capacities may be assigned to the base table and the derived table independently of each other in at least some embodiments. Thus, in one embodiment, when a client requests a table creation, the client may specify the provisioned capacity for the base table, and provide an indication of the GSI(s) to be established, using the logical equivalent of a statement similar to the following:
Create table $T1$ with hash-key $k1$, reads-per-second=12, writes-per-second=8,
 Global index $G1$ with hash-key $k2$;
In this example, a base table T1 is created with a primary key (in this case a hash-key) k1, with a provisioned throughput of 12 reads per second and 8 writes per second. The client also indicates that a global secondary index G1 be created with a different hash-key k2, but does not specify the provisioned throughput for the GSI. In such a scenario, the database service may assign the provisioned throughput to the base table partitions based on the total provisioned throughput for the base table specified by the client, and may have to assign the provisioned throughput for the derived table's partitions (used for the GSI) without further client interaction. The database service may use any of a number of different approaches to determine the derived table partitions' provisioned capacity in various embodiments.

Assume, for the purposes of this example, that two partitions BT-P1 and BT-P2 are to be set up for the base table, and two partitions GSIT-P1 and GSIT-P2 are to be set up for the derived table to support index G1. In one approach, the total provisioned capacity indicated by the client may be assumed to represent the number of reads and writes to be handled for both the base table as well as the derived table taken together. In this case, the 12 reads/second may be divided into 3 reads/second at each of BT-P1, BTR-P2, GSIT-P1, and GSIT-P2, and the 8 writes/second may similarly be divided into 2 writes/second at each of the four partitions. In another approach, the database service may assume that the client's requested provisioned capacity applies only to the base table, and that additional reads and writes are to be provisioned for the derived table's partitions. In this second approach, BT-P1 and BT-P2 may each be assigned provisioned capacities of 6 reads/second and 4 writes/second, while GSIT-P1 and GSIT-P2 may each be assigned provisioned capacities of "v" reads/second and "w" writes/second, where v and w may be estimated based on some heuristics or based on previous experience with similar GSIs.

In some embodiments, clients may be enabled to specify (and pay for) provisioned capacities explicitly for GSIs, e.g., a client may specify the logical equivalent of the following when requesting that a table be created:
Create table T2 with hash-key k1, reads-per-second=12, writes-per-second=8,
 Global index G2 with hash-key k, reads-per-second=6, writes-per-second=6;
In this example, the client indicates the desired provisioned read and write rates for the GSI separately from the provisioned read and write rates for the base table, and the database service may assign the provisioned capacities accordingly to the partitions of the base table and the derived table. It is noted that in some implementations, index keys other than hash keys (e.g., range keys) may also or instead be specified. In at least one embodiment, GSIs may be created for pre-existing tables, e.g., clients may not need to decide on the set of GSIs they need at the time the base table is created.

Over time, the workload to the partitions of the base table and the partitions of the derived tables may vary substantially, and during a given time interval, the read and/or write requests may be distributed non-uniformly across the partitions of both types of tables. In order to reduce negative impacts (such as work request rejections) of spatial non-uniformity, all the partitions of base table 2310 and derived table 2320 have been made members of a single token-sharing peer group 2342. Each of the partitions BT-Px and GSIT-Py may thus participate in the exchange of token populations for their respective token buckets, and, based on mutual agreement, in token transfers as described earlier.

Example Token-Sharing Message Sequences

FIG. 20a-20d illustrate examples of message sequence flows between participants in a token-sharing protocol, according to at least some embodiments. As described earlier, a token sharing protocol may involve one work target (e.g., a table partition) initiating an exchange of token population information with a second work target, followed potentially by a logical transfer of tokens (i.e., changes in token populations at both work targets without any token objects being transferred) after mutual agreement. The work target that initiates the population information exchange may be termed the "token-sharing initiator peer" or TSIP, while the recipient of the population information may be termed the "token-sharing partner peer" or TSPP herein. In the embodiment shown in FIG. 20a-20d, at least three types of messages may flow between a TSIP 2402 and a TSPP 2405: a token sharing request message TSReq, a token sharing acceptance message TSAcc, and a token sharing rejection message TSRej.

Figure 20A:
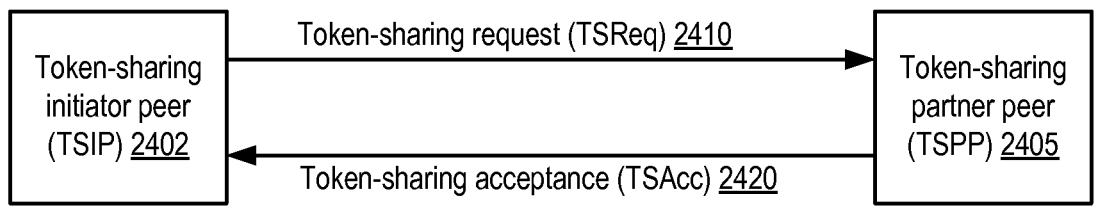
FIG. 20a-20d illustrate examples of message sequence flows between participants in a token-sharing protocol, according to at least some embodiments.

In the interaction depicted in FIG. 20a, the TSIP 2402 sends a TSReq message 2410 to a selected TSPP 2405. The TSReq message 2410 may comprise an indication of the token population of a particular bucket (e.g., a burst-mode bucket) at the TSIP 2402. In some implementations, the TSReq message may also include an indication of the additional number of tokens that the TSIP wishes to obtain, or in some cases an indication of the number of tokens the TSIP is willing to provide to the TSPP 2405. In response, the TSPP 2405 sends an acceptance message TSAcc 2420. The TSAcc message 2420 may indicate, for example, the token population at the TSPP, and/or the number of tokens the TSPP 2405 is willing to provide to the TSIP 2402 (or the number of tokens the TSPP is willing to accept from the TSIP). After the TSReq and TSacc have been exchanged, both the TSIP and the TSPP may modify their token populations in accordance with the mutually-agreed-upon transfer in the depicted embodiment.

Figure 20B:
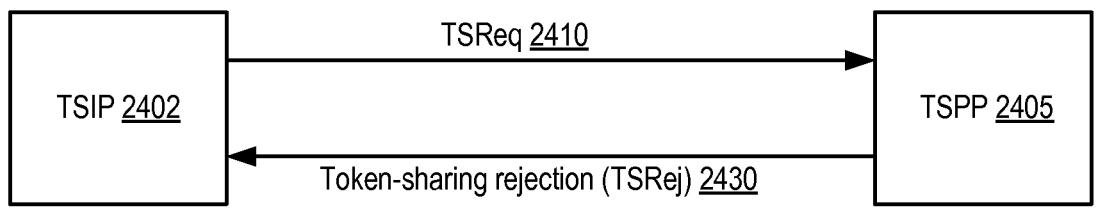

In the interaction depicted in FIG. 20b, the TSIP 2402 sends a similar TSReq message 420, but in this case, the TSPP 2405 sends a rejection message TSRej 2430 back to the TSIP, indicating that the proposed token transfer is not acceptable by the TSPP. Accordingly, depending on the needs of the TSIP 2402, the TSIP may try to initiate a token exchange with some other partner peer, or may wait for some time before initiating another iteration of the token sharing protocol. In some implementations, an absence of a reply from the TSPP to a TSReq message within a particular time window may be deemed the equivalent of a rejection. In one implementation, the TSIP 2402 may resend a TSReq message a few times before assuming that the TSPP 2405 is not available for the requested token transfer.

Figure 20C:
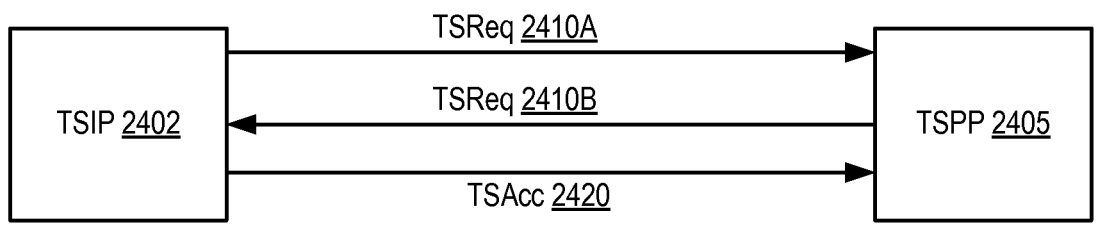

In FIG. 20c, the TSPP 2402 sends its TSReq 2410A, comprising the same type of information (e.g., the TSPP's token population, and optionally an indication of the nature or size of a requested token transfer) to the TSPP 2405. The TSPP 2405 receives the request, and decides to make a counter-offer, i.e., a request for a different transfer than was indicated in TSReq 2410A. Accordingly, TSPP 2405 sends back a different TSReq 2410B, indicating the TSPP's token population, and an indication of a direction and quantity of tokens that the TSPP would like to be transferred. The TSIP 2402 may receive the TSReq 2410A, and send a TSAcc message 2420 to accept the modified transfer, and the two sides may adjust their token populations accordingly.

Figure 20D:
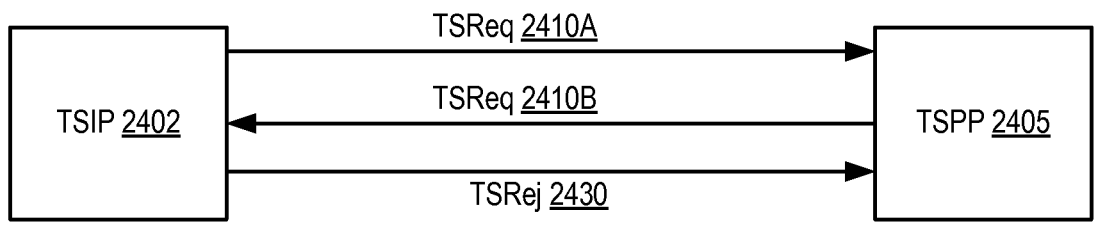

In FIG. 20d, TSPP 2402 sends its TSReq 2410A, and TSPP sends back its own TSReq 2410B in a manner similar to that shown in FIG. 20c. In this case, TSIP 2402 rejects TSReq 2410B, and sends a rejection message TSRej 2430 to inform TSPP 2405 of the rejection.

It is noted that in different embodiments, variations and enhancements of the types of interactions shown in FIG. 20a-20d may be implemented. For example, in some embodiments, an additional confirmation of an acceptance may be sent back after a TSAcc message is sent. In one implementation, when sending a TSRej rejection message, the sender may provide hints to the receiver regarding which other work targets may be good candidates for the rejected token transfer (e.g., based on recent communications with other work targets). In another implementation, a TSIP may not indicate a desired number of tokens to be transferred, or a preferred direction of transfer, in its TSReq message; instead, only an indication of the token population at the TSIP may be provided, and it may be left to the TSPP to determine whether a transfer in either direction is appropriate. In such a scenario, if the TSPP decides that no transfer is appropriate, it may simply send a rejection message or ignore the TSReq entirely; and if the TSPP decides that a token transfer is appropriate, it may send its own TSReq back to the TSIP as in FIG. 20c or 20d. In some embodiments, a TSIP may be configured to send a TSReq message only if it needs additional tokens, and not if it is able to spare some of its own tokens. In other embodiments, the TSIP may send a TSReq message whether it needs more tokens or is willing to transfer tokens to others.

Methods for Token Sharing

Figure 21:
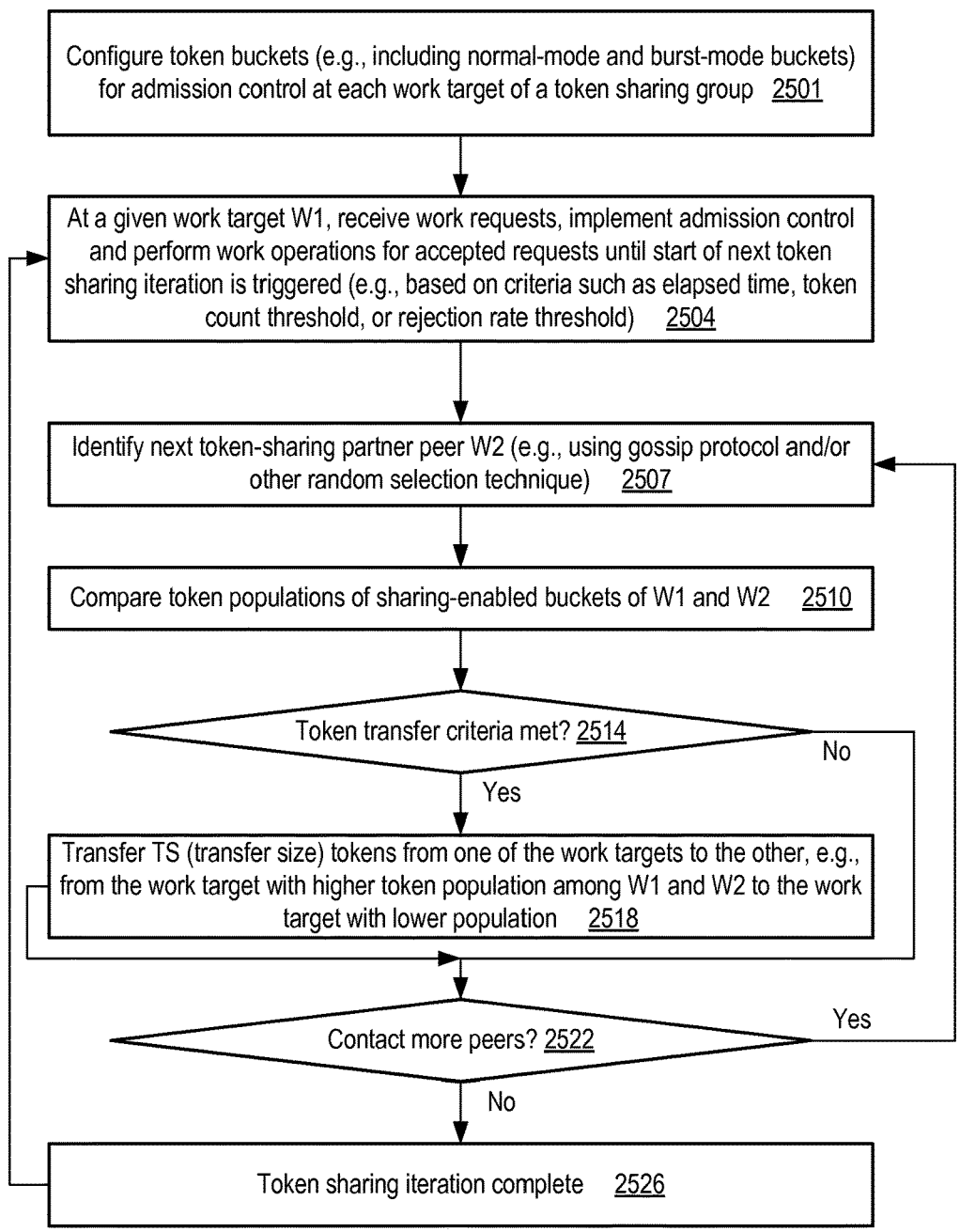
FIG. 21 is a flow diagram illustrating aspects of operations that may be performed to support token sharing for burst-mode operations, according to at least some embodiments.

FIG. 21 is a flow diagram illustrating aspects of operations that may be performed to support token sharing for burst-mode operations, according to at least some embodiments. As shown in element 2501, token buckets, including normal-mode and burst-mode buckets, may be configured for admission control at each of a number of work targets (such as table partitions) that are designated as members of a token sharing group. Membership within a token sharing group may be implicit in some embodiments, e.g., by default, all the partitions of a given table may be considered members of a token sharing group. Membership may be based on ownership of storage objects in some embodiments—e.g., all the partitions of all the tables owned by a particular client (as well as any derived tables used for secondary indexes) may be deemed members of a token-sharing group. In other embodiments, clients may be able to indicate which specific work targets they wish to include in a given token sharing group. Several different cooperating client entities may decide to include their respective work targets in a token sharing group in some embodiments. As described above in conjunction with the description of FIG. 18, in some embodiments in which data objects are replicated and different replicas are assigned different roles with respect to admission control (such as master and slave roles), a given token sharing group may contain replicas corresponding to one role and not the other. Token sharing may be permitted only for token buckets of a particular type in some embodiments—e.g., only burst-mode buckets may participate in token sharing, or only read token buckets may participate in token sharing in some implementations.

The token sharing protocol may be implemented in iterations in some embodiments, in a manner similar to that shown in FIG. 17. A given work target W1 may perform its typical operations (unrelated to token sharing) for a while, such as making admission control decisions for incoming work requests and executing the work corresponding to accepted work requests. An iteration of the token sharing protocol may be triggered at W1 as a result of one or more criteria being met (element 2504), such as some amount of time having elapsed since the previous iteration, the determination that the number of tokens in one or more buckets at W1 has reached a threshold level, and/or the determination that a rejection rate for work requests at W1 has reached a threshold level.

During an iteration of the protocol in the depicted embodiment, W1 may successively identify one or more partner peer work targets for possible token transfers, and transmit one or more token sharing messages to one partner at a time (e.g., in a manner similar to that shown in FIG. 20). The token populations of one or more buckets (e.g., a burst-mode bucket) of W1 and the partner may be compared, and a determination as to whether some number of tokens are to be transferred between W1 and the partner may be reached by mutual consent of the two work targets. Thus, as shown in element 2507, W1 may select some work target that is a member of the token sharing group as the next partner W2 to be contacted for a possible token transfer. Different techniques may be used to identify which specific work target should be selected in various embodiments. For example, in some embodiments, a gossip protocol may be used and the partners may be selected at random. In other embodiments, a more deterministic selection technique may be used, such as choosing the particular work target that has not been contacted by W1 for the longest time among the work targets of the token sharing group (which may be termed a "least-recently-contacted" approach), or a round-robin approach may be used. In one implementation, a given work target may be selectable as a partner only if no token transfers between the initiator and the partner have occurred during a specified time window.

One or more messages may be exchanged with the partner peer (element 2510) to compare token populations of the bucket(s) that could potentially be affected by a token transfer. In some embodiments, instead of or in addition to the token population information, the message(s) may indicate a requested number of tokens, or a range of the number of tokens that would be acceptable for a transfer, as well as the desired direction of token transfer. In at least one embodiment, a comparison of token populations may not be required; instead, for example, a decision as to whether to offer some number of tokens to the partner peer, or to request some number of tokens from the partner peer, may be made based on the number of tokens at the initiator peer W1, or based on other criteria or thresholds. Similarly, in such an embodiment, the response from the partner peer may also be generated without a comparison of token counts. One or more criteria may be used, at either the initiator peer W1 or the partner peer W2, to determine whether a token transfer should be agreed to, and if so, how many tokens should be transferred (i.e., the transfer size), and in which direction (the transfer direction). For example, in some embodiments, a given work target such as W2 may not be willing to part with tokens if W2's token bucket population is below some threshold, even if W2 has more tokens than W1; or, W2 may not be willing to donate tokens to W1 if W2 expects a burst of work requests in the near future based on past trends. In some embodiments, work targets may be configured to share tokens based purely on the difference in token populations— e.g., if W2 has more tokens than W1, W2 may be obliged to share some of the tokens (e.g., half the difference between the token populations as shown in FIG. 17) with W1. In at least one embodiment, in order to avoid "thrashing" behavior (e.g., rapid transfers back and forth between a given pair of work targets), the number of transfers (or the number of tokens transferred) between a given pair of work targets may not be permitted beyond a specified rate. The transfer size may be determined by mutual consent between the initiating peer and the partner peer. In some embodiments, token transfers may only be implemented if one of the peers is willing to spare at least T tokens, where T may be a configurable parameter of the protocol; thus, it may not be considered worthwhile to transfer a very small number of tokens.

If the token transfer criteria are met (as determined in element 2514), a number of tokens equal to the determined transfer size may be added to one or more buckets at one of the work targets (e.g., either the initiator or the partner), and an equal number of tokens may be removed from a corresponding set of one or more buckets at the other work target (element 2518). In most cases, tokens may be transferred from the peer with the greater token population to the peer with the smaller token population, although transfers in the other direction may also be permitted in at least some embodiments (for example, if W1 has fewer tokens than W2, but W2 requests tokens in anticipation of a large burst that is expected, W1 may transfer tokens to W2 in one example scenario).

Whether a token transfer was agreed to or not, in the depicted embodiment, a decision may be made as to whether other partner work targets are to be contacted. For example, in some embodiments, W1 may wish to acquire N tokens, but only M tokens (where M<N) may have been available from W2, so W1 may wish to attempt to obtain additional tokens from other partners. In some embodiments, a limit may be enforced as to the number of different partners that may be contacted by a given initiator such as W1 in a given time period. If additional peers are to be contacted (as determined in element 2522), the next partner may be identified, e.g., using a similar approach as described above with respect to element 2507, and the operations corresponding to elements 2510, 2514, and 2518 may be performed with the next partner.

If no additional partners are to be contacted (as also determined in element 2522), e.g., if the initiator was able to obtain (or donate) a desired number of tokens, the iteration of the token-sharing protocol may be deemed complete (element 2526). The initiator may resume its usual operations until the next iteration is triggered (element 2504), at which point the operations corresponding to elements 2507 onwards may be repeated in the depicted embodiment.

Distribution of Tokens Representing Excess Capacity of Shared Resources

Figure 22:
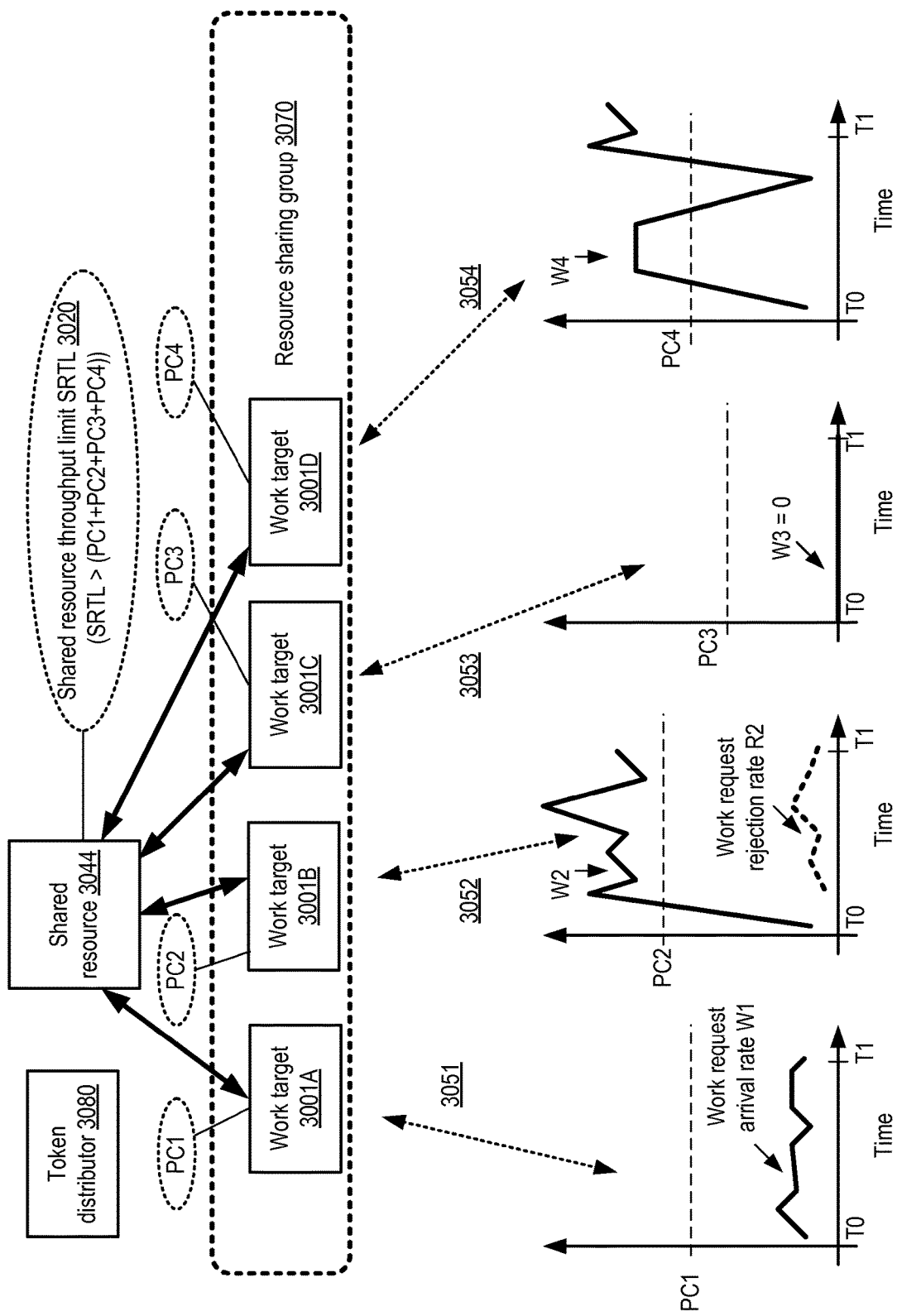
FIG. 22 illustrates an example of a shared resource with a throughput limit greater than the combined provisioned capacities of work targets that share the resource, according to at least some embodiments.

As described earlier, in some embodiments, several work targets of a given network-accessible service, such as several database table partitions managed by a database service, may be configured to use one or more shared resources (e.g., a disk drive or other storage device) to accomplish the work performed in response to client requests. In general, when assigning work targets to a shared resource, the service may ensure that the throughput limit sustainable by any of the shared resources exceeds the sum of the provisioned capacities of the work targets. In some embodiments in which token bucket populations represent throughput capacities, this may result in a scenario in which, even though the shared resource is capable of handling additional work requests, one or more of the work targets is unable to accept incoming work requests (e.g., despite the use of burst-mode buckets). Accordingly, in at least some embodiments tokens representing the excess throughput capacity of the shared resource(s) may be distributed among the work targets in an equitable manner as described below. FIG. 22 illustrates an example of a shared resource with a throughput limit greater than the combined provisioned capacities of work targets that share the resource, according to at least some embodiments.

In the embodiment depicted in FIG. 22, resource 3044 is shared by at least the four work targets 3001A, 3001B, 3001C and 3001D. The work targets may be termed members of resource sharing group 3070 with respect to resource 3044. Shared resource 3044 has a throughput limit SRTL 3020, which exceeds the sum of the provisioned capacities of the work targets, (PC1+PC2+PC3+PC4). The graphs in the lower portion of FIG. 22 illustrate the respective work request arrival rates at the four work targets during a time interval T0-T1, as indicated by the arrows 3051, 3052, 3053 and 3054. As shown, the work request arrival rate W1 at work target 3001A is lower than the provisioned capacity PC1 during the interval T0-T1. The work request arrival rate W2 at work target 3001B exceeds the provisioned throughput PC2 for much of the interval, and as a result some number of work requests get rejected, as indicated by rejection rate R2. Such rejections may occur even if burst-mode token buckets of the kinds described above are used at each of the work targets. Work target 3001C happens to receive no work requests at all, as indicated by the zero arrival rate W3. At work target W4, the arrival rate W4 exceeds the provisioned capacity for some parts of the time interval T0-T1, but there are no rejections (e.g., as a result of using burst-mode token buckets).

Token distributor 3080 may be configured to determine whether any additional tokens (i.e., tokens beyond the number already generated based on bucket refill rates) representing the unused throughput capacity of the shared resource 3044 should be distributed among the work targets 3001 of the resource sharing group for a given time period in some embodiments. In addition, token distributor 3080 may be responsible for determining how many such tokens should be provided to each of the work targets in the illustrated embodiment. The "excess" tokens may be created as needed in some embodiments, while in other embodiments a bucket associated with the shared resource may be configured to include tokens representing the throughput capacity of the shared object, and the excess tokens may be distributed from such a bucket.

Token distributor 3080 may implement an equitable distribution policy taking into account such factors as the respective provisioned capacities of the work targets, as well as some metrics of recent activity (i.e., work request arrival rates) at the work targets 3001. The respective provisioned capacities may be included as factors in the distribution algorithm because, at least in some embodiments, the amount that a given client is charged for access to a particular work target is a function of the provisioned capacity of that work target. Accordingly, at least to some extent, the service at which the work targets are managed may attempt to distribute assets or benefits, such as the excess tokens associated with the unused capacity of the shared resource, in proportion to the provisioned capacities of the members of the resource sharing group 3070. At the same time, the token distributor 3080 may take recent workload levels into account, as it may not be particularly useful to distribute tokens to a work target such as 3001C that has not received any work requests at all recently, or to work target 3001A that has had a low workload in the recent past, since such lightly loaded work targets may not be able to benefit from any additional tokens. Other factors may be taken into account as well in some embodiments, rejection rates over recent time periods at various work requests, expected future work request arrival rates, and so on.

In at least some embodiments, the token distributor 3080 may collect metrics on the arrival rates at the various members of the resource sharing group over some interval, and then determine whether and how to distribute tokens for the next time interval. Thus, the token distributor may determine the arrival rate ratios for the work targets for a time period Tm (e.g., T0-T1), as well as the provisioned throughput ratios. In at least some embodiments, ratios need not necessarily be computed for either the arrival rates or the provisioned throughputs, and other metrics indicative of, or associated with, arrival rates and provisioned throughputs may be used instead. The combined number of tokens to be distributed among the work targets for admission control during a time period Tn may then be determined based at least in part on the throughput limit of the shared resource 3044. For example, in one embodiment, the combined number may be computed by subtracting the sum of the provisioned capacities of the work targets (e.g., PC1+PC2+PC3+PC4 in the example of FIG. 22) from the throughput limit of the shared resource (SRTL 3020 in FIG. 22). The combined number of tokens may be distributed among the work targets as a function of at least (a) the respective work request arrival rate ratios or metrics and (b) the provisioned capacities of the work target. The additional tokens may then be used for admission control at the receiving work targets during time period Tn (and/or in other later time periods), together with the tokens that may be generated based on bucket refill rates at the work targets. In at least some embodiments, the excess tokens may be distributed only to burst-mode token buckets at the work targets, since the extra tokens may be primarily intended to help the work targets handle burst-mode operations. In other embodiments, the tokens may be distributed to normal-mode token buckets as well or instead of to the burst-mode token buckets. In some embodiments, the tokens may be distributed to token buckets for particular types of work requests, such as read token buckets.

It is noted that in addition to the work request arrival rates, other factors, including the provisioned capacities, that the token distributor has to consider in its decisions may change from one time interval to another. For example, in some embodiments, at any given point in time, a client (or the service) may decide to change the provisioned capacity of a given work target. In addition, the number of work targets that share access to a given resource may also change—for example, a table partition may be added at any given time to a shared storage device in some embodiments, or an existing partition may be deleted. Thus, the token distributor may have to keep track of various types of configuration changes, in addition to obtaining metrics of work request arrival rates in such embodiments.

Figure 23:
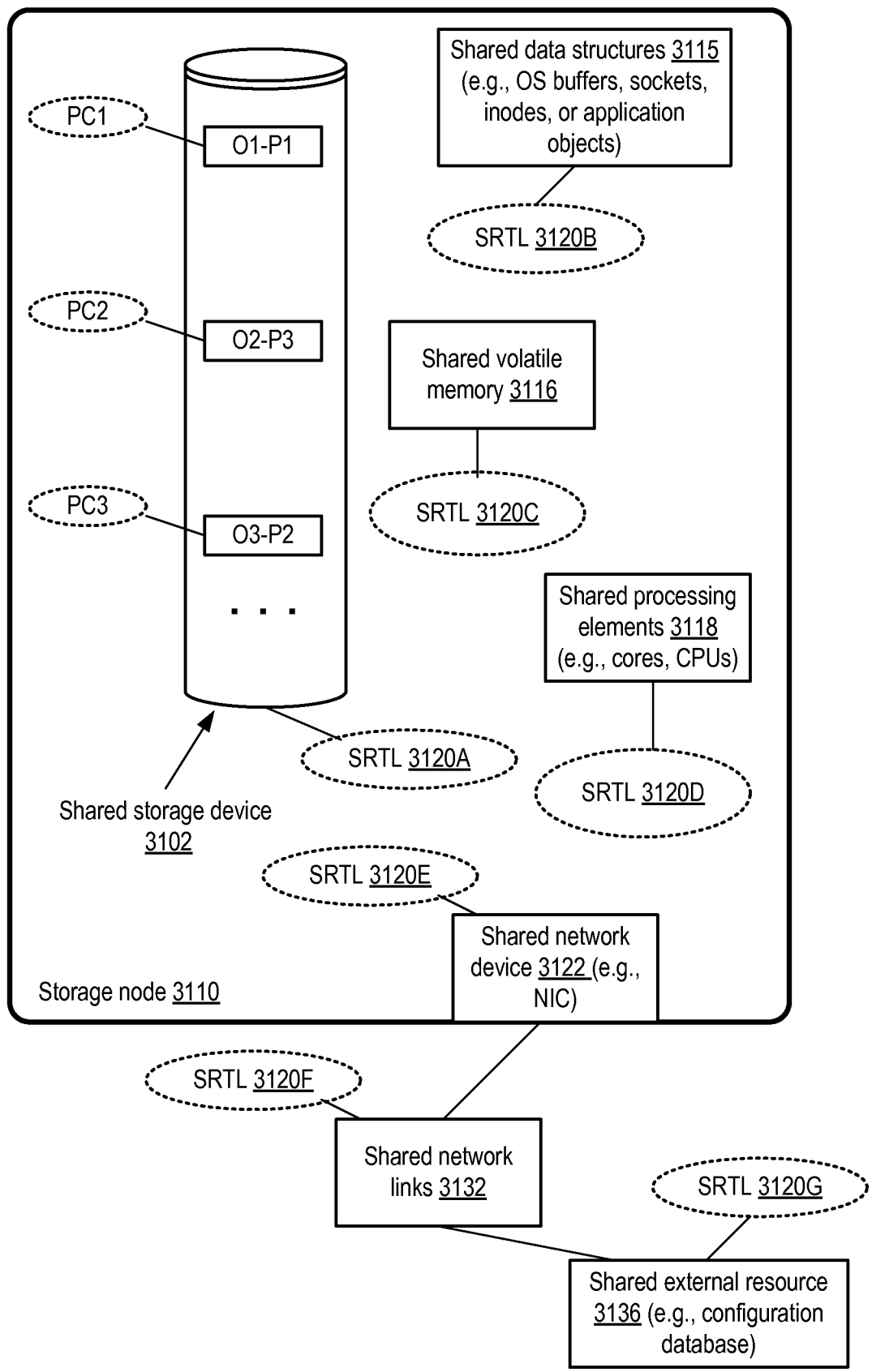
FIG. 23 illustrates examples of resources that may be shared by work targets at a storage node of a service, according to at least some embodiments.

In some embodiments, the throughput limits of several different shared resources may be considered when determining how many tokens should be distributed among the sharers. FIG. 23 illustrates examples of different types of resources that may be shared by work targets at a storage node of a service (such as a database service or a more general storage service), according to at least some embodiments. As shown, the storage node 3110 may include a shared storage device 3102 at which at least three data object partitions (i.e., work targets) O1-P1, O2-P3 and O3-P2 with respective provisioned capacities PC1, PC2 and PC3 are stored. Shared storage device 3102 may have a throughput limit SRTL 3120A in the depicted embodiment.

In addition to the storage device, work requests directed at the partitions O1-P1, O2-P3 or O3-P2 may require the use of other shared resources located either at the storage node 3310, or external to the storage node. For example, shared data structures 3115, such as operating system buffers, sockets, Modes, or application-level objects (e.g., any of various types of locks) may be needed for processing work operations, and such shared data structures may each have their own throughput limits SRTL 3120B. Some amount of shared volatile memory 3116 (e.g., main memory of the storage node) may be required for work operations, and the memory may have its own throughput limit 3120C in the depicted embodiment. Shared processing elements 3118 (e.g., CPUs or cores) may be utilized for processing the work operations corresponding to the work requests, and the processing elements may have their own throughput limit 3120D. The work requests and corresponding responses may require the use of shared network device 3122, such as a network interface card, with a throughput limit SRTL 3120E. Shared network links 3132 with throughput limit 3120F may be needed for the work requests. In some cases, access to an external resource 3136, such as a configuration database with a throughput limit 3120G may also be required for at least some work operations.

When determining whether excess tokens are to be distributed among the work targets sharing some or all of these types of resources, the token distributor may be configured to compute a function of the respective throughput limits of all the applicable shared resources in the depicted embodiment. In some cases, the computation may involve determining the minimum SRTL among the various SRTLs, for example, and using that minimum value as the effective throughput limit associated with the combination of the shared resources. Not all the different types of shared resources illustrated in FIG. 23 may be used in any given implementation. In some embodiments, other types of shared resources, not shown in FIG. 23, may be used.

Figure 24:
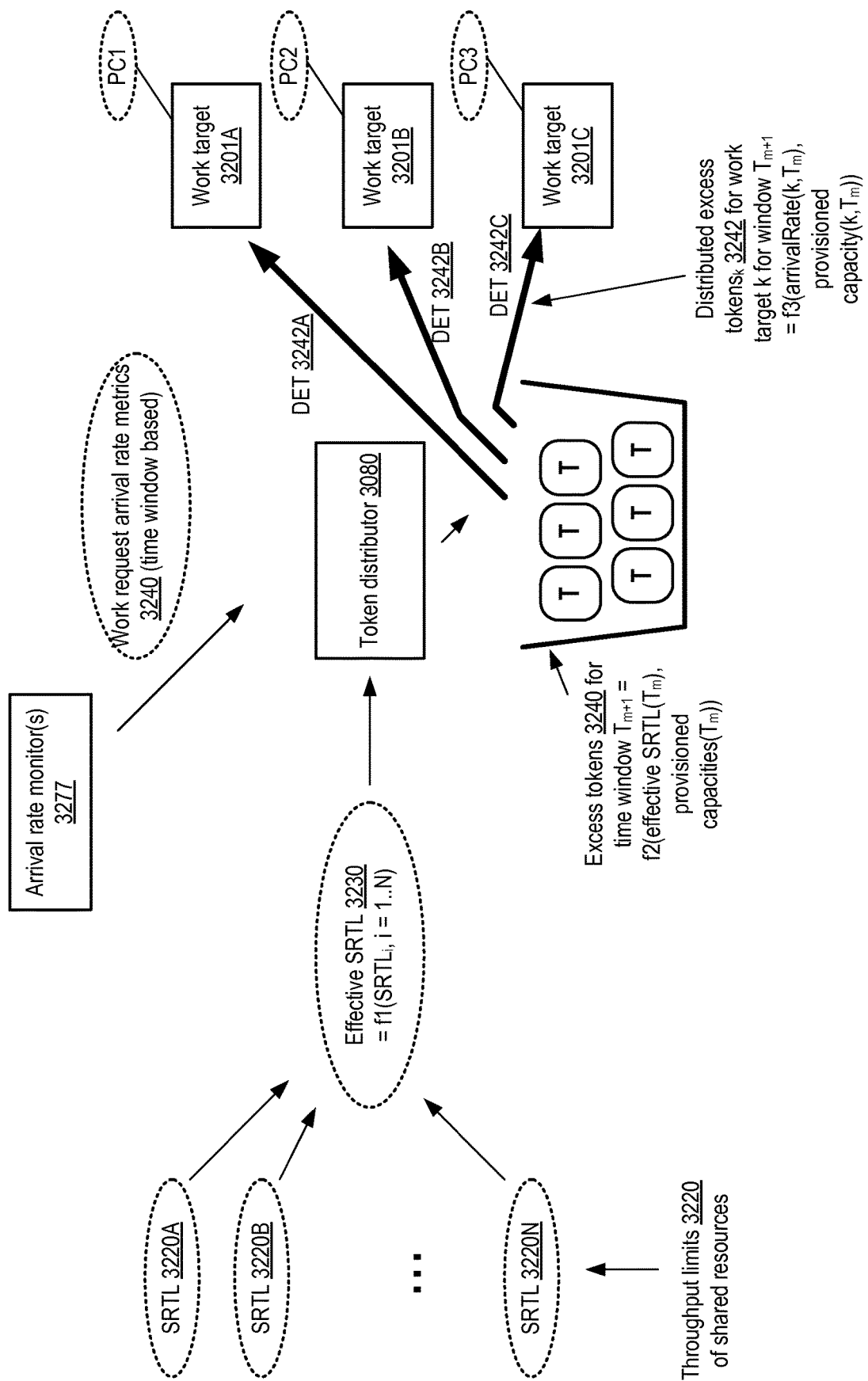
FIG. 24 illustrates an example of operations performed to compute the number of excess tokens to be distributed among work targets sharing a resource, according to at least some embodiments.

FIG. 24 illustrates an example of operations performed to compute the number of excess tokens to be distributed among work targets sharing a resource, according to at least some embodiments. As shown, token distributor 3080 may compute an effective shared resource throughput limit 3230 as a function f1 of the respective SRTLs 3220 (e.g., 3220A, 3220B, . . . 3220N) of one or more shared resources. In some implementations, the minimum SRTL may be selected as the effective SRTL, for example, while in other implementations some other function may be used. Arrival rate monitor(s) 3277 may be responsible for determining metrics 3240 indicative of the relative work request arrival rates at the various work targets 3201 (e.g., 3201A, 3201B and 3201C) of the resource sharing group in the depicted embodiment. In one implementation, for example, decisions regarding excess token distribution may be made once every N minutes, and metrics 3240 may accordingly be determined for N-minute time windows. In some embodiments, the arrival rate monitors 3277 may be incorporated within the respective admission controllers 180 of the work targets.

In the embodiment depicted in FIG. 24, toke distributor 3080 may determine the number of excess tokens 3240 representing excess throughput capacity at the shared resources, as a function f2 of the effective SRTL 3230 and the provisioned capacities of the work targets of the resource sharing group. Thus, for example, if the effective SRTL 3240 during a given time window Tm was X operations per second, and the sum of the provisioned capacities (e.g., (PC1+PC2+PC3 in FIG. 24) of the work targets was Y operations per second during the time window Tm, the excess tokens to be distributed during the (m+1)th time window T(m+1) may be computed as X-Y in one implementation. More complex functions f2 may be used in other implementations. It is noted that at least in some scenarios, the SRTLs of the shared resources (and hence the effective SRTL 3230) may change over time. Similarly, the provisioned capacities of the work targets may change over time as well, e.g., due to client requests. As a result, the number of excess tokens 3240 may also vary in at least some embodiments. It is noted that at least for some time windows in some embodiments, the number of excess tokens to be distributed during a given time window may be zero—e.g., there may be no excess capacity available at the shared resources at least temporarily.

Having determined the number of excess tokens 3240 to be distributed, the token distributor 3080 may next decide how many tokens (if any) are to be provided to each work target. The distributed excess tokens (DET) 3242 for a given work target (e.g., DET 3242A for work target 3201A, DET 3242B for work target 3201B, and DET 3242C for work target 3201C) may be computed as a function f3 of the arrival rate metric 3240 of the work target, and the provisioned capacity of the work target. Consider an example scenario in which the respective arrival rate metric values for the three work targets 3201A, 3201B and 3201C during time window Tm are A1, A2, and A3. For each work target k, an arrival rate ratio may be determined in one implementation as A_ratio_k=(Ak/(A1+A2+A3)), and a provisioned capacity ratio may be determines as P_ratio_k=(PCk/(PC1+PC2+PC3)). Assume further that the combined number of excess tokens to be distributed for the (m+1)st time window is E. The excess tokens distributed to the work target k, DETk, may be computed as follows: DETk=E* ((alpha*A_ratio_k)+((1−alpha)*P_ratio_k))), where alpha is a constant. In this example, alpha represents a relative weight given to the two different factors being considered: the arrival rates, and the provisioned capacities. The token distributor 3080 may adjust alpha over time in some embodiments, e.g., in response to observed trends in arrival rates and corresponding rejection rates. In at least some embodiments, the excess tokens 3240 may only be distributed for the (m+1)st time window if the combined arrival rates during the mth time window exceed a threshold—e.g., if each of the arrival rates is lower than the provisioned capacity of the work target, excess tokens may not be distributed for the (m+1)st time window. In one embodiment, arrival rates over a longer time period may be considered when distribution the excess tokens—e.g., when deciding how many tokens should be distributed to a given work target during a 5-minute time window, the token distributor 3080 may consider the arrival rate metrics obtained for that work target during the previous 60 minutes. In some embodiments, if the arrival rate at a given work target is zero during a given time interval (e.g., work target 3001C of FIG. 2 is idle during the time period T0-T1) no tokens may be distributed during the next time interval to that work target, regardless of its provisioned capacity.

Figure 25:
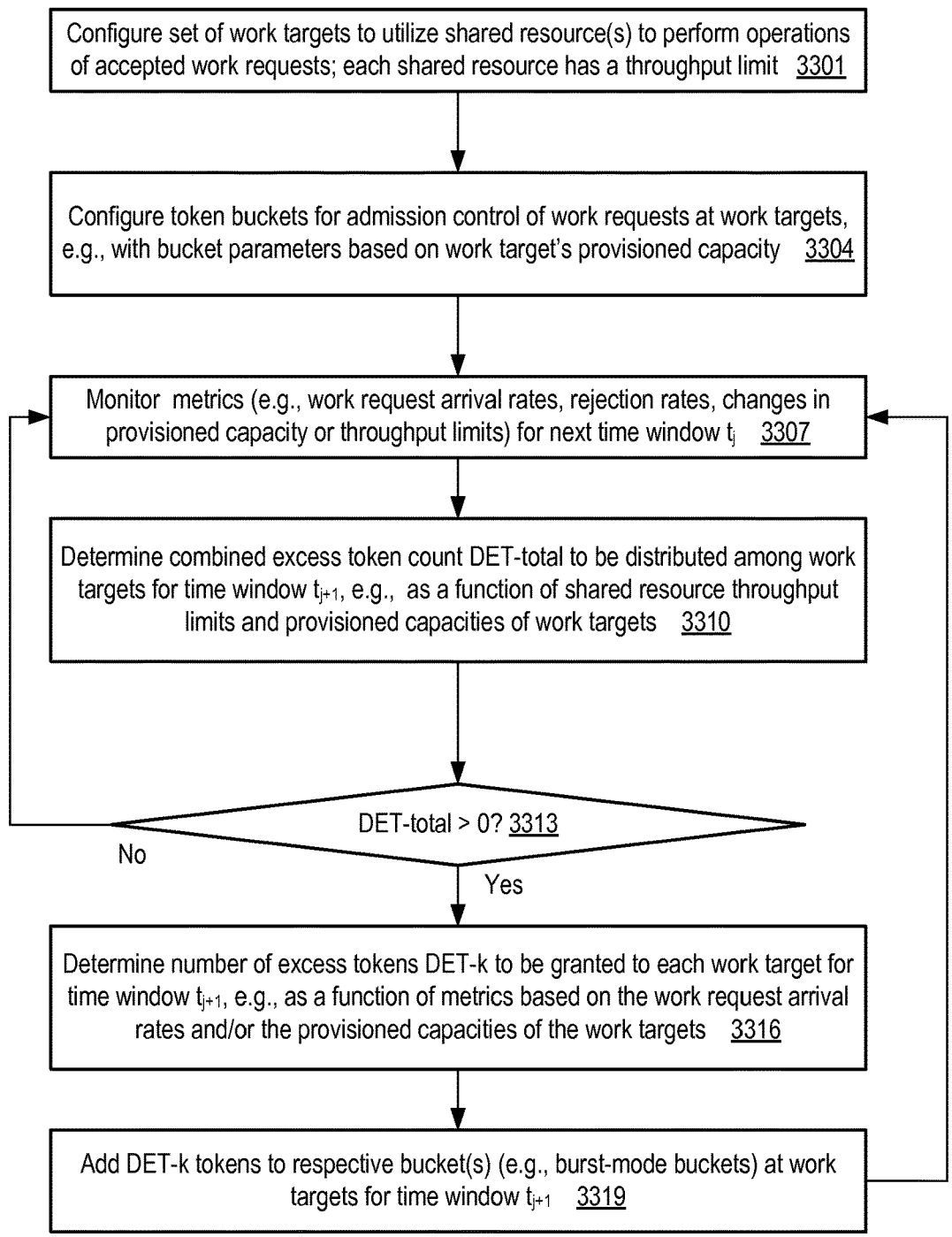
FIG. 25 is a flow diagram illustrating aspects of operations that may be performed to implement an equitable distribution of excess tokens among work targets sharing a resource, according to at least some embodiments.

Methods for Distributing Tokens Representing Excess Capacity at Shared Resources FIG. 25 is a flow diagram illustrating aspects of operations that may be performed to implement equitable distribution of excess tokens among work targets sharing a resource, according to at least some embodiments. As shown in element 3301, a set of work targets may be configured to utilize one or more shared resources when performing operations corresponding to client work requests. Such work targets may be termed a resource sharing group. Each shared resource may have a respective throughput limit SRTL. A respective set of token buckets may be configured for admission control at each of the work targets of the resource sharing group (element 3304), e.g., including one or more normal-mode buckets and/or one or more burst-mode buckets similar to those described earlier. Various parameters of the token buckets, such as the refill rates, the maximum token population, etc., may be based at least in part on the respective throughput capacities associated with the work targets in at least some embodiments.

A number of metrics may be collected for the members of the resource sharing group and the shared resource(s), such as work request arrival rate metrics, rejection rate metrics, changes to provisioned capacities, and/or changes to throughput limits of the shared resources. In some embodiments, a time-window based token distribution protocol may be implemented, in which metrics obtained in a given set of one or more time windows are used for token distribution during some set of subsequent time windows. In the depicted embodiment, metrics may be collected during time window $t_j$ (element 3307) for determining token distributions for time window $t_{j+1}$. The combined number of excess tokens to be distributed (DET-total) for time window $t_{j+1}$ may be determined as a function of the shared resource throughput limits (SRTLs) and the provisioned capacities of the work targets (element 3310). For example, in one implementation, an effective SRTL may be computed (e.g., the minimum of the individual SRTLs if more than one shared resource is being considered), and DET-total may be computed by subtracting the sum of the provisioned capacities of the work targets from the effective SRTL.

At least in some implementations, it may be the case that DET-total is zero for a particular time window, i.e., there may be no excess tokens to be distributed. If DET-total exceeds zero (as determined in element 3313), the number of tokens DET-k to be provided to each work target k may then be computed (element 3316), e.g., as a function of metrics associated with the respective arrival rates and/or the respective throughput capacities of the work targets. For example, as discussed above in conjunction with the description of FIG. 24, a function that assigns a relative weight alpha to the arrival rate metrics and the provisioned capacity metrics of the different work targets may be used in some embodiments to obtain DET-k values. The token populations at one or more buckets associated with the work targets may then be adjusted based on the DET-k values determined (element 3319). After the tokens are added, admission control decisions may be made as before, but with an enhanced ability to withstand higher workloads at those work targets that received at least some excess tokens. In some embodiments, excess tokens may be added only to burst-mode token buckets, while in other embodiments, the excess tokens may be added to normal-mode token buckets instead of or in addition to the burst-mode buckets. In at least some embodiments, separate token buckets may be maintained for different types of work requests, such as reads versus writes. In such cases, excess tokens may be distributed to only some types of buckets (e.g., to read buckets only, or to write buckets only) in some embodiments, and to all types of buckets in other embodiments.

The various functions and formulas used to determine the distributed token counts (DETs) described above, such as the functions f1, f2, and f3 shown in FIG. 24, may be tuned over time, e.g., by the token distributor 3080 or an administrator, in at least some embodiments. For example, the success of the token distribution technique may be gauged by monitoring a number of metrics such as the rejection rates at various work targets during periods of high arrival rates, the utilization levels of various shared resources, and so on, and the weight alpha assigned to arrival rate metrics versus provisioned capacity metrics may be adjusted accordingly, or the sizes of the time windows may be adjusted.

In at least some embodiments, various techniques associated with admission control such as those described above, including the use of simple or compound token buckets, token sharing among work targets, and equitable distribution of excess capacity of shared resources, may be used at a plurality of services offered by a provider network. Combinations of some or all of the techniques may be used in a given embodiment, e.g., the use of compound burst-mode token buckets may be combined with token sharing across work targets and distribution of excess tokens. Networks set up by an entity such as a company or a public sector organization to provide one or more such services (such as various types of cloud-based storage, computing or database services) accessible via the Internet and/or other networks to a distributed set of clients may be termed provider networks. A given provider network may include numerous data centers (which may be distributed across different geographical regions) hosting various resource pools, such as collections of physical and/or virtualized computer servers, storage servers with one or more storage devices each, networking equipment and the like, needed to implement, configure and distribute the infrastructure and services offered by the provider. A number of different hardware and/or software components, some of which may be instantiated or executed at different data centers or in different geographical regions, may collectively be used to implement the admission control techniques in various embodiments.

Token-Based Pricing for Burst-Mode Operations

Figure 26:
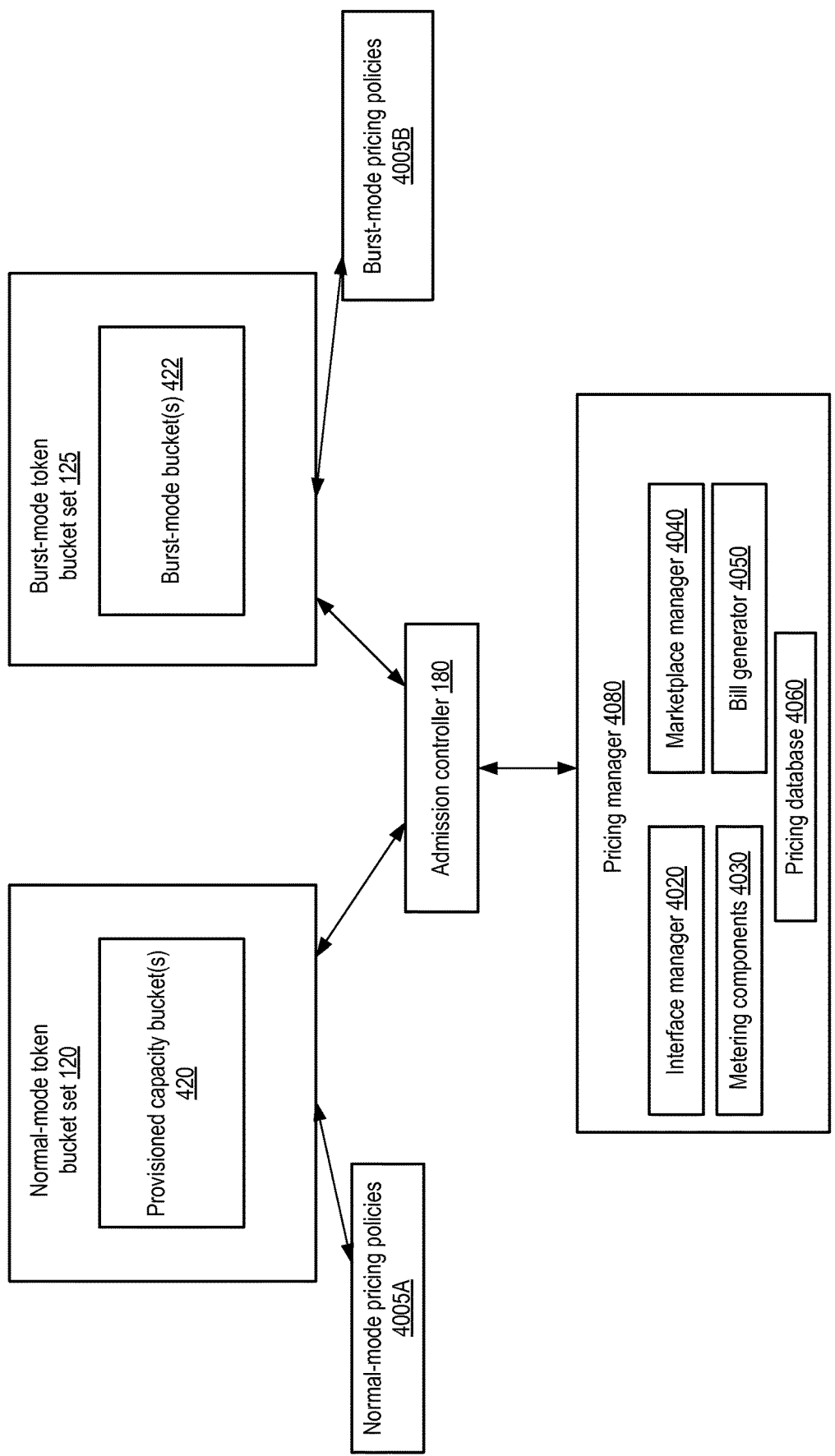
FIG. 26 illustrates example components of a pricing manager than may be implemented for burst-mode operations, according to at least some embodiments.

In some embodiments, clients may be charged for the work performed on their behalf to support burst modes using a different pricing methodology than may be used for normal mode operations. As described above, token sharing across work targets and distribution of excess tokens representing shared resource capacity may also be implemented to support burst-mode workloads, and the billing for token sharing and/or excess token distribution may also differ from the billing for normal-mode operations in some embodiments. FIG. 26 illustrates example components of a pricing manager 4080 than may be implemented for burst-mode operations, according to at least some embodiments. As shown, a normal-mode token bucket set 120 and a burst-mode token bucket set 125 may be instantiated for a work target. An admission controller 180 may be responsible for deciding whether to accept an incoming work request based on the token population of one or more provisioned capacity buckets 420 of the normal-mode token bucket set and/or the token population of one or more burst-mode buckets 422 of the burst-mode token bucket set 125, e.g., using a technique or a combination of techniques similar to those described above for various embodiments.

In the embodiment illustrated in FIG. 16, a pricing manager 4080 may be configured to implement one or more pricing policies associated with the use of tokens from the burst-mode token bucket set 125 and/or the normal-mode token bucket set 120. One or more burst-mode pricing policies 4005B and one or more normal-mode pricing policies 4005A may be used to determine how much to charge a client for the consumption and/or transfer of tokens from one or more buckets, depending on the mode of operation. For normal-mode operations, for example, a static or fixed price may be used for the use of tokens at a rate up to a provisioned throughput capacity in accordance with a normal-mode pricing policy 4005A, while burst-mode pricing polices 4005B may be more dynamic in at least some embodiments as described below. The pricing manager 4080 may be configured to gather information from admission controller 180 regarding token population changes, and/or to inform the admission controller regarding constraints to be considered when making admission control decisions (e.g., the pricing manager 4080 may notify the admission controller that, in accordance with a particular burst-mode pricing policy, a client's budget constraints are to apply to the consumption of tokens during burst mode from a particular burst-mode bucket 422, which may influence the admission controller's decisions.)

The pricing manager 4080 may include several different subcomponents in some embodiments. For example, an interface manager 4020 may be responsible for implementing a set of programmatic interfaces in one embodiment, such as one or more web pages, APIs, GUIs (graphical user interfaces), command-line tools and the like, that may be used for various pricing-related interactions with clients, such as pricing policy selection based on client input, or for performing various aspects of marketplace transactions of the kinds described below. The interface manager 4020 may also be responsible in some implementations for some types of internal interactions within the network-accessible service, such as communications between the pricing manager 4080 and the admission controller 180. In some embodiments, token marketplaces may be established, enabling some clients to advertise the availability of excess tokens that can be acquired by other clients for a price. Token prices may be static or fixed for some types of marketplace transactions in at least some such embodiments, while for other transactions, the prices may be determined dynamically (e.g., using techniques similar to auctions, or based on time windows). A marketplace manager component 4040 of the pricing manager 4080 may be responsible for supporting marketplace transactions in the depicted embodiment.

One or more metering components 4030 may be configured to gather token usage/consumption metrics from admission controller 180 in the depicted embodiment. In at least one embodiment, multiple instances of admission controllers 180 may be implemented (e.g., one admission controller instance for each work target, or one instance for N work targets), and the metering components may aggregate token usage data from multiple admission controller instances 180 in such embodiments. In some embodiments the price for consuming or transferring tokens may vary based on resource utilization levels (e.g., processor utilization levels, storage device utilization levels, or network utilization levels) of various resources used for fulfilling work requests. In such embodiments in which token pricing is a function of resource utilization levels, the metering components 4030 may also collect utilization information from various parts of the infrastructure set up for the network-accessible service. A bill generator 4050 may be configured to analyze various token-related metrics collected from the admission controller(s) and generate billing amounts to be charged to clients, based on the pricing policy or policies in effect. In some embodiments, the pricing manager 4080 may include a pricing database 4060 within which, for example, pricing policy details and/or billing history information may be stored. The pricing database 4060 may also be used for trend analysis in some embodiments, e.g., to determine components of dynamic pricing based on earlier pricing changes and/or on based on usage patterns derivable from billing history. According to at least one embodiment, one or more of the subcomponents of pricing manager 4080 may be incorporated within an admission controller 180. In some embodiments, the pricing manager 4080 may comprise a plurality of software and/or hardware components that may be distributed among one or more computing devices.

Token-Based Pricing Policy Elements

Figure 27:
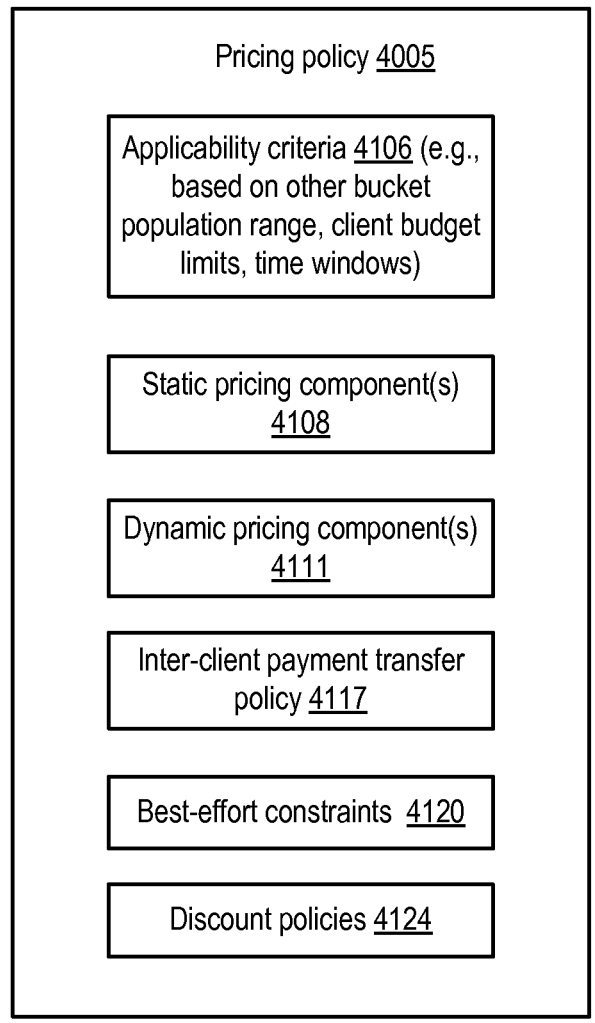
FIG. 27 illustrates example elements of a token-based pricing policy, according to at least some embodiments.

FIG. 27 illustrates example elements of a token-based pricing policy 4005, according to at least some embodiments. In some embodiments, respective pricing policies may be applied to different buckets used for admission control—i.e., the prices that clients are charged may differ for different buckets in the normal-mode token bucket set 120, and/or for different buckets in the burst-mode token bucket set 125. For a given pricing policy 4005 associated with one or more buckets in a bucket set, one or more applicability criteria 4105 may be specified in the depicted embodiment, indicating for example the conditions under which the pricing policy is to be used for determining client billing amounts for one or more token population change operations at the bucket. In one simple implementation, for example, a particular pricing policy 4005 may be applied to every token consumed from a burst-mode bucket 422; in such a scenario, the applicability criterion 4105 may simply indicate the logical equivalent of "apply this pricing policy for each token consumed". In some embodiments, more complex applicability criteria 4105 may be specified, such as criteria based on the token population of some other bucket or buckets (e.g., the logical equivalent of "apply this pricing policy to bucket B1 token consumptions only if the token population of bucket B2 is within the range B2low-B2high"), based on client budgets (e.g., the logical equivalent of "apply this pricing policy to client C1's bucket B1 only if C1's remaining budget for burst-mode tokens exceeds amount A"), based on timing windows (e.g., "apply this pricing policy to tokens consumed from bucket B1 during the time periods 01:00 AM to 06:00 AM on weekdays"), and so on. In some cases the applicability criteria may depend on the number and type of buckets being used, e.g., some pricing policies may apply to a given shared-resource capacity burst-mode bucket B1 only if a compound token bucket is also being used for burst-mode admission control.

Generally speaking, the pricing associated with token population changes (e.g., token consumption or transfer) may comprise static pricing components 4108 (e.g., upfront fees for consuming up to a specified number of burst-mode tokens at a specified rate during a specified time period) and dynamic pricing components 4111 (e.g., rates that may vary during different time windows of a workday, or rates that may vary based on supply and demand). Some pricing policies may include both static and dynamic pricing components in the depicted embodiment, while other polices may include only static components or only dynamic components. For certain types of token transfers or sales, dynamic pricing may be implemented using auctions in at least some embodiments. In at least one embodiment, the pricing for at least some token buckets may change based on supply and demand, e.g., a "spot" pricing policy for burst-mode tokens may be implemented, according to which a particular client may be provided a token only if the client's bid equals or exceeds the current spot price at the time of the bid.

In some embodiments, more than one client may be involved in a given token transaction. For example, in embodiments in which the pricing manager 4080 implements a token marketplace, a client C1 may wish to indicate that some number of tokens (e.g., tokens that can be used for burst-mode operations) that C1 owns are available for sale to other clients. The pricing manager 4080 may advertise the availability of the tokens (or notify specific clients that may be potential candidates for purchasing the tokens), and a different client C2 may purchase the tokens from C1. In such a scenario, payment transfers between the clients may be facilitated by the pricing manager 4080, e.g., in accordance with an inter-client payment transfer policy 4117 (that may be included in client A's pricing policy, in client C2's pricing policy, or in both clients' policies, for a particular type of token bucket) in the depicted embodiment. The inter-client payment transfer policy 4117 may indicate, for example, service charges that either the buyer or the seller may incur for the sale, and/or the schedule according to which inter-client payments are processed (e.g., accumulated payments may be settled or transferred once a week according to one schedule). In some embodiments, tokens may be used (at least temporarily) as the logical equivalent of currencies for pricing purposes—for example, a client C1 may owe the service (or may owe a different client) N tokens, and the debt may be redeemed either using actual currencies or using replacement tokens (for example, a debt of N tokens may be redeemed by transferring N+k tokens, where k tokens represent an "interest" on the debt, with k being computed based on how long it took the debtor to repay the debt). In some embodiments in which tokens are shared among multiple work targets, including work targets owned by different clients, inter-client payment transfer policies may also be applicable for token sharing techniques similar to those described earlier, such as the example token sharing protocol illustrated in FIG. 17.

In at least some embodiment, at least for some types of token buckets, the admission controller 180 may not be able to provide any firm guarantees about future admission control decisions—e.g., as described earlier, for burst-mode admission control, a "best-effort" approach may be used, and there may in general be a higher probability that work requests are rejected during burst mode than during normal mode. The pricing policy 4005 may include an indication of one or more best-effort constraints 4120 that may apply to the tokens obtained or consumed in accordance with the pricing policy in some embodiments. For example, the constraints 4120 may inform a client that, despite the best effort of the admission controller, and despite the charge incurred by a client to obtain some number of burst-mode tokens, work requests may have to be rejected or retried if, for example, the work target runs into throughput capacity limitations of a shared physical or logical resource during burst mode. The best-effort constraints 4120 may thus serve as reminders to clients that under some (typically rare) circumstances, their purchase of tokens may not be sufficient to ensure a high acceptance rate or a high quality of responses to all their work requests. In some embodiments, at least some clients may be offered discounts in accordance with discount policies 4124 indicated in a pricing policy 4005—e.g., if a client is unable to utilize more than X % of their purchased burst-mode tokens due to any of various constraints or causes that are not the responsibility of the client, the client may be reimbursed for some or all of the purchased burst-mode tokens. In one embodiment, volume discounts (e.g., rebates based on the total number of tokens purchased) may be supported, and a discount policy 4124 may indicate the terms of such discounts. In various embodiments, some of the kinds of elements shown in FIG. 27 may not be included in a given pricing policy 4005, and/or other elements not shown in FIG. 27 may be included.

Methods for Token Pricing

Figure 28:
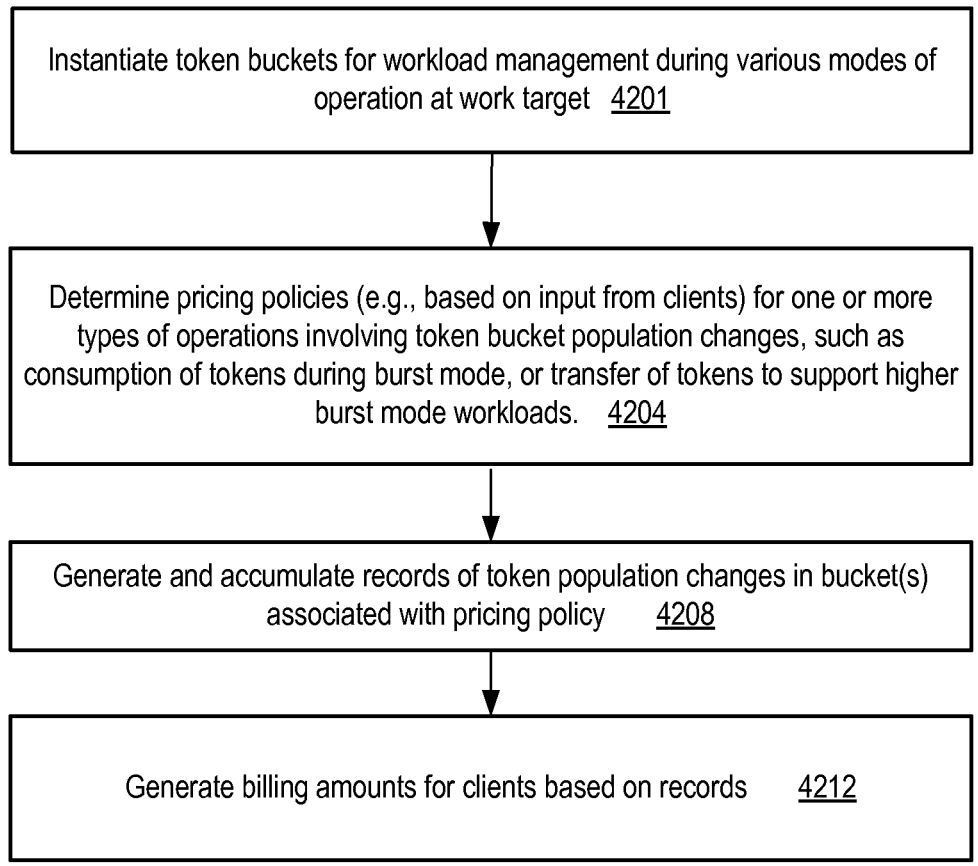
FIG. 28 is a flow diagram illustrating aspects of operations that may be performed to determine billing amounts for burst-mode operations, according to at least some embodiments.

FIG. 28 is a flow diagram illustrating aspects of operations that may be performed to determine billing amounts for burst-mode operations, according to at least some embodiments. As shown in element 4201, in the depicted embodiment, some number of token buckets may be instantiated for workload management at one or more work targets configured to operate in one or more modes (such as normal mode and burst mode) of the kinds described earlier. Decisions as to whether to accept a work request for execution at a work target may be made based on the token population of one or more of the buckets, and a decision to accept a work request may be accompanied, for example, by the consumption of some number of tokens from one or more buckets. As shown in element 4204, one or more pricing policies to be applied to operations that result in token population changes at some or all of the buckets may be determined, e.g., by a pricing manager 4080 in response to policy selection requests from clients or based on internal configuration parameters of the network-accessible service. For example, a pricing policy may indicate an amount to be charged to a client for the consumption of a token in a bucket B1 during burst-mode, for transfer of a token from one bucket B1 to another bucket B2, for short-term or long-term changes to bucket refill rates and/or maximum token population limits, or for some combination of these kinds of changes. Some pricing policies may be applied only during burst mode, while other pricing policies may be applied during normal mode, or may be applied to preparations for future burst modes (such as transfers of unused tokens from a normal-mode bucket to a burst-mode bucket, sharing of tokens across work targets, or the distribution of excess tokens as described earlier). In at least one embodiment, a normal-mode pricing policy may include a flat fee for tokens in a provisioned capacity bucket 420, which may be consumed to accept up to a provisioned throughput capacity of work requests; such a fee may not change regardless of the actual number of tokens used from the provisioned capacity bucket. Some pricing policies may be applicable to transactions conducted using a token marketplace, which may for example be supported using programmatic interfaces implemented at or by a pricing manager 4080 in some embodiments.

Each pricing policy may include, for example, one or more applicability criteria for the policy (which may specify the mode(s) of operation, such as burst mode, during which the policy is to be applied, as well as any other specific conditions that have to be met for the policy to be applied), and one or more static or dynamic pricing components or amounts associated with operations that result in token population changes. In some implementations, pricing formulas may be specified in the pricing policy, e.g., in the form of functions of a combination of factors, instead of absolute pricing amounts. In some embodiments, a pricing policy may include one or more additional elements similar to those illustrated in FIG. 27, such as inter-client payment transfer policies, discounts and the like. A pricing manager 4080 may be configured to collect, aggregate, or record, over various time periods, the changes in token populations at various buckets associated with pricing policies, as well as indications of which pricing policies were applicable to which sets of changes in token population (element 4208). Any of various aggregation techniques may be used for collection of the data regarding token population changes in different embodiments—e.g., in some embodiments, each and every change to the token population at a given bucket may be recorded, while in other embodiments, token counts may be sampled periodically or collected at scheduled intervals. It is noted that in some implementations, there may be some types of token population changes for which the client is not charged at all—e.g., some token operations may be free for at least some clients.

In some embodiments, if there are no changes to token population during some time interval, a client may not be charged for the tokens in the bucket, while in other embodiments clients may be charged for at least some types of tokens even if they remain unused (e.g., if the token population of a given bucket does not change during a given time interval). In one embodiment, the amounts charged may vary for different categories of tokens—e.g., writes may be more expensive than reads, or vice versa, either during normal mode, during burst mode, or both normal and burst modes. Based at least in part on the records of token population changes at one or more buckets, and at least in part on the pricing policy or policies, a billing amount may be generated for a client (element 4212) in the depicted embodiment. It is noted that in various embodiments, pricing policies may be selected for some or all of the different aspects of token-based admission control described earlier, including for example policies applied to the use of compound token buckets for supporting multiple categories of bursts, policies applied to priority-based categories of token buckets, and the like.

Figure 29:
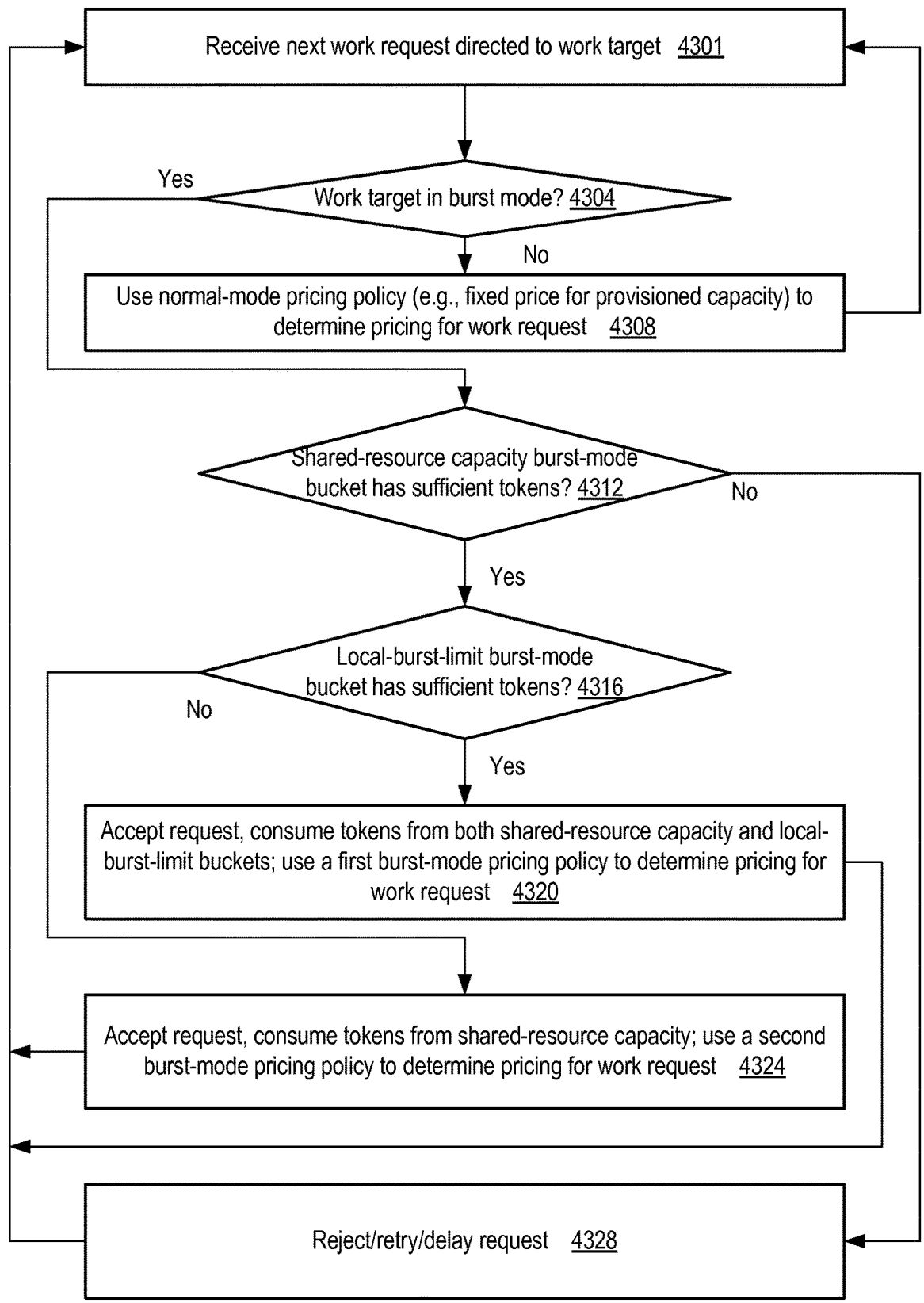
FIG. 29 is a flow diagram illustrating aspects of operations associated with conditional burst-mode pricing, according to at least some embodiments.

FIG. 29 is a flow diagram illustrating aspects of operations associated with conditional burst-mode pricing, according to at least some embodiments. In the depicted embodiment, a burst-mode bucket set 125 may comprise a plurality of buckets including a local-burst-limit bucket 604 and one or more shared-resource capacity buckets 606, and different pricing policies may be applicable to the token population at one of the burst-mode buckets, based on the population at another burst-mode bucket. The next work request directed to a work target may be received (element 4301). If the work target is not in burst mode (as detected in element 4304), e.g., based on the token population in one or more normal-mode token buckets, a normal-mode pricing policy may be used to determine the pricing to be used for the work request (element 4308). For example, as described above, during normal mode a flat upfront fee proportional to the provisioned throughput capacity of the work target may be charged to a client in some embodiments, independent of the actual number of tokens consumed as long as work requests arrive at a rate no greater than the provisioned throughput capacity.

If the work target is in burst mode, as also detected in element 4304, in the depicted embodiment the token population in at least one shared-resource capacity bucket 606 may be determined. If the shared-resource capacity bucket or buckets contain a sufficient number of tokens based on the consumption policies in effect (element 4312), the token population of a local-burst-limit bucket 604 applicable to the work target may be checked next. The population of the local-burst-limit bucket 604 may, for example, be indicative of the available throughput capacity based on a throughput limit assigned to the work target when considered in isolation (without taking shared resources into account) in the depicted embodiment. The pricing for accepting the work request for execution may depend on the population in both the shared-resource capacity bucket(s) and the local-burst-limit bucket in the depicted embodiment. If both the shared-resource capacity bucket(s) and the local-burst-limit bucket contain sufficient tokens based on their respective consumption policies (as determined in elements 4312 and 4316), the work request may be accepted, one or more tokens may be consumed from both types of buckets, and a first burst-mode pricing policy may be applied (element 4320). If the shared-resource capacity bucket or buckets contain enough tokens, but the local-burst-limit bucket does not, in the depicted embodiment, the work request may still be accepted for execution. One or more tokens may be consumed from the shared-resource capacity bucket(s), and a second burst-mode pricing policy may be applied (element 4324). If neither the shared-resource capacity bucket(s) nor the local-burst-limit bucket contains enough tokens, the work request may be rejected, retried or delayed (element 4328). After the admission control decision is made, resulting in either acceptance (elements 4320 or 4324) or rejection (element 4328), the next work request received may be dealt with, e.g., by implementing operations corresponding to element 4301 onwards. The conditional burst-mode pricing approach illustrated in FIG. 29 may be used in environments where for example the local-burst-limit bucket maximum populations are set conservatively, while the shared resources whose available throughput capacity is represented in the shared-resource capacity bucket(s) may at least during some time periods be capable of supporting higher work request arrival rates than would be supportable using the local-burst-limit buckets alone. If workloads at some of the work targets utilizing the shared resources vary substantially over time, there may be periods where enough capacity becomes available at the shared resources to support short-duration bursts, even though the local-burst-limit buckets are empty, and the second pricing policy may be useful at least in such scenarios. Similar pricing techniques to those illustrated in FIG. 29 may also be used in conjunction with the techniques for equitable distribution of tokens representing excess capacity at shared resources that were described earlier.

Figure 30:
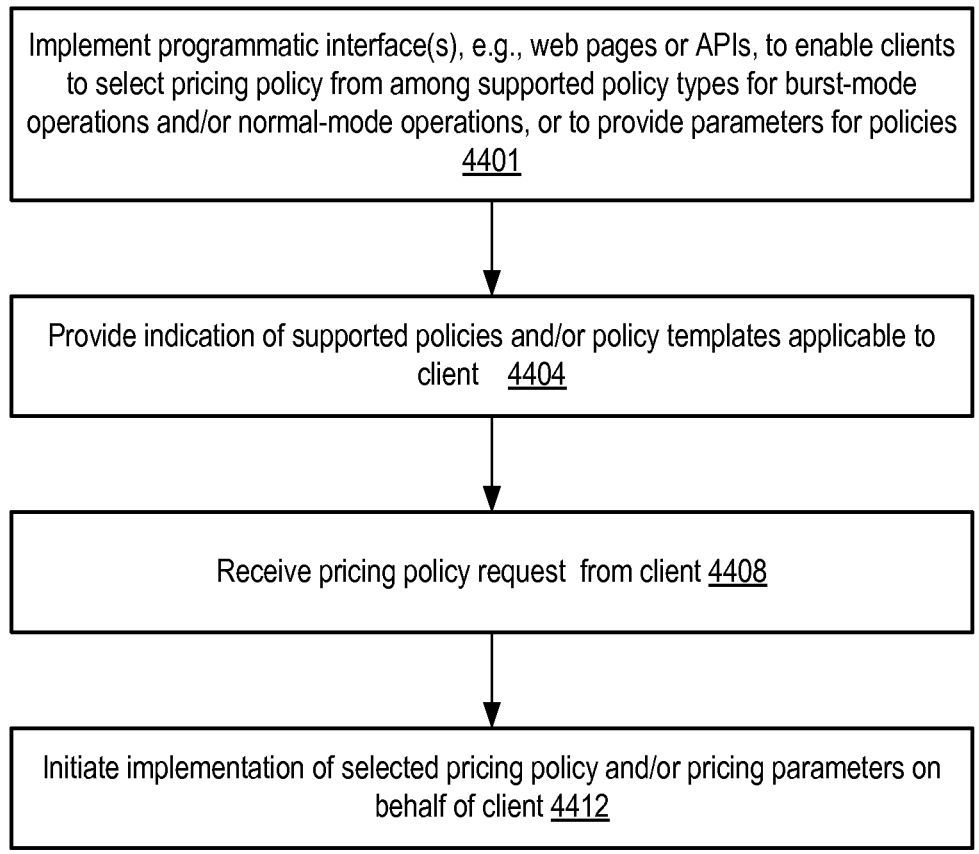
FIG. 30 is a flow diagram illustrating aspects of operations that may be implemented to enable client selection of pricing policies, according to at least some embodiments.

FIG. 30 is a flow diagram illustrating aspects of operations that may be implemented to enable client selection of pricing policies, according to at least some embodiments. As shown in element 4401, one or more programmatic interfaces such as web pages, web sites or APIs, may be implemented to allow clients to select from among a plurality of supported pricing policies. An interface manager subcomponent of a pricing manager 4080 may be responsible for the implementation in at least some embodiments. In some embodiments multiple pricing policies may be available for burst-mode operations, while in other embodiments multiple policies may be supported for both normal-mode and burst-mode operations. In at least some embodiments, pricing policies that specifically apply to certain types of parameter changes (such as short-term or long-term changes to refill rates or maximum token population limits) may be selectable via the interfaces. Indications of the available pricing policies, or of policy templates that can be filled out or parameterized, may be provided to clients (element 4404). For example, details regarding the various elements (such as elements illustrated in FIG. 27) of different pricing policies may be provided via a web site in one implementation.

Based on workload needs and/or budgets, a given client may indicate a selected policy and/or parameters to be used, e.g., via a pricing policy request submitted using one of the implemented interfaces (element 4408). In response to such a request, the pricing manager 4080 may initiate implementation of the selected pricing policy and/or parameters on behalf of the client (element 4412). In at least some implementations, for example, the pricing manager 4080 may communicate with an admissions controller 180 to initiate the use of the pricing policy.

Figure 31:
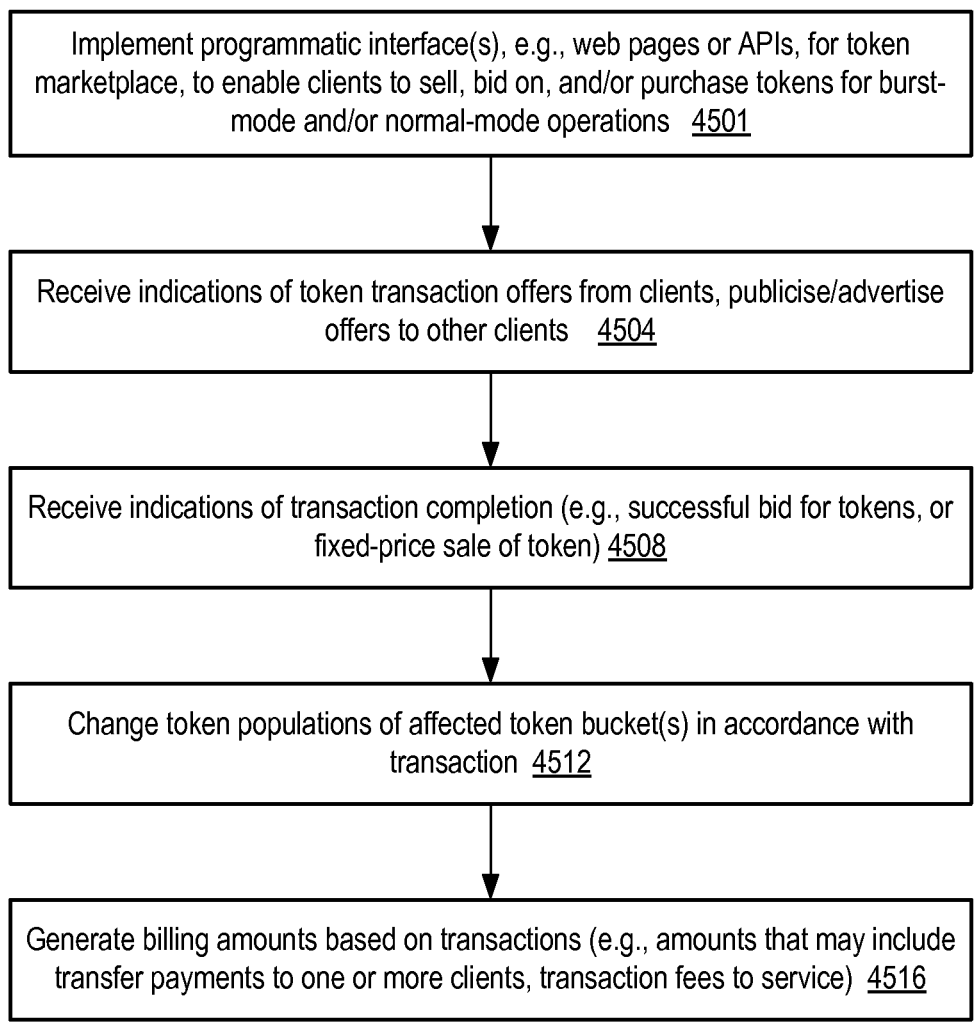
FIG. 31 is a flow diagram illustrating aspects of operations that may be implemented to enable a marketplace for burst-mode tokens, according to at least some embodiments.

FIG. 31 is a flow diagram illustrating aspects of operations that may be implemented to enable a marketplace for burst-mode tokens, according to at least some embodiments. As shown in element 4501, one or more programmatic interfaces such as web pages and/or APIs may be implemented (e.g., by an interface manager 4020) to support various types of transactions involving the advertisement, sale, purchase, sharing or transfer of tokens usable for burst-mode admission control and/or normal-mode admission control in the depicted embodiment. A marketplace manager 4040 (e.g., a subcomponent of the pricing manager) may receive indications of token transaction offers, such as offers to sell, auction, or buy tokens, from one or more clients via the implemented interfaces (element 4504), and may publicize or advertise the offers to other clients. In at least some embodiments the pricing manager and/or the admission controller may be aware of clients that need tokens (e.g., clients whose work requests have experienced higher than normal rates of rejections during a recent time interval), and may be able to match token offers with such candidate token consumers.

The marketplace manager 4040 may receive an indication of a completed transaction, such as a transaction for the sale or transfer of some set of tokens, based on a fixed price or a successful auction bid (element 4508) via one or more of the interfaces. Accordingly, in the depicted embodiment the marketplace manager 4040 may change the token populations of the affected bucket(s) (element 4512), e.g., by reducing the number of tokens in one or more source buckets and/or increasing the token count in one or more other buckets. Billing amounts to be charged to the clients (which may include, for example, service charges to both the buying client and the selling client in a given marketplace transaction) may be generated according to the details of the transaction and the applicable pricing policy or policies 4005 (element 4516).

Figure 32:
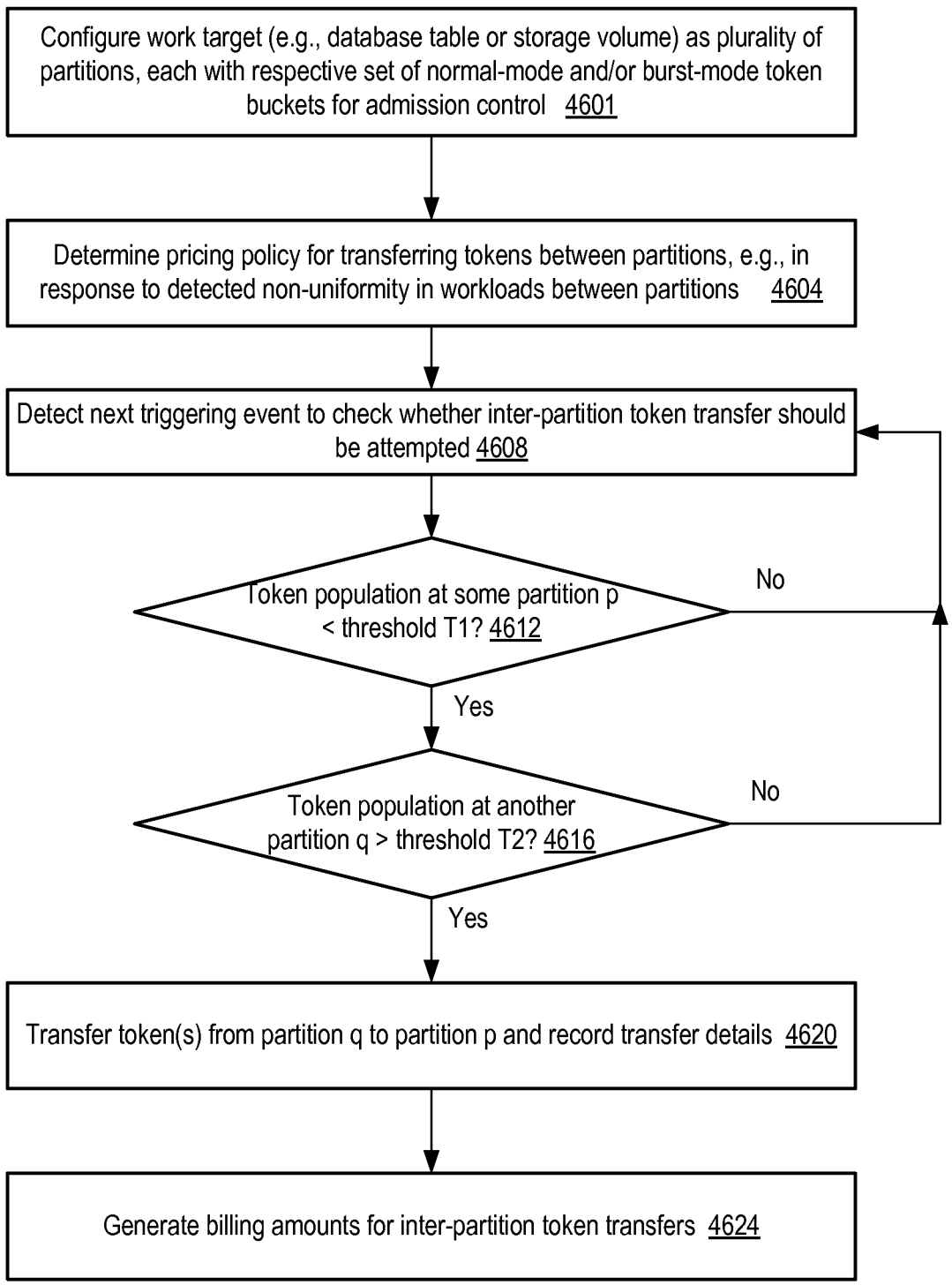
FIG. 32 is a flow diagram illustrating aspects of operations that may be implemented for pricing transfers of tokens between different partitions of a work target, according to at least some embodiments.

In at least some embodiments, as described earlier, a work target such as a database table may be divided into a plurality of logical partitions, and admission control may be performed at the logical partition level, with a respective set of admission control parameters and token buckets being used for each partition. For example, a large database table comprising a terabyte of data may be configured as four logical partitions of 250 megabytes each, with respective sets of token buckets for admission control. In some implementations, as also described earlier, multiple physical replicas of each logical partition may be maintained, e.g., for data durability and/or for high availability. In some scenarios, the client workload may not always be uniformly distributed across the partitions. As a result, at a given point in time, the number of available tokens in a token bucket (such as a burst-mode bucket 422) at one heavily used partition may be much lower than the number of tokens available in corresponding token buckets at other, less-used, partitions. Accordingly, to reduce the number of work request rejections that might otherwise occur due to the heavy asymmetric workload, the admission controller(s) 180 for the different partitions may in some embodiments utilize token-sharing protocols such as those described with reference to FIG. 16-FIG. 21, and the client that owns or uses the partitions may be charged for the token sharing in accordance with a pricing policy for inter-partition token sharing. FIG. 32 is a flow diagram illustrating aspects of operations that may be implemented for pricing transfers of tokens between different partitions of a work target, according to at least some embodiments.

As shown in element 4601 of FIG. 32, a work target (such as a database table or a logical volume) may be configured as a collection of partitions, each with a respective token buckets for admission control, such as a respective normal-mode bucket set and a respective burst-mode bucket set. Each partition may thus be considered a separate work target with independently configurable admission control parameters in the depicted embodiment. A pricing manager 4080 may be configured to determine a pricing policy to be applied to token transfers between the buckets of different partitions (element 4604). For example, a pricing policy for transferring N tokens from a burst-mode token bucket BB1 at partition P1, to a burst-mode token bucket BB2 at partition P2 may be determined based on the client's input, or based on configurable parameters. Such token transfers may be implemented based on the occurrence of various types of triggering events in different embodiments, such as the detection that a token population has fallen below a threshold, the detection that a particular amount of time has elapsed since the last time the need for a token transfer between partitions was investigated, the detection of a threshold rejection rate for work requests, and so on. As shown in element 4608, a triggering event to check whether an inter-partition token transfer should be attempted may be detected.

The token populations at a subset or all of the partitions may be examined, to see if any partition's token count is below a threshold T1. If such a partition "p" is found (as determined in element 4612), and the token population at a different partition "q" is found to be above a threshold T2 (as determined in element 4616), some number of tokens may be transferred from partition "q" to partition "p" in the depicted embodiment (element 4620). In some cases multiple partitions with token counts below threshold T1 may be found, and/or multiple partitions with token populations above T2 may be found, in which case token transfers may be initiated between multiple source and recipient bucket pairs. For example, if during a given examination of the current token populations at partitions p, q, r and s, partitions p and r are found to have token populations below threshold T1, while partition q is found to have T2+N tokens, and partition s does not have enough tokens to transfer any, N/2 tokens may be added to partitions p and r, and the population of q may be reduced by N in one implementation. A record of the transfer or transfers may be kept, and eventually a billing amount to be charged to a client for the transfer may be generated based on the record(s) and the pricing policy (element 4624). After a decision (either positive or negative) to transfer tokens between partitions is made, operations corresponding to elements 4608 onward may be repeated for the next triggering event and/or for different source and destination partition pairs.

Figure 33:
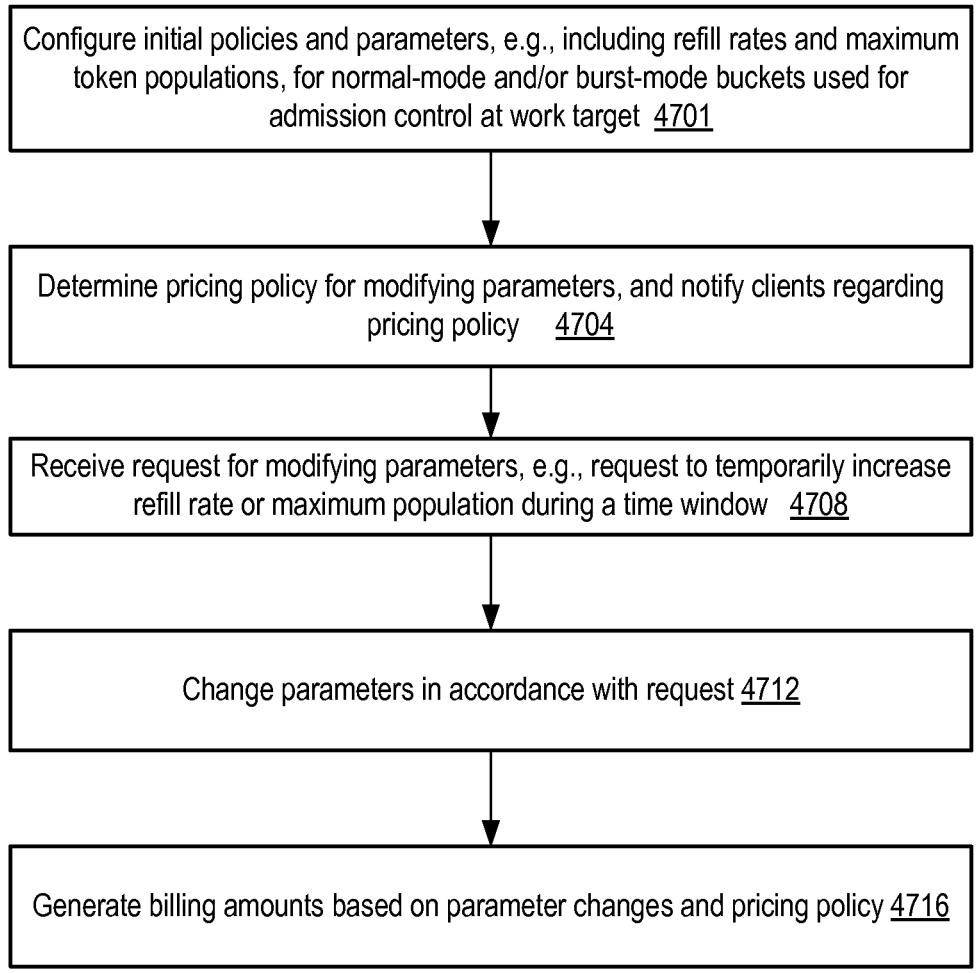
FIG. 33 is a flow diagram illustrating aspects of operations that may be implemented for pricing changes to token bucket configuration settings, according to at least some embodiments.

As described earlier, in at least some embodiments, the token buckets used for admission control may each have a set of configurable parameters, such as refill rates, maximum token populations, and the like. In some embodiments, clients may wish to change, either for a short time or for long periods, one or more parameters associated with a given token bucket. For example, a client may be able to anticipate that very high bursts of work requests may occur at random times during the next day or the next week, and may be willing to pay extra to accommodate such bursts. Accordingly, in some embodiments, pricing policies may be supported to change token bucket refill rates and/or other configuration setting changes. FIG. 33 is a flow diagram illustrating aspects of operations that may be implemented for pricing changes to token bucket configuration settings, according to at least some embodiments. As shown in element 4701, initial policies and parameters may be configured for one or more token buckets including normal-mode and burst-mode buckets, e.g., at the time that the work target is initialized. A pricing policy for parameter changes to the bucket(s) may be determined (element 4704), and clients may be notified of the costs associated with changing the parameters. A request to change one or more parameters for a specified bucket or buckets may be received, e.g., to change the refill rate or the maximum token population during a specified time window (element 4708). The parameters may be changed based on the request (element 4712) (e.g., new values for the parameters may be used for the duration of the time window, at the end of which the initial values may be re-applied), and billing amounts may eventually be generated based on the parameter changes implemented and the pricing policy (element 4716).

It is noted that in various embodiments, the operations illustrated in the flow charts of FIG. 10-15, FIG. 21, FIG. 25, and FIG. 28-33 may be performed in a different order than that shown, and/or performed in parallel. In some embodiments, one or more of the operations illustrated herein may be omitted, and/or other operations not shown in the figures may be performed.

Use Cases

The techniques described above, of token-based admission control and pricing for burst mode operations, may be useful in a variety of different scenarios. For example, in some database environments clients may have very large (terabytes or petabytes) tables or table sets, and very high I/O rates may be directed for some time periods (but not other periods) at the tables. Similarly, other network-accessible services (such as general purpose storage services, compute-intensive services and the like) may also experience temporary periods of high workloads. In general it may be very hard to anticipate the variation in workloads directed to a given work target such as a database table over time. Clients may not wish to pay for high workload levels that occur only occasionally or rarely. At the same time, while the provider of the service may not wish to set aside enough resources to handle very high levels of work requests over long periods, the provider may wish to support, to the extent possible, temporary bursts in arrival rates without rejecting large numbers of requests or increasing the response times of customer requests substantially. Using the kinds of token-based admission control approaches described herein, the provider may be able to accommodate the vast majority (if not all) of bursts in request arrival rates without wasting resources. The use of token-sharing techniques and the equitable distribution of excess capacity of shared resources may also help clients handle unevenly distributed work request arrival rates.

Figure 34:
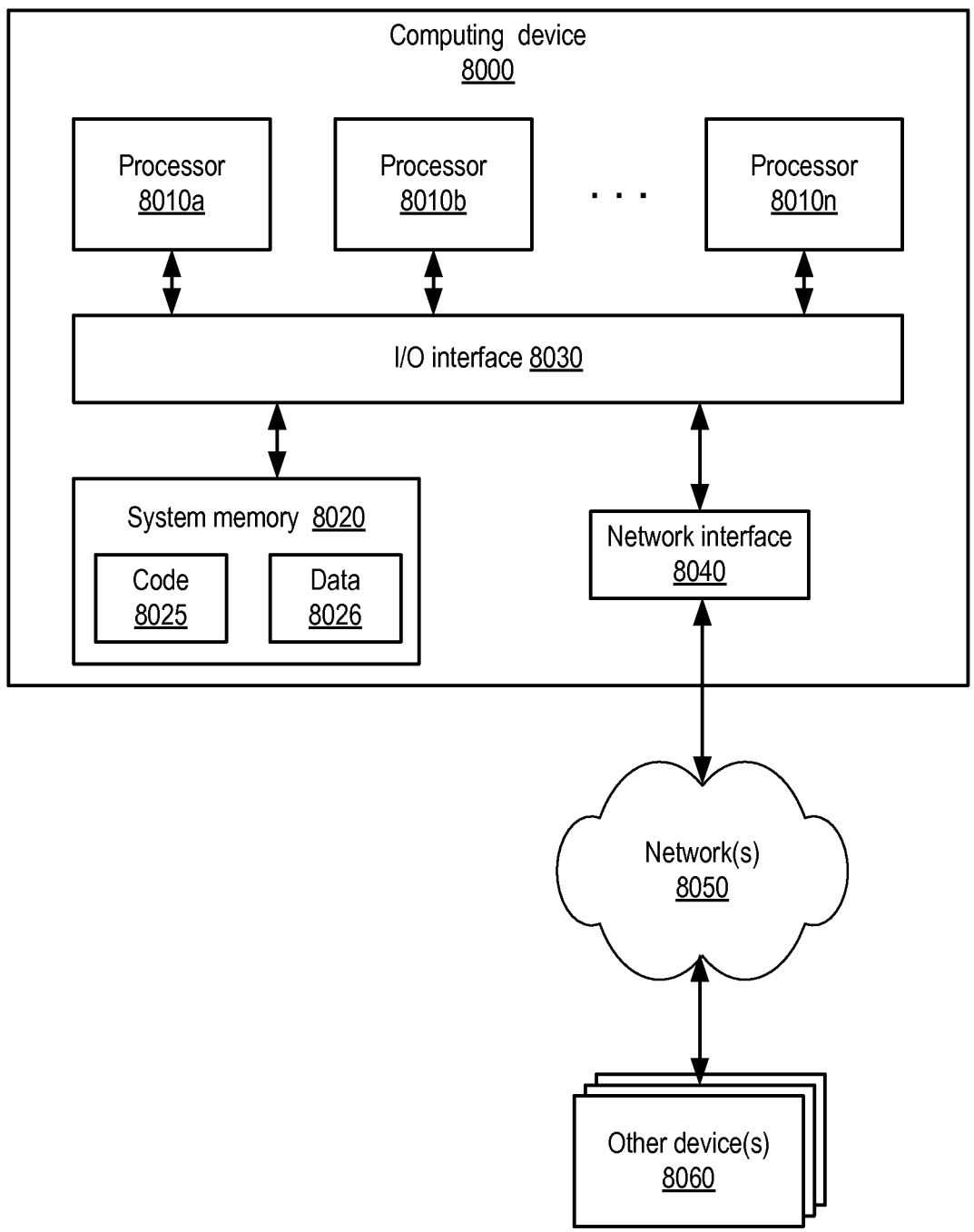
FIG. 34 is a block diagram illustrating an example computing device that may be used in at least some embodiments.

Support for flexible (e.g., client-selected) pricing policies for burst-mode and/or normal-mode operations may increase clients' confidence that their budget priorities can be met while supporting non-uniform workloads of various kinds. The ability to buy and sell tokens in a token marketplace may increase the likelihood that even if clients occasionally make inaccurate workload predictions, the penalties for such inaccuracies can be minimized Illustrative Computer System In at least some embodiments, a server that implements a portion or all of one or more of the technologies described herein, including the techniques to implement token-based admission controllers, token distributors, pricing managers, and/or various kinds of work targets, may include a general-purpose computer system that includes or is configured to access one or more computer-accessible media. FIG. 34 illustrates such a general-purpose computing device 8000. In the illustrated embodiment, computing device 8000 includes one or more processors 8010 coupled to a system memory 8020 via an input/output (I/O) interface 8030. Computing device 8000 further includes a network interface 8040 coupled to I/O interface 8030.

In various embodiments, computing device 8000 may be a uniprocessor system including one processor 8010, or a multiprocessor system including several processors 8010 (e.g., two, four, eight, or another suitable number). Processors 8010 may be any suitable processors capable of executing instructions. For example, in various embodiments, processors 8010 may be general-purpose or embedded processors implementing any of a variety of instruction set architectures (ISAs), such as the x86, PowerPC, SPARC, or MIPS ISAs, or any other suitable ISA. In multiprocessor systems, each of processors 8010 may commonly, but not necessarily, implement the same ISA.

System memory 8020 may be configured to store instructions and data accessible by processor(s) 8010. In various embodiments, system memory 8020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 8020 as code 8025 and data 8026.

In one embodiment, I/O interface 8030 may be configured to coordinate I/O traffic between processor 8010, system memory 8020, and any peripheral devices in the device, including network interface 8040 or other peripheral interfaces such as various types of persistent and/or volatile storage devices used to store physical replicas of data object partitions. In some embodiments, I/O interface 8030 may perform any necessary protocol, timing or other data transformations to convert data signals from one component (e.g., system memory 8020) into a format suitable for use by another component (e.g., processor 8010). In some embodiments, I/O interface 8030 may include support for devices attached through various types of peripheral buses, such as a variant of the Peripheral Component Interconnect (PCI) bus standard or the Universal Serial Bus (USB) standard, for example. In some embodiments, the function of I/O interface 8030 may be split into two or more separate components, such as a north bridge and a south bridge, for example. Also, in some embodiments some or all of the functionality of I/O interface 8030, such as an interface to system memory 8020, may be incorporated directly into processor 8010.

Network interface 8040 may be configured to allow data to be exchanged between computing device 8000 and other devices 8060 attached to a network or networks 8050, such as other computer systems or devices as illustrated in FIG. 1a through FIG. 33, for example. In various embodiments, network interface 8040 may support communication via any suitable wired or wireless general data networks, such as types of Ethernet network, for example. Additionally, network interface 8040 may support communication via telecommunications/telephony networks such as analog voice networks or digital fiber communications networks, via storage area networks such as Fibre Channel SANs, or via any other suitable type of network and/or protocol.

In some embodiments, system memory 8020 may be one embodiment of a computer-accessible medium configured to store program instructions and data as described above for FIG. 1a through FIG. 33 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 8000 via I/O interface 8030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 8000 as system memory 8020 or another type of memory. Further, a computer-accessible medium may include transmission media or signals such as electrical, electromagnetic, or digital signals, conveyed via a communication medium such as a network and/or a wireless link, such as may be implemented via network interface 8040. Portions or all of multiple computing devices such as that illustrated in FIG. 34 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A non-transitory computer-readable storage medium storing program instructions that when executed on one or more processors:
    determine a token policy to be applied to a burst-mode token bucket of one or more token buckets used for admission control decisions at a work target of a network-accessible service to which work requests are directed, wherein the token policy is to be applied during a burst mode of operation of the work target, and wherein the burst mode of operation includes receiving work requests at a rate higher than a specified capacity of the work target;
    record, over a time period and in accordance with the token policy, one or more changes to the token population of the burst-mode token bucket during the burst mode of operation; and
    for received requests, control access to the burst mode of operation at the work target of the network-accessible service based at least in part on whether the burst-mode token bucket has sufficient tokens, wherein the control of access to the burst mode of operation controls a rate of access to the work target of the network-accessible service for the received requests.

2. The non-transitory computer-readable storage medium as recited in claim 1,
    wherein the one or more token buckets comprise:
        a normal-mode bucket whose token population is used to determine whether to accept a work request during a normal mode of operation of the work target, and the one or more burst-mode token buckets whose token population is used to determine whether to accept a work request during the burst mode of operation;
    wherein the specified capacity is a provisioned capacity for the work target; and
    wherein the instructions when executed on the one or more processors:
        determine a different token policy to be applied based at least in part on token population changes of the normal-mode bucket indicated by the one or more changes to the token population recorded over the time period.

3. The non-transitory computer-readable storage medium as recited in claim 2,
    wherein the one or more burst-mode token buckets comprise:
        a local-burst-limit bucket whose token population is indicative of available throughput capacity at the work target, and
        a shared-resource capacity bucket whose token population is indicative of available throughput capacity at a resource shared by a plurality of work targets; and,
    wherein the instructions when executed on the one or more processors:
        apply, in response to a determination that the token population of the local-burst-limit bucket meets a threshold criterion,
            the policy to a particular change of token population of the shared-resource capacity bucket.

4. The non-transitory computer-readable storage medium as recited in claim 1, wherein the change to the token population of the burst mode token bucket comprises a reduction in the token population as a result of one or more tokens being transferred to a different bucket in response to a token sale operation implemented using a token marketplace.

5. The non-transitory computer-readable storage medium as recited in claim 1, wherein:
    an amount to be charged to a client is based at least in part on the one or more changes recorded over the time period,
    a particular bucket of the one or more token buckets is configured with a token refill rate and a maximum token population limit, and
    the policy comprises an indication of a different amount to be charged to the client for a change to at least one of:
        (a) the token refill rate, or
        (b) the maximum token population limit.

6. A system, comprising:
    one or more computing devices configured to:
        determine a token policy to be applied to a burst-mode token bucket of one or more token buckets used for admission control decisions at a work target of a network-accessible service to which work requests are directed, wherein the token policy is to be applied during a burst mode of operation of the work target, and wherein the burst mode of operation includes receiving work requests at a rate higher than a specified capacity of the work target;
        record, over a time period and in accordance with the token policy, one or more changes to the token population of the burst-mode token bucket during the burst mode of operation; and
        for received requests, control access to the burst mode of operation at the work target of the network-accessible service based at least in part on whether the burst-mode token bucket has sufficient tokens, wherein the control of access to the burst mode of operation controls a rate of access to the work target of the network-accessible service for the received requests.

7. The system as recited in claim 6,
    wherein the one or more computing devices are further configured to instantiate a plurality of token buckets including the burst-mode token bucket, wherein the plurality of token buckets are associated with workload management at the work target, wherein decisions to accept the work requests are made based at least in part on a token population of at least one bucket of the plurality of token buckets, and
    wherein the one or more token buckets comprise a normal-mode bucket with a token population that is used to determine a mode of operation of the work target, wherein the one or more token buckets comprise one or more burst-mode buckets with a token population that is used to determine whether to accept a work request during the burst mode of operation, wherein the burst-mode token bucket is one of the one or more burst-mode buckets.

8. The system as recited in claim 7,
wherein the one or more burst-mode buckets comprise:
a local-burst-limit bucket with a token population that is indicative of the available throughput capacity at the work target, and
a shared-resource capacity bucket with token population that is indicative of available throughput capacity at a resource shared by a plurality of work targets,
wherein the work target is configured to operate in each of a plurality of modes of operation with respective sets of admission control parameters for accepting the work requests for execution, the plurality of modes of operation including the burst mode of operation,
wherein the token policy further indicates one or more applicability criteria for the token policy, including an indication that the token policy is to be applied during the burst mode of operation, and
wherein a particular applicability criterion of the one or more applicability criteria indicates that the policy is to apply in response to a determination that the token population of the local-burst-limit bucket is no greater than a specified threshold.

9. The system as recited in claim 6, wherein the one or more changes to the token population of the burst-mode token bucket comprises a reduction in the token population as a result of one or more tokens being consumed to accept a received work request for execution.

10. The system as recited in claim 6, wherein the one or more changes to the token population of the burst-mode token bucket comprises a reduction in the token population as a result of one or more tokens being transferred to a different bucket in response to a token sale operation implemented using a token marketplace.

11. A method, comprising:
performing, by one or more computing devices:
determining a token policy to be applied to a burst-mode token bucket of one or more token buckets used for admission control decisions at a work target of a network-accessible service to which work requests are directed, wherein the token policy is to be applied during a burst mode of operation of the work target, and wherein the burst mode of operation includes receiving work requests at a rate higher than a specified capacity of the work target;
recording, over a time period and in accordance with the token policy, one or more changes to the token population of the burst-mode token bucket during the burst mode of operation; and
for one or more received work requests, controlling access to the burst mode of operation at the work target of the network-accessible service based at least in part on whether the burst-mode token bucket has a sufficient number of tokens, wherein the controlling of access to the burst mode of operation controls a rate of access to the work target of the network-accessible service for the received requests.

12. The method as recited in claim 11, further comprising:
instantiating a plurality of token buckets including the burst-mode token bucket, wherein the plurality of token buckets are associated with workload management at the work target, wherein decisions to accept the work requests are made based at least in part on a token population of at least one bucket of the plurality of token buckets, and
wherein the one or more token buckets comprise a normal-mode bucket whose token population is used to determine a mode of operation of the work target, wherein the one or more token buckets comprise one or more burst-mode buckets whose token population is used to determine whether to accept a work request during the burst mode of operation, and wherein the burst-mode token bucket is one of the one or more burst-mode buckets.

13. The method as recited in claim 12,
wherein the one or more burst-mode buckets comprise:
a local-burst-limit bucket whose token population is indicative of the throughput capacity at the work target, and
a shared-resource capacity bucket whose token population is indicative of available throughput capacity at a resource shared by a plurality of work targets, and wherein, in accordance with the token policy, the method further comprises performing, by the one or more computing devices:
in response to determining that the token population of the local-burst-limit bucket meets a threshold criterion,
applying the token policy to a particular change of token population of the shared-resource capacity bucket.

14. The method as recited in claim 11, wherein the one or more changes to the token population of the burst-mode token bucket comprises a reduction in the token population as a result of one or more tokens being consumed to accept a received work request for execution.

15. The method as recited in claim 11, wherein the one or more changes to the token population of the burst-mode token bucket comprises a reduction in the token population as a result of one or more tokens being transferred to a different bucket in response to a token sale operation implemented using a token marketplace.

16. The method as recited in claim 15, further comprising performing, by the one or more computing devices:
implementing one or more programmatic interfaces enabling a particular client to indicate, via the token marketplace, that tokens of the burst-mode token bucket are available for transfer to another token bucket.

17. The method as recited in claim 16, wherein the token policy indicates that an amount to be charged for a transfer of a token to a different bucket from the burst-mode token bucket is to be determined based at least in part on one or more auction bids received for the transfer.

18. The method as recited in claim 11, further comprising performing, by the one or more computing devices:
implementing one or more programmatic interfaces enabling a client to select a token policy from among a plurality of token policies.

19. The method as recited in claim 11, wherein the token policy indicates a client-specified budget limit, further comprising performing, by the one or more computing devices:
determining to implement a change to the token population of the burst-mode token bucket based at least in part on the client-specified budget limit.

20. The method as recited in claim 11,
wherein the work target comprises a first partition of a storage object, wherein the storage object includes at least the first partition and a second partition, and wherein a particular change of the one or more changes to the token population of a particular bucket is a result of a transfer of a token from the particular bucket to a different bucket used for workload management of the second partition.

\* \* \* \* \*